US011977915B2

(12) United States Patent
Muthiah et al.

(10) Patent No.: US 11,977,915 B2
(45) Date of Patent: May 7, 2024

(54) NON-VOLATILE MEMORY WITH INTELLIGENT COMPUTE TASK DISTRIBUTION

(71) Applicant: WESTERN DIGITAL TECHNOLOGIES, INC., San Jose, CA (US)

(72) Inventors: Ramanathan Muthiah, Bengaluru (IN); Rakesh Balakrishnan, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 548 days.

(21) Appl. No.: 17/177,334

(22) Filed: Feb. 17, 2021

(65) Prior Publication Data
US 2022/0188151 A1 Jun. 16, 2022

Related U.S. Application Data

(60) Provisional application No. 63/125,512, filed on Dec. 15, 2020.

(51) Int. Cl.
*G06F 9/46* (2006.01)
*G06F 3/06* (2006.01)
*G06F 9/48* (2006.01)
*G06F 13/16* (2006.01)

(52) U.S. Cl.
CPC .......... *G06F 9/4881* (2013.01); *G06F 3/0604* (2013.01); *G06F 3/0659* (2013.01); *G06F 3/0679* (2013.01); *G06F 13/1668* (2013.01)

(58) Field of Classification Search
CPC .... G06F 9/4881; G06F 3/0604; G06F 3/0659; G06F 3/0679; G06F 13/1668
See application file for complete search history.

(56) References Cited

U.S. PATENT DOCUMENTS

| 7,930,661 B1 | 4/2011 | Trimberger |
| 8,386,610 B2 | 2/2013 | Yahalom |
| 8,634,247 B1 | 1/2014 | Sprouse |

(Continued)

OTHER PUBLICATIONS

De, et al., "Minerva: Accelerating Data Analysis in Next-Generation SSDs," 2013 IEEE 21st Annual International Symposium on Field-Programmable Custom Computing Machines, Seattle, WA, 2013, doi: 10.1109/FCCM.2013.46.

(Continued)

*Primary Examiner* — Gregory A Kessler
(74) *Attorney, Agent, or Firm* — Vierra Magen Marcus LLP

(57) ABSTRACT

A non-volatile storage system includes a memory controller and multiple integrated memory assemblies separate from and in communication with the memory controller. The integrated memory assemblies each comprises a memory die and a control die. The control die is connected (e.g., bonded) to the memory die. The memory controller and the control die include separate compute resources (e.g., each includes a processor). The storage system is configured to receive a request to perform a compute task and assign that compute task to any one or more of the memory controller and the integrated memory assemblies based on anticipated amount of data to be transferred to or from non-volatile memory for the compute task, computational resource need of the compute task, and/or available bandwidth of the memory controller and the control dies.

16 Claims, 32 Drawing Sheets

(56) References Cited

U.S. PATENT DOCUMENTS

| | | |
|---|---|---|
| 8,773,909 B2 | 7/2014 | Li |
| 8,780,632 B2 | 7/2014 | Sprouse |
| 8,780,634 B2 | 7/2014 | Li |
| 8,817,541 B2 | 8/2014 | Li |
| 9,330,143 B2 | 5/2016 | Obukhov |
| 9,354,824 B2 | 5/2016 | Lam |
| 9,378,067 B1 | 6/2016 | Agarwala |
| 9,401,184 B1 | 7/2016 | Erez |
| 10,114,795 B2 | 10/2018 | Cargnini |
| 10,331,583 B2 | 6/2019 | Shsan |
| 10,387,303 B2 | 8/2019 | Mehra |
| 10,417,733 B2 | 9/2019 | Kachare |
| 10,740,165 B2 | 8/2020 | Bhardwaj |
| 2010/0088572 A1 | 4/2010 | Ohnuki |
| 2014/0075135 A1 | 3/2014 | Choi |
| 2014/0136761 A1 | 5/2014 | Li |
| 2015/0356010 A1 | 12/2015 | Bolanowski |
| 2016/0011815 A1 | 1/2016 | Klein |
| 2016/0266848 A1 | 9/2016 | Lam |
| 2016/0357630 A1 | 12/2016 | Kang |
| 2017/0255390 A1 | 9/2017 | Chang |
| 2017/0300263 A1 | 10/2017 | Helmick |
| 2019/0340064 A1 | 11/2019 | Sity |

OTHER PUBLICATIONS

Ki, "In-Storage Compute: an Ultimate Solution for Accelerating I/O-intensive Applications," Aug. 13, 2015, Samsung Electronics.

Tiwari, et al., "Active Flash: Towards Energy-Efficient, In-Situ Data Analytics on Extreme-Scale Machines," 2013, Proceedings of the 11th USENIX Conference on File and Storage Technologies (FAST'13).

Tseng, et al., "Morpheus: Creating Application Objects Efficiently for Heterogeneous Computing," ACM SIGARCH Computer Architecture News, Jun. 2016, https://doi.org/10.1145/3007787.3001143.

Sparse parity check matrix H

N=33 variable nodes

|  | v1 | v2 | v3 | v4 | v5 | v6 | v7 | v8 | v9 | v10 | v13 | v12 | v13 |
|---|---|---|---|---|---|---|---|---|---|---|---|---|---|
| cn1 |  | 1 |  | 1 |  |  |  |  |  |  | 1 |  | 1 |
| cn2 | 1 |  |  |  |  |  | 1 |  |  |  | 1 |  |  |
| cn3 |  |  | 1 |  | 1 | 1 |  |  | 1 | 1 |  |  |  |
| cn4 |  | 1 |  |  |  |  |  | 1 |  | 1 |  |  |  |
| cn5 |  |  |  | 1 |  |  | 1 |  |  |  |  | 1 |  |
| cn6 | 1 |  |  |  | 1 | 1 |  | 1 |  |  |  |  |  |
| cn7 |  | 1 |  |  |  |  |  | 1 |  | 1 |  |  | 1 |
| cn8 |  |  |  | 1 |  |  | 1 |  |  |  | 1 | 1 |  |
| cn9 | 1 |  | 1 |  | 1 |  |  |  |  |  |  |  | 1 |
| cn10 |  |  |  |  |  |  | 1 | 1 | 1 | 1 |  |  |  |

M=10 check nodes

Sparse bipartite graph, 392

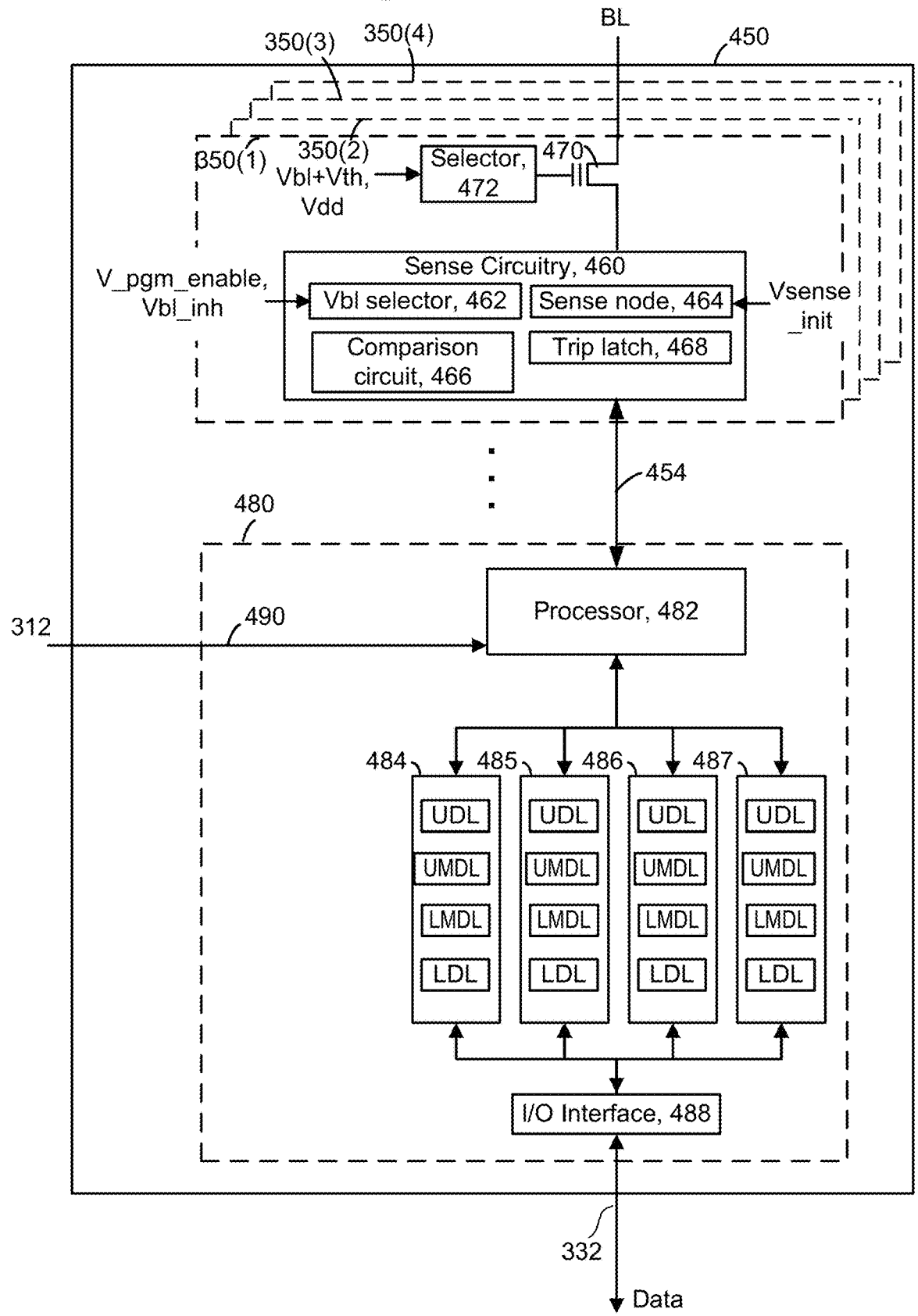

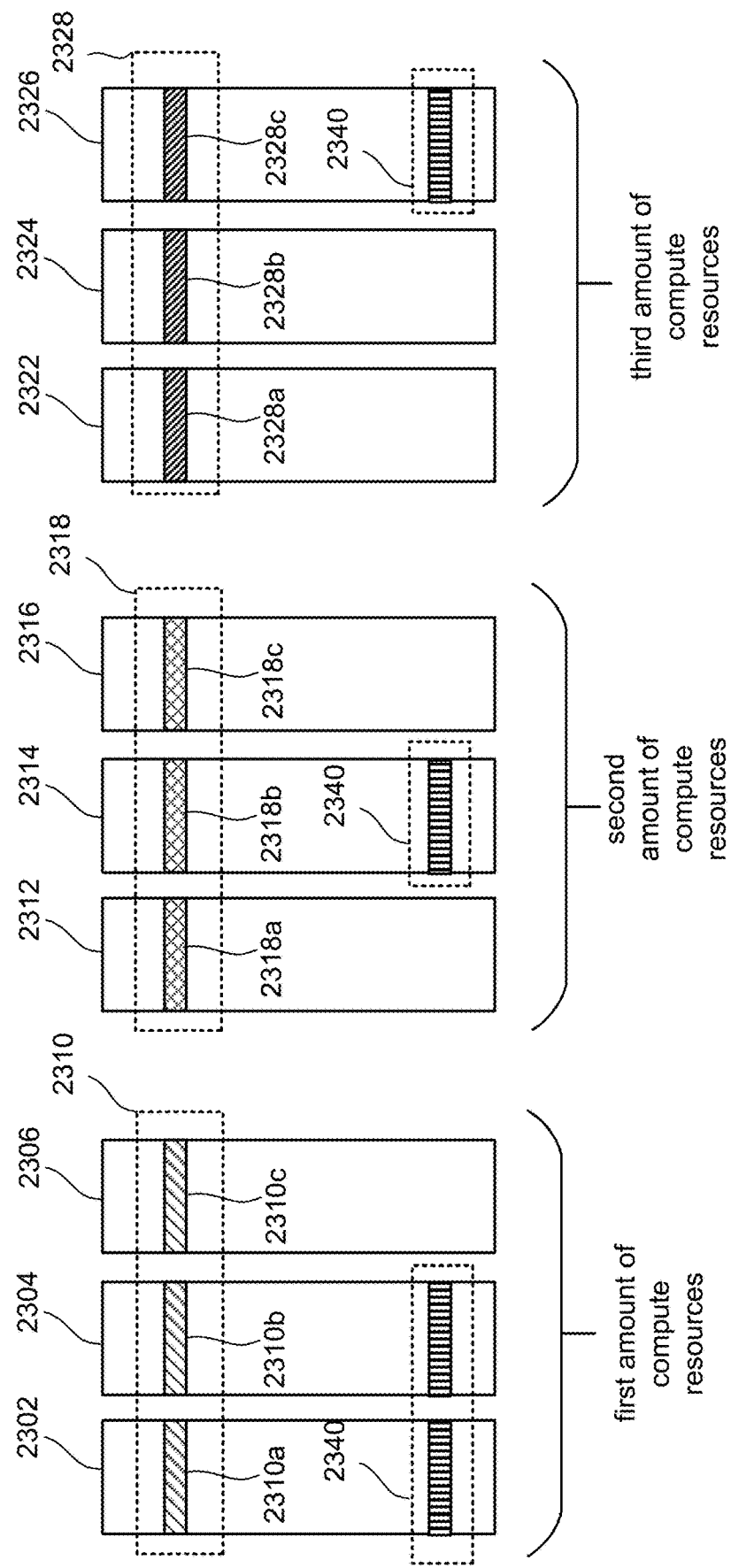

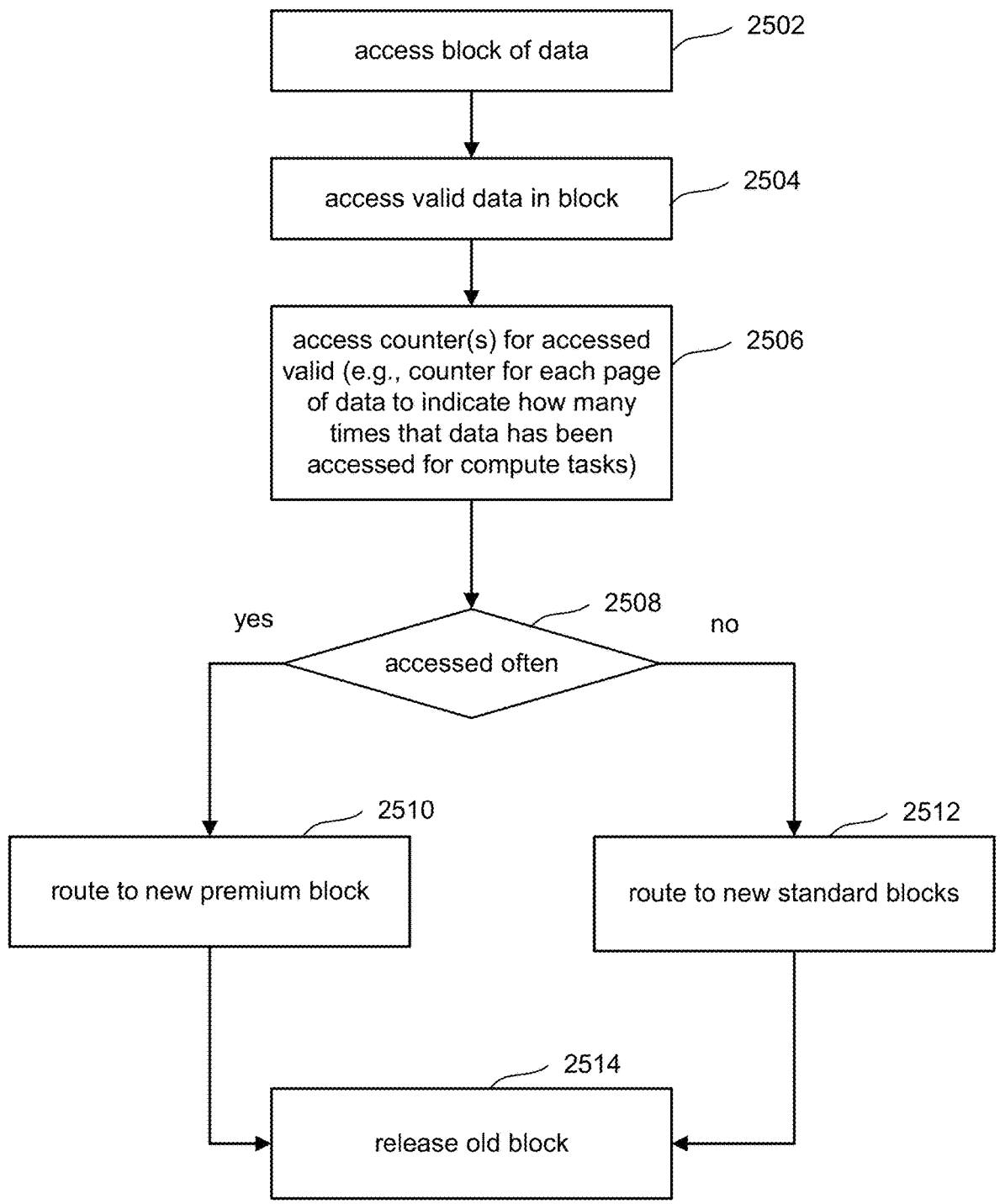

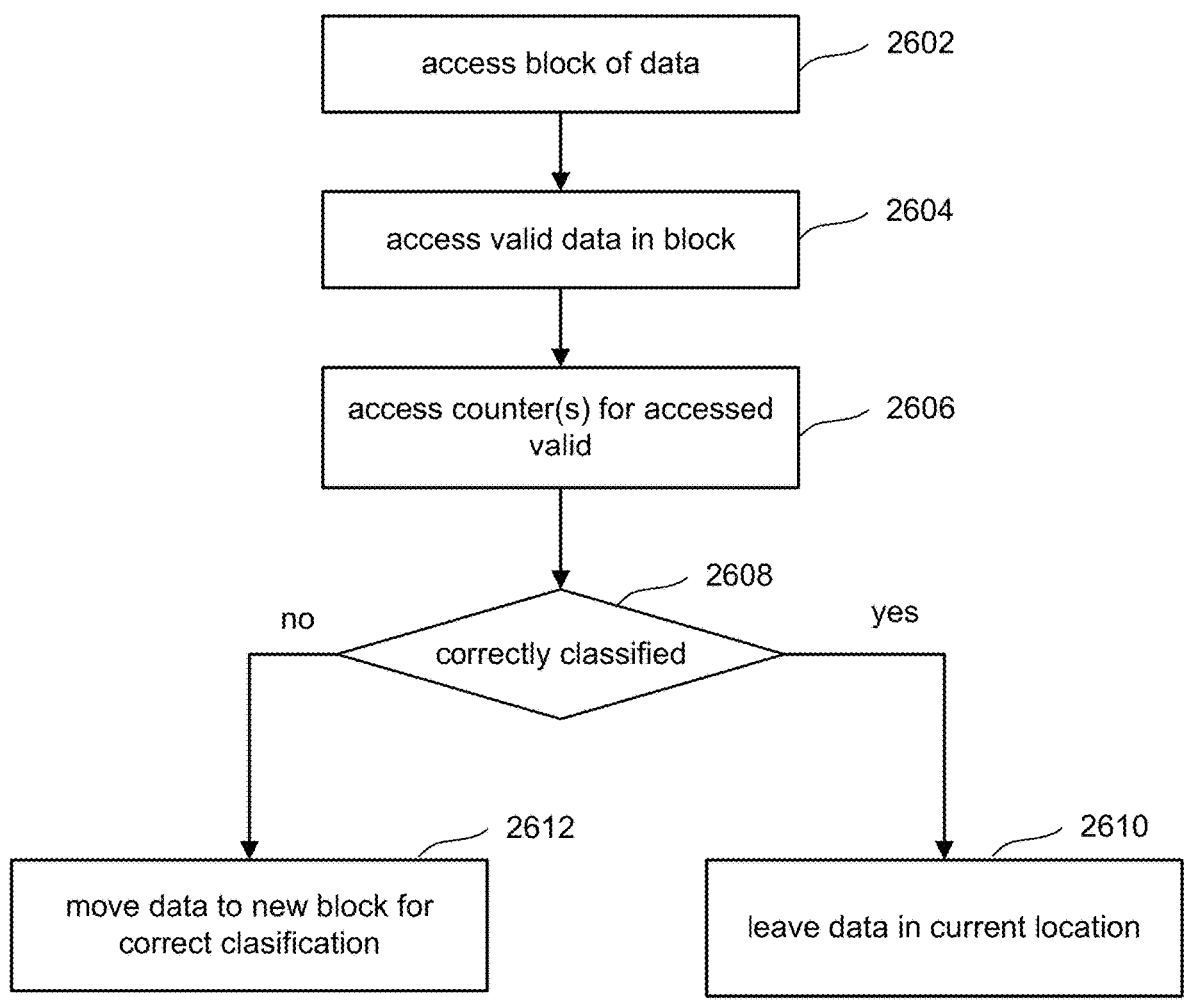

NON-VOLATILE MEMORY WITH INTELLIGENT COMPUTE TASK DISTRIBUTION

This application claims the benefit of U.S. Provisional Patent Application No. 63/125,512, "NON-VOLATILE MEMORY WITH INTELLIGENT COMPUTE TASK DISTRIBUTION," filed on Dec. 15, 2020, which is hereby incorporated by reference in its entirety.

BACKGROUND

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a power source (e.g., a battery). One example of non-volatile memory is flash memory (e.g., NAND-type and NOR-type flash memory).

Many electronic devices make use of embedded or connected storage systems that include non-volatile memory. An electronic device that includes an embedded storage system, or is connected to a storage system, is often referred to as a host. In the past, data stored in the embedded or connected storage system could be transferred to the host for use by the host with various applications. However, for a large data set, transferring the data to the host can take too much time. Therefore, some storage systems that use non-volatile memory may include computing resources within the storage system so that compute tasks on large data sets can be performed in the storage system rather than first transferring the data out of the storage system and to a host and then performing the compute task on the host. Even with the time savings due to performing the compute task within the storage system rather than at the host, there is still a demand to improve performance so that latencies experienced by a user will be reduced.

DESCRIPTION OF THE DRAWINGS

FIG. 7 is a block diagram depicting one embodiment of a sense block.

FIG. 29 is a block diagram depicting multiple memory die and logical blocks.

FIG. 32 is a flow chart describing one embodiment of a process for performing a garbage collection process.

FIG. 33 is a flow chart describing one embodiment of a process for moving data between logical blocks.

DETAILED DESCRIPTION

To improve performance, a non-volatile storage system comprises a memory controller and a plurality of integrated memory assemblies. The integrated memory assemblies each comprise a memory die and a control die connected (e.g., bonded) to the memory die. The memory controller and the control dies each include separate compute resources (e.g., each includes its own set of one or more processors) so that compute tasks can be performed by the memory controller and/or the control dies. To optimize performance, a module within the memory controller (or another entity) assigns a compute task to the memory controller and the integrated memory assemblies based on anticipated amount of data to be transferred to or from non-volatile memory for the compute task, computational resource need of the compute task, and/or available bandwidth of the memory controller and the control dies.

In some example implementations, different control dies (and, therefore, different integrated memory assemblies) will include different amounts of compute resources such that compute tasks will be assigned to control dies with the appropriate amount of compute resources. The storage system can also include multiple types of logical blocks of non-volatile memory cells, with each type of logical block comprising physical blocks from multiple memory die connected to control die having a same amount of compute resources. The memory controller intelligently routes data to be stored in logical blocks associated with control die having the appropriate amount of compute resources for performing anticipated compute tasks on the data.

Figure 1:
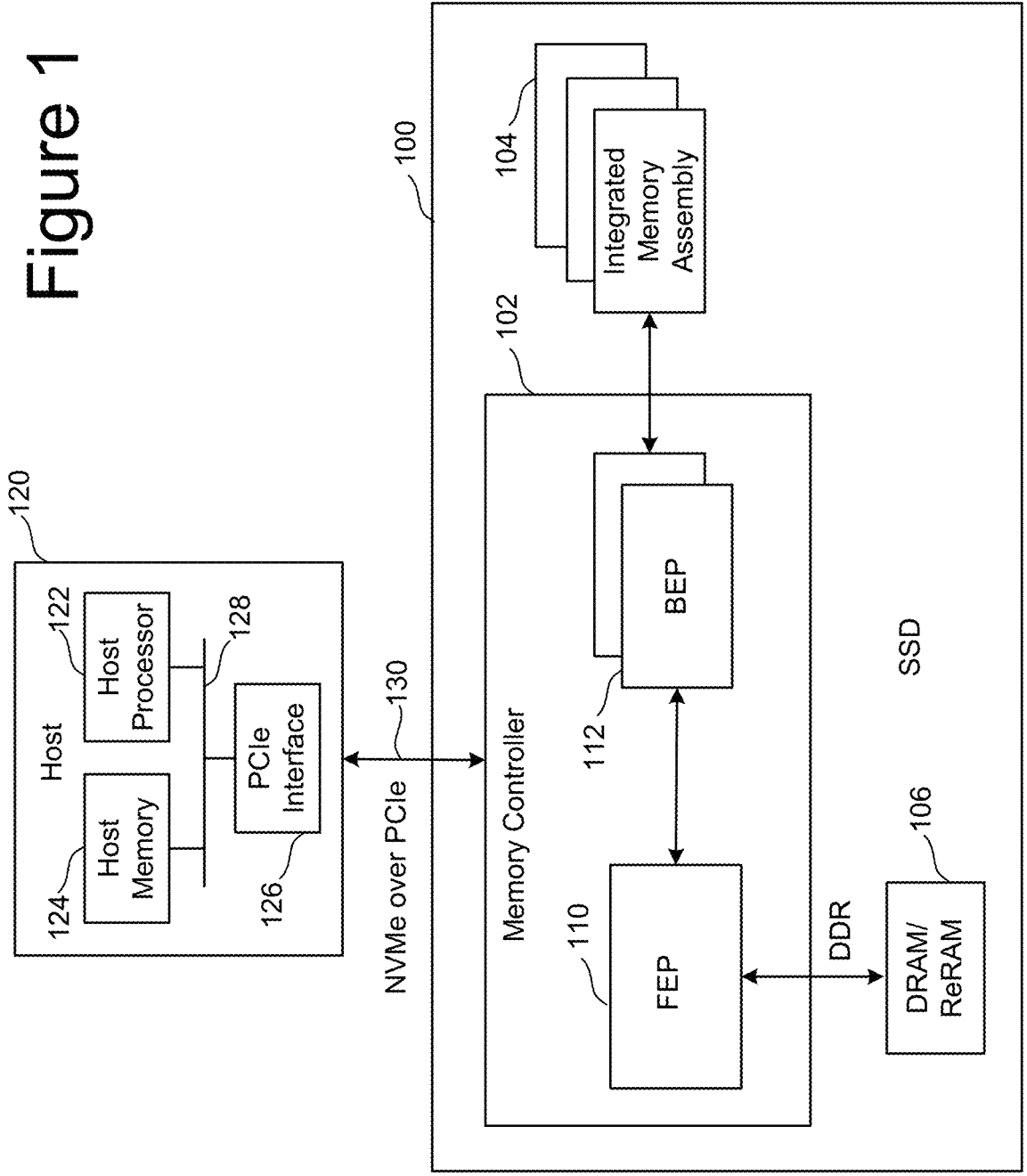
FIG. 1 is a block diagram of one embodiment of a storage system connected to a host.

FIGS. 1-5 describe one example of a storage system for implementing the technology disclosed herein. FIG. 1 is a block diagram of one embodiment of a storage system 100 connected to a host 120. Many different types of storage systems can be used with the technology disclosed herein. One example storage system is a solid state drive ("SSD"); however, other types of storage systems can also be used including removable memory cards and USB memory devices. Storage system 100 comprises a memory controller 102, one or more integrated memory assemblies 104 for storing data, and local memory (e.g., DRAM/ReRAM) 106. Memory controller 102 comprises a Front End Processor Circuit (FEP) 110 and one or more Back End Processor Circuits (BEP) 112. In one embodiment FEP 110 circuit is implemented on an ASIC. In one embodiment, each BEP circuit 112 is implemented on a separate ASIC. Ion one embodiment, the ASICs for each of the BEP circuits 112 and the FEP circuit 110 are implemented on the same semiconductor such that memory controller 102 is manufactured as a System on a Chip ("SoC"). FEP 110 and BEP 112 both include their own processors. In one embodiment, FEP 110 and BEP 112 work as a master slave configuration where the FEP 110 is the master and each BEP 112 is a slave. For example, FEP circuit 110 implements a flash translation layer that performs memory management (e.g., garbage collection, wear leveling, etc.), logical address to physical address translation, communication with the host, management of DRAM (local volatile memory) and management of the overall operation of the SSD (or other non-volatile storage system). The BEP circuit 112 manages memory operations in the integrated memory assemblies/die at the request of FEP circuit 110. In some embodiments, an integrated memory assembly is referred to as a memory package. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Controller 102 is one example of a control circuit.

In one embodiment, there are a plurality of integrated memory assemblies 104. In an embodiment, each integrated memory assembly 104 includes one or more memory die and one or more control die. Each memory die may include one or more memory structures. A control die may control operations on a memory die. For example, a control die may control and perform read, write, and erase operations on a memory die. In one embodiment, memory controller 102 communicates with a control die in order to instruct the control die to perform read, write, or erase operations on one or more non-volatile memory die or one or more memory structures. In one embodiment, each memory die in the integrated memory assembly 104 utilizes NAND flash memory (including two dimensional NAND flash memory and/or three dimensional NAND flash memory). In other embodiments, the integrated memory assembly 104 can include other types of memory; for example, PCM memory and MRAM.

Memory controller 102 communicates with host 120 by way of an interface 130 that implements NVM Express (NVMe) over PCI Express (PCIe). For working with storage system 100, host 120 includes a host processor 122, host memory 124, and a PCIe interface 126. Host memory 124 is the host's physical memory, and can be DRAM, SRAM, non-volatile memory or another type of storage. Host 120 is external to and separate from storage system 100. In one embodiment, storage system 100 is embedded in host 120.

Figure 2:
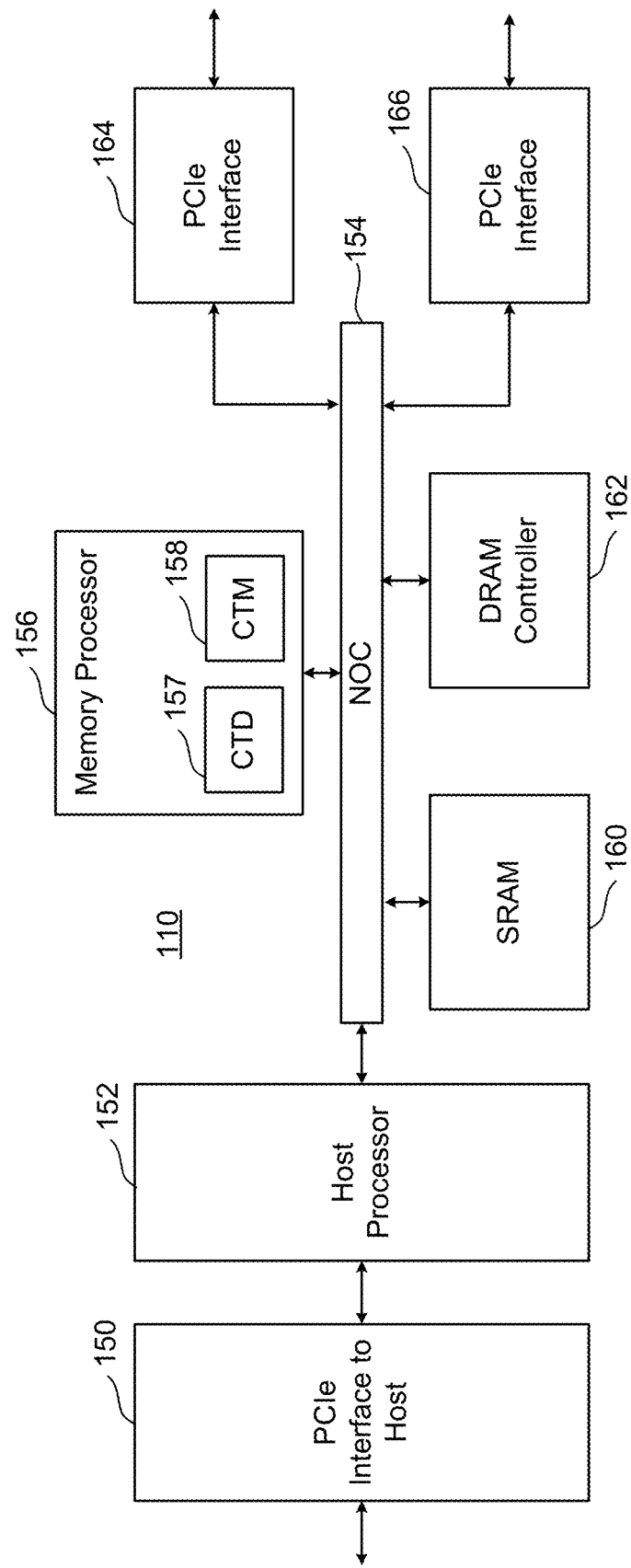
FIG. 2 is a block diagram of one embodiment of a Front End Processor circuit.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156 (also referred to as a memory controller processor), SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 2, memory controller 102 includes two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

Memory processor 156 can be a microprocessor, microcontroller, RISC processor, or other type of processor. No particular type of processor or architecture is required. In some embodiments, many of the functions of memory controller 102 are implemented in software on memory processor 156. For example, FIG. 2 depicts memory processor 156 including compute task distributor module (CTD) 157 and compute task monitor module (CTM) 158. As discussed below, compute task distributor module 157 determines where to assign compute tasks within storage system 100 and compute task monitor module 158 monitors assigned tasks in real time to determine whether they can be reassigned in order to optimize usage of resources. In one embodiment, compute task distributor module 157 and compute task monitor module 158 are implemented in software/firmware that programs memory processor 156. In another embodiment, compute task distributor module 157 and compute task monitor module 158 can be separate hardware circuits or software on separate processors.

Memory processor 156 and its software may be referred to as a memory controller processor. In other embodiments, the memory controller processor may include one or more processors and one or more additional circuits for performing additional functions (e.g., stand-alone electrical circuits to implement compute task distributor module 157 and compute task monitor module 158, as well as other functions of s memory controller). For example, the memory controller processor may include memory processor 156, host processor 152, DRAM controller 162, processor 220 (see FIG. 3), processor 250 (se FIG. 3), data path controller 222 (see FIG. 3) and/or data path controller 252 (see FIG. 3). The memory controller processor may also include other functional blocks (e.g., electrical circuits or software running on electrical circuits or processors) within the controller that manage storage system 100.

Figure 3:
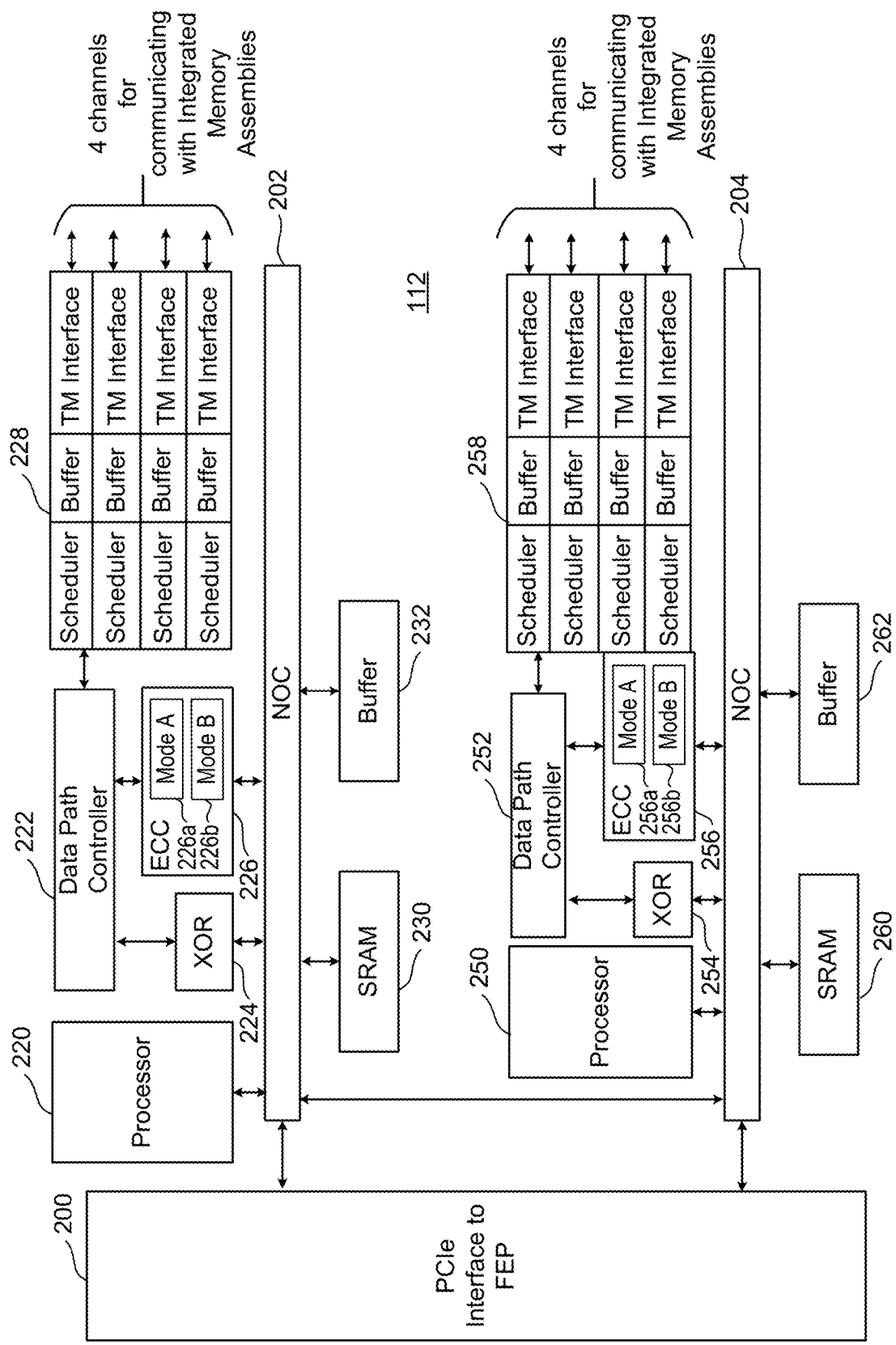
FIG. 3 is a block diagram of one embodiment of a Back End Processor circuit.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254), an ECC engine (226/256). The ECC engines 226/256 are used to perform error correction, as known in the art. Herein, the ECC engines 226/256 may be referred to as controller ECC engines.

The ECC engines 226/256 may encode data bytes received from the host, and may decode and error correct the data bytes read from the control die 304. In some embodiments, the ECC engines 226/256 calculate parity bits for each unit of data (e.g., page) that is being stored at one time. The parity bits (also referred to as an error correction code) may be stored with the unit of data (e.g., page). The combination of the unit of data and its associated parity bits are referred to as a codeword. In one embodiment, the parity bits are stored remotely from the unit of data (e.g., page).

In some embodiments, memory controller 102 does not send the entire codeword to an integrated memory assembly 104. Instead, memory controller 102 sends only the data bits, with a control die on the integrated memory assembly 104 generating the parity bits. Optionally, memory controller 102 could send the entire codeword. In some cases, a control die of the integrated memory assembly 104 does not send an entire codeword to memory controller 102. Instead, the control die decodes the codeword, and sends back only the data bits to memory controller 102. However, in some cases, the control die may be unable to successfully decode a codeword. In this case, the control die may send the entire codeword to memory controller 102, which uses ECC engines 226/256 to decode the codeword.

In some embodiments, the ECC engines have different modes, such as ECC mode A 226a/256a and ECC mode B 226b/256b. The two modes may differ in their resolution. In general, a higher resolution decoder is able to correct a higher number of bit errors. In one embodiment, the resolution refers to the number of bits in messages that are passed in an iterative message passing decoder. For example, the messages in ECC Mode B 226b/256b may have 6 bits, whereas the messages in ECC Mode A 226a/256a may have 3 bits. In some embodiments, using fewer bits in the messages (corresponding to a lower resolution) results in faster decoding. Using fewer bits in the messages may also consume less power. Further details of decoders having different resolutions are described in U.S. Pat. No. 10,218,384, entitled "ECC Decoder with Multiple Decode Modes," which is incorporated herein by reference.

The XOR engines 224/254 may be used to form redundancy information that is based on information from each codeword in a set of codewords. The redundancy information may be stored in one of the memory dies. This redundancy information may be used to recover the data bits for each of the codewords in the set. As one example, each codeword could be 4 kilobytes, each codeword may be for one page of data, and redundancy information may be formed from a bitwise XOR of each of the codewords. In one embodiment, the bitwise XOR has the same number of bits of each codeword.

Data path controller 222 is connected to a memory interface circuit 228 for communicating by way of four channels with integrated memory assemblies. Thus, the top NOC 202 is associated with memory interface circuit 228 for four channels for communicating with integrated memory assemblies and the bottom NOC 204 is associated with memory interface circuit 258 for four additional channels for communicating with integrated memory assemblies. In one embodiment, each memory interface circuit 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits. In other embodiments, the memory interface (an electrical circuit for communicating with memory dies) can be a different structure than depicted in FIG. 3. Additionally, memory controllers with structures different than FIGS. 2 and 3 can also be used with the technology described herein.

Figure 4:
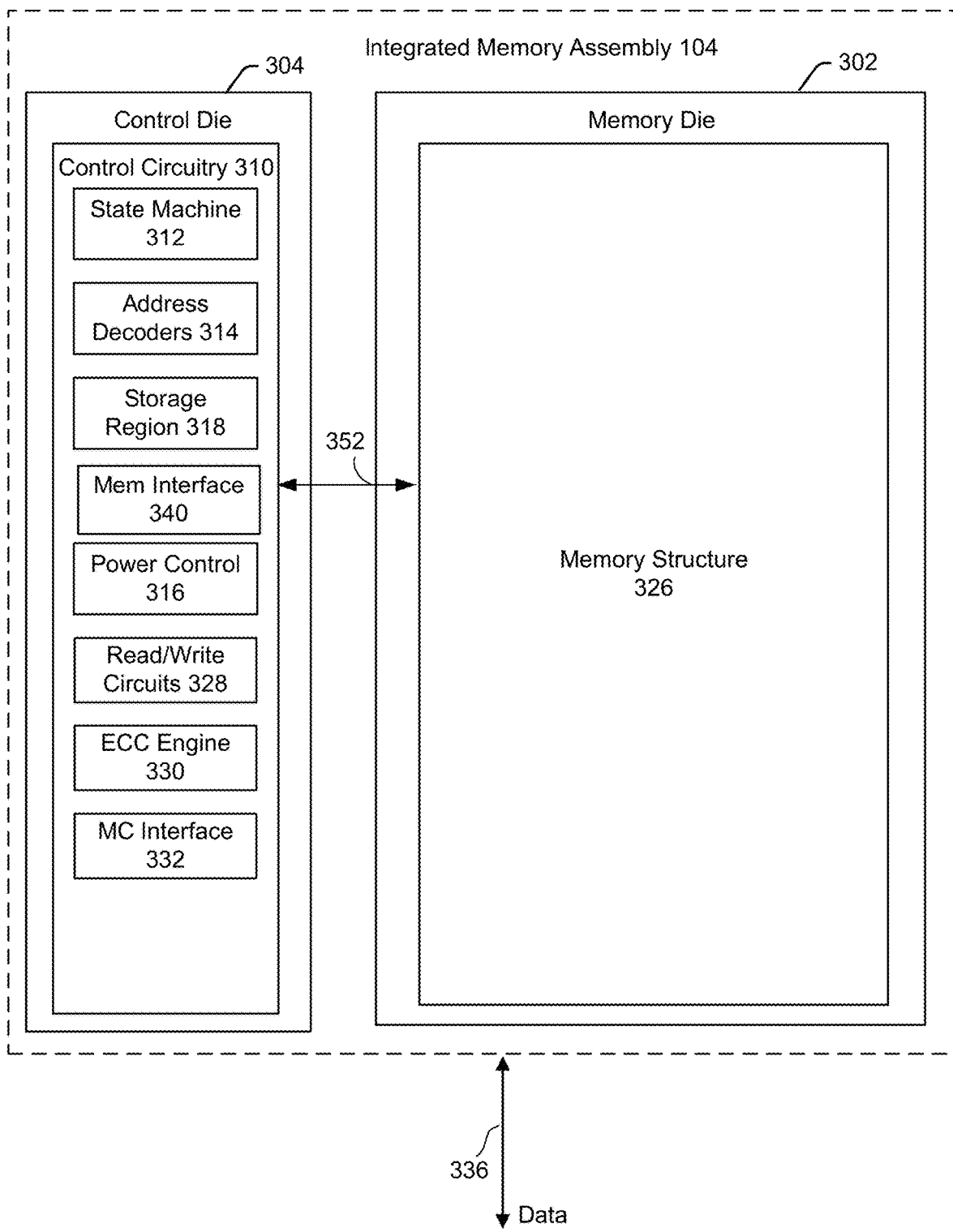
FIG. 4 is a functional block diagram of an integrated memory assembly.

FIG. 4 is a functional block diagram of one embodiment of an integrated memory assembly 104. In one embodiment, the integrated memory assembly 104 includes two semiconductor die: memory die 302 and control die 304. Memory die 302 includes include memory structure 326. Memory structure 326 includes non-volatile memory cells. Control die 304 includes control circuitry 310. In some embodiments, the memory die 302 and the control die 304 are directly bonded together, as will be described in more detail below. For purposes of this document, the phrase directly bonded refers to the memory die being bonded to the control die with no other die between the memory die and the control die.

Control circuitry 310 comprises a set of electrical circuits that perform memory operations (e.g., write, read, erase and others) on memory structure 326. Control circuitry 310 includes state machine 312, an on-chip address decoder 314, a power control circuit 316, storage region 318, read/write circuits 328, ECC engine 330, memory controller interface 332, and memory die interface 340. In another embodiment, a portion of the read/write circuits 328 are located on control die 304 and a portion of the read/write circuits 328 are located on memory die 302. For example, the read/write circuits 328 may contain sense amplifiers. In one embodiment, the sense amplifiers (for reading data from the memory die) are located on the control die 304. In one embodiment, the sense amplifiers are located on the memory die 302.

Herein, the term, "memory die," "memory semiconductor die," or the like, means a semiconductor die that contains non-volatile memory cells for storage of data. Herein, the term, "control die," "control semiconductor die," or the like, means a semiconductor die that contains control circuitry for performing memory operations on non-volatile memory cells on a memory die. Typically, numerous semiconductor die are formed from a single semiconductor (e.g., silicon) wafer.

State machine 312 is an electrical circuit that controls the operations performed by control die 304. In some embodiments, state machine 312 is implemented by or as a microprocessor, microcontroller and/or RISC processor.

Storage region 318 can be volatile memory (e.g., DRAM or SRAM) used to store software for programming a processor (e.g., the RISC processor used to implement or replace state machine 312) and for storing data (e.g., data for the decoding process and encoding process and operational parameters). In one embodiment, storage region 312 is implemented with SRAM or DRAM.

The on-chip address decoder 314 provides an address interface between addresses used by host 120 or memory controller 102 to the hardware address used by row decoders and column decoders (not expressly depicted in FIG. 4). Power control circuit 316 controls the power and voltages supplied to the word lines, bit lines, and select lines during memory operations. The power control circuit 316 includes voltage circuitry, in one embodiment. Power control circuit 316 may include charge pumps or other voltage sources for creating voltages. The power control circuit 316 executes under control of the state machine 312.

The read/write circuits 328 includes sense blocks (which may contain sense amplifies (SA), in some embodiments. The sense amplifies include bit line drivers, in some embodiments. The read/write circuits 328 executes under control of the state machine 312, in one embodiment. Each memory structure 326 is addressable by word lines by way of a row decoder (not depicted in FIG. 3A) and by bit lines by way of a column decoder (not depicted in FIG. 3A), in some embodiments.

The error correction code (ECC) engine 330 is a circuit configured to decode and error correct codewords. Herein, ECC engine 330 may be referred to as an on-die ECC engine. In one embodiment, the on-die ECC engine 330 is configured to encode data bits from memory controller 102 into codewords that contain the data bits and parity bits. The control circuitry stores the codewords in the memory structure 326. In one embodiment, the on-die ECC engine 330 is also configured to decode the codewords which are read from the memory structure 326. In some embodiments, if the on-die ECC engine 330 is successful at decoding a codeword, then the control die 304 only sends back the data bits to the memory controller 102. In some embodiments, if the on-die ECC engine 330 is not successful at decoding a codeword, then the memory controller ECC engine 226/256 may be used to decode the codeword.

In some embodiments, first the control die 304 attempts to decode a codeword using ECC engine 330. If decoding fails, the memory controller 102 may attempt to decode that codeword. In some embodiments, the memory controller 102 has multiple ECC modes. For example, ECC mode A 226A (see FIG. 3) may be used to attempt to decode a codeword that the control die 304 could not decode. If ECC Mode A 226a fails to decode the codeword, then ECC mode B 226b may be used by the memory controller 102. For example, the on-die ECC engine 330 may use a hard bit decoder to attempt to decode a codeword. Under typical conditions, hard bit decoding may be successful most of the time. In the event that the on-die ECC engine 330 fails to successfully decode the codeword, the codeword may be passed to memory controller 102. In one embodiment, memory controller 102 first attempts to decode using a soft bit decoder at one level of resolution. This first attempt may be made by ECC Mode A 226a. If the first attempt by memory controller 102 fails, then the memory controller may use a soft bit decoder at higher level of resolution. This second attempt may be made by ECC Mode B 226b. Note that the aforementioned hard bit decoder may use less power than the soft bit decoders. Hence, most of the time the decoding may be achieved using a low power decoder on the control die 304. None of the on-die ECC engine 330, ECC Mode A 226A, nor ECC Mode B 226b are limited to the foregoing examples.

In one embodiment, all or a subset of the circuits of control circuitry 310 can be considered one or more control circuits. The one or more control circuits can include hardware only (e.g., electrical circuits) or a combination of hardware and software (including firmware). For example, a controller programmed by firmware is one example of a control circuit. One or more control circuits can include a processor, PGA (Programmable Gate Array, FPGA (Field Programmable Gate Array), ASIC (Application Specific Integrated Circuit), microcontroller, integrated circuit or other type of circuit.

Memory interface 340 is an electrical interface between control die 304 and memory doe 302, employing pathways 352. Pathways 352 are pathways between one or more components in the control circuitry 310 and the memory structure on memory die 302. A portion of each pathway resides in memory die 302 and a portion of each pathway resides in control die 304. The term pathway may be used for a portion of pathways 352 that is entirely within one of the die. Thus, it may be stated that the memory die 302 has a first plurality of pathways and that the control die 304 has a second plurality of pathways such that the first plurality of pathways are directly connected to the second plurality of pathways (e.g., no intervening pathways). In one embodiment, the control die 304 and the memory die 302 are configured to transfer signals through pathway pairs of the first plurality of pathways and the second plurality of pathways. In some embodiments, the memory die 302 and the control die 304 are bonded to each other, or otherwise attached to each other, to facilitate signal transfer through the pathway pairs.

A pathway may be used to provide or receive a signal (e.g., voltage, current). A pathway includes an electrically conductive path. A pathway may include one or more of, but is not limited to, a bond pad, metal interconnect, via, transistor, electrically conducting material and other material that may transfer or carry an electrical signal. In one embodiment, pathways 352 allow the control circuitry 310 to provide voltages to word lines, select lines, and bit lines on memory die 302. Pathways 352 may be used to receive signals from, for example, bit lines. In one embodiment, there are about 100,000 pathways 352. However, there could be more or fewer than 100,000 pathways. Having such a large number of pathways 352 allows a very large amount of data, or other signals, to be passed in parallel.

Memory controller interface 332 is an electrical interface for communicating with memory controller 102. For example, memory controller interface 332 may implement a Toggle Mode Interface that connects to the Toggle Mode interfaces of memory interface circuit 228/258 for memory controller 102. In one embodiment, memory controller interface 332 includes a set of input and/or output (I/O) pins that connect to communication channel 336 (also refers to herein as a data bus). In one embodiment, communication channel 336 connects to the memory controller 102 as part of the Toggle Mode Interface. In one embodiment, a communication channel 336 of one integrated memory assembly 104 connects to another integrated memory assembly 104.

Memory interface 340 is significantly wider than memory controller interface 332 because memory interface 340 has significantly more signals than memory controller interface 332. Therefore, more data can be sent in parallel for memory interface 340 as compared to memory controller interface 332. In some examples, memory interface 340 is 4×, 10×, 20×, or 50× wider than memory controller interface 332.

Communication channel 336 is depicted as being connected to integrated memory assembly 104 for generality. Communication channel 336 may connect to either or both of die 302 and/or 304. In one embodiment, communication channel 336 connects memory controller 102 directly to control die 304. In one embodiment, communication channel 336 connects memory controller 102 directly to memory die 302. If communication channel 336 connects memory controller 102 directly to memory die 302, then pathway 352 may be used to allow communication between memory controller 102 and control circuitry 310.

In one embodiment, memory structure 326 comprises a monolithic three-dimensional memory array of non-volatile memory cells (e.g., flash memory) in which multiple memory levels are formed above a single substrate, such as a wafer. The memory structure may comprise any type of non-volatile memory that are monolithically formed in one or more physical levels of arrays of memory cells having an active area disposed above a silicon (or other type of) substrate. In one example, the non-volatile memory cells comprise vertical NAND strings with charge-trapping material.

In another embodiment, memory structure 326 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments disclosed herein. Other examples of suitable technologies for memory cells of the memory structure 326 include phase change memory ("PCM"), Magnetoresistive Random-Access Memory ("MRAM"), and the like. Examples of suitable technologies for memory cell architectures of the memory structure 326 include two-dimensional arrays, three-dimensional arrays, cross-point arrays, stacked two-dimensional arrays, vertical bit line arrays, and the like.

A person of ordinary skill in the art will recognize that the technology described herein is not limited to a single specific memory structure, but covers many relevant memory structures within the spirit and scope of the technology as described herein and as understood by one of ordinary skill in the art.

Although FIG. 4 depicts one control die 304 and one memory die 302 in an integrated memory assembly 104, there may be more than one control die 304 and more than one memory die 302 in an integrated memory assembly 104.

Figure 4A:
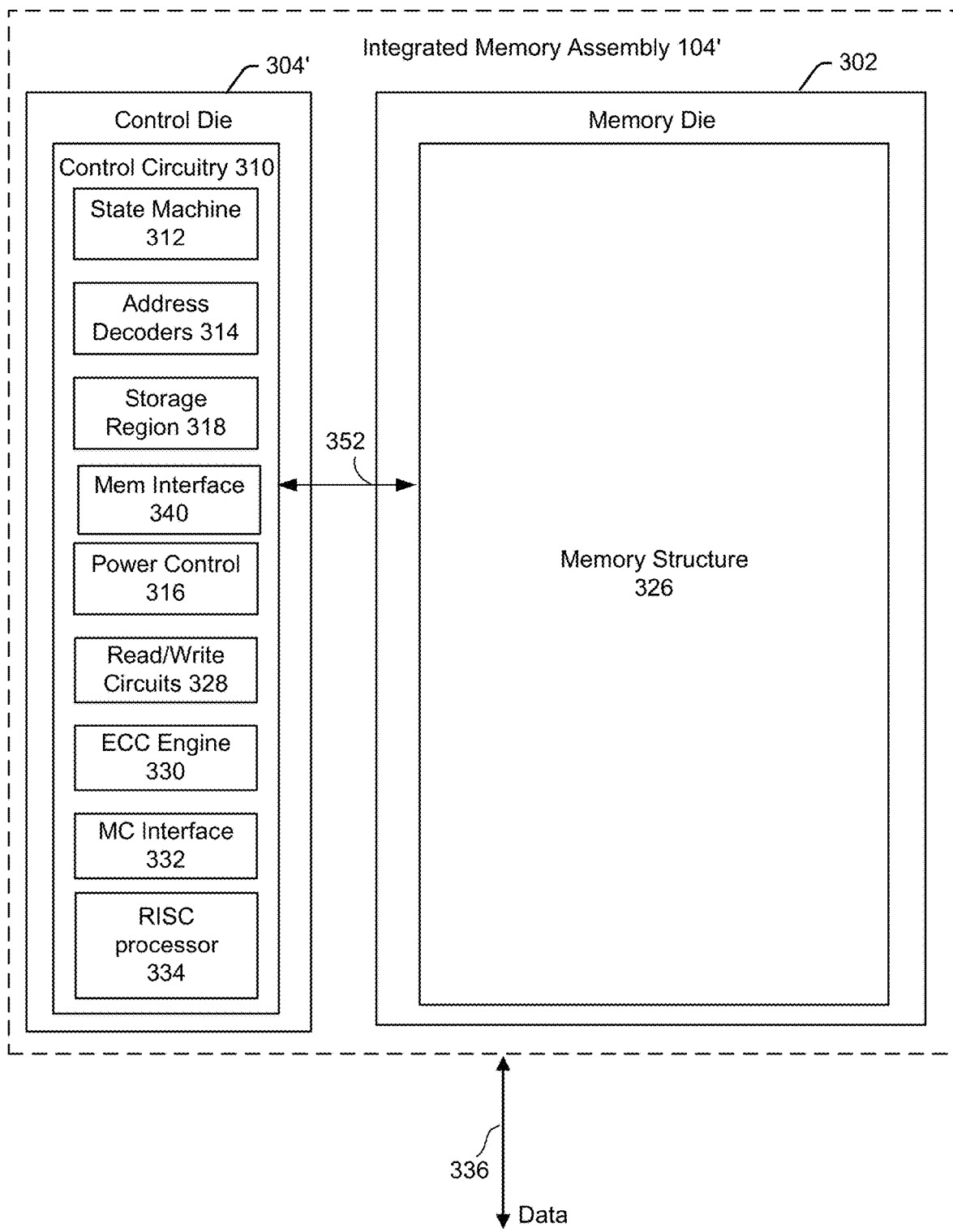
FIG. 4A is a functional block diagram of another embodiment of an integrated memory assembly.

FIG. 4A is a functional block diagram of another embodiment of an integrated memory assembly 104'. In one embodiment, the integrated memory assembly 104' includes two semiconductor die: memory die 302 and control die 304'. In one embodiment, control die 304' of FIG. 4A has the same components as control die 304 of FIG. 4 plus an additional RISC processor 334. RISC processor 334 provides additional computing resources so that control die 304' has more computing resources to perform more complex compute tasks than control die 304 of FIG. 4. Thus, FIGS. 4 and 4A depict integrated assemblies with different amounts of compute resources. In some alternative embodiments, additional RISC processor 334 can be replaced by a different type of processor as a RISC processor is just one example and no particular type of processor is required.

Figure 4B:
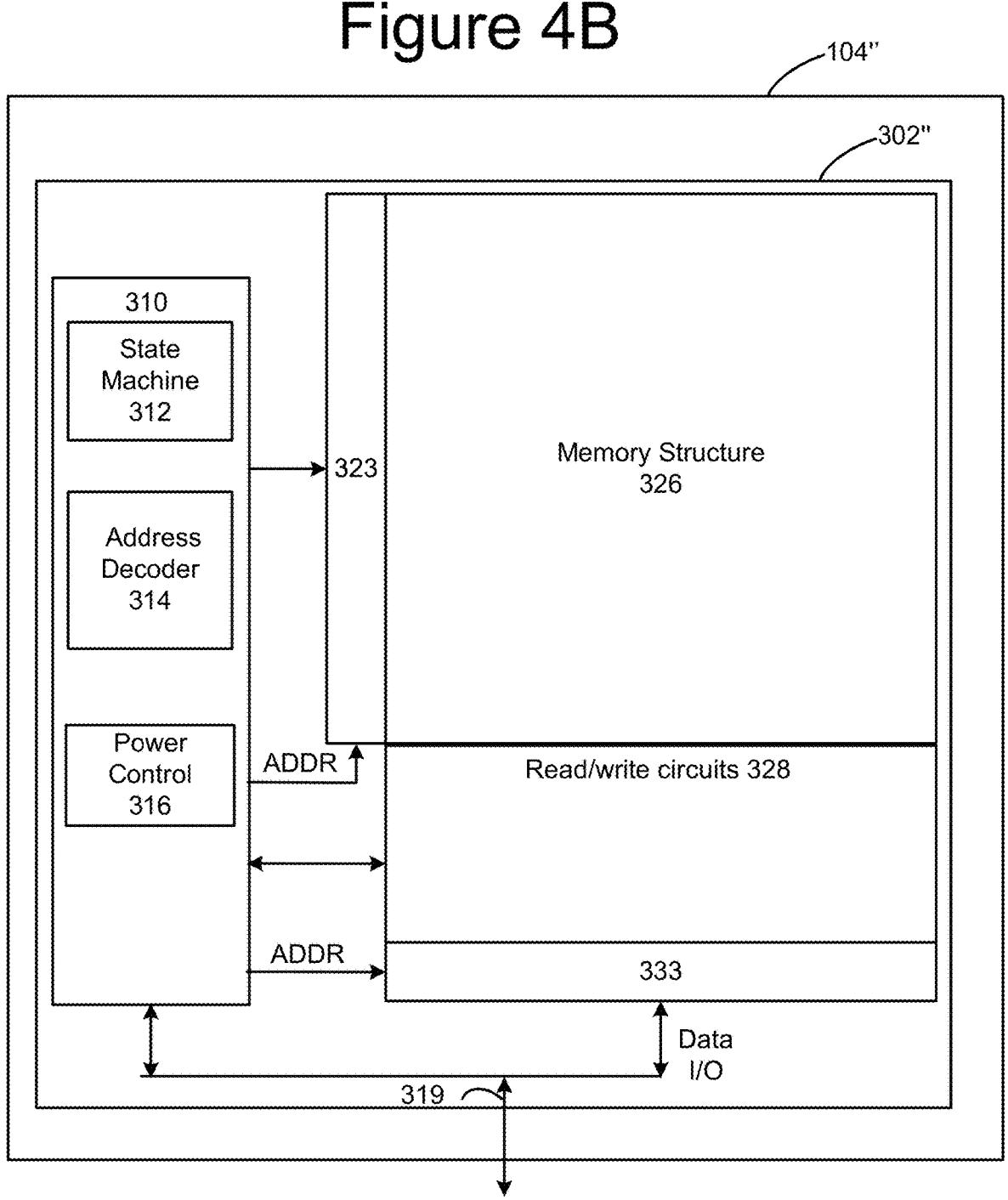
FIG. 4B also is a functional block diagram of another embodiment of an integrated memory assembly.

FIG. 4B is a functional block diagram of another embodiment of an integrated memory assembly 104". In one embodiment, the integrated memory assembly 104" includes one semiconductor die: memory die 302". integrated memory assembly 104" does not include a control die; therefore, some of the control circuits are included on the memory die 302" including state machine 312, address decoder 314, power control circuit 316 and read/write circuits 328. FIG. 4B also shows memory structure 326 being addressable by word lines via a row decoder 323 and by bit lines via a column decoder 333. Integrated memory assembly 104" has less computing resources to perform compute tasks than. integrated memory assembly 104 of FIG. 4 or integrated memory assembly 104' of FIG. 4A. In some embodiments, integrated memory assembly 104" has no computing resources to perform compute tasks. Thus, FIGS. 4, 4A and 4B depict integrated memory assemblies having different amounts of computing resources to perform compute tasks. For purposes of this document, the "compute tasks" referred to herein are tasks performed on or with data other than writing and reading data. Examples include searching through data, analyzing data (e.g., machine learning), transforming data, and other processes. Examples will be provided below.

Figure 5:
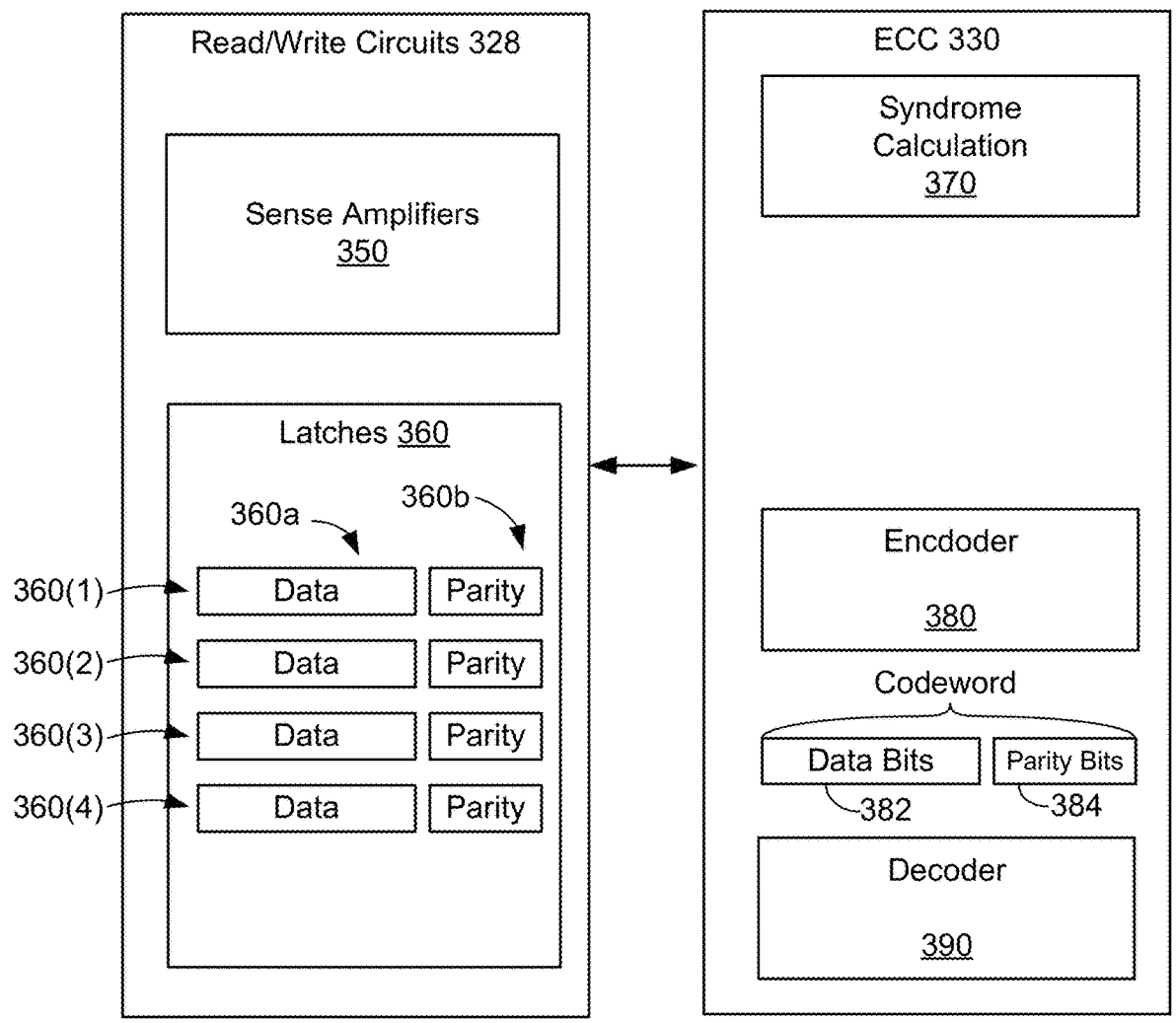
FIG. 5 is a block diagram of one embodiment of a read/write circuit and ECC circuit of an integrated memory assembly.

FIG. 5 is a block diagram of one embodiment of the read/write circuits 328 and ECC engine 330 of the control die 304. The read/write circuits 328 have sense amplifiers 350 and latches 360. The latches 360 may include data latches 360*a* and parity latches 360*b*. In one embodiment, the data latches 360a store data bits of the codeword and the parity latches store parity bits of the codeword. It is not required that there be specific latches for data bits and for parity bits. FIG. 5 depicts four sets of data latches 360(1), 360(2), 360(3), 360(4). Each set may be used to store a codeword for a different page. In an embodiment in which four bits are stored per memory cell, four pages are stored in a set of memory cells. The four pages may be referred to as a lower page (LP), lower-middle page (LMP), upper-middle page (UMP), and an upper page (UP). In an embodiment in which three bits are stored per memory cell, three pages are stored in a set of memory cells and the four pages may be referred to as a lower page (LP), middle page (MP), and an upper page (UP). In another embodiment, the sense amplifiers 350 are on the memory die 302, but the latches 360 remain on the control die 304.

The on-die ECC engine 330 is able to encode data bits received from memory controller 102. In one embodiment, the on-die ECC engine 330 forms codewords that each contain data bits and parity bits. In one embodiment, memory controller 102 provides the codewords to the control die 304. Control circuitry 310 stores the codewords into non-volatile memory cells in the memory structure 326. Upon a request from memory controller 102 to read data, control circuitry 310 reads codewords from memory structure 326. The on-die ECC engine 330 is also able to decode and error correct the codewords read from the memory structure 326. In some embodiments, the on-die ECC engine 330 calculates parity bits for each unit of data (e.g., page) that is being stored. The parity bits (also referred to as an error correction code or error correction information) may be stored with the unit of data (e.g., page). The combination of the unit of data and its associated parity bits are referred to as a codeword. In one embodiment, the parity bits are stored remotely from the unit of data (e.g., page).

In an embodiment, upon successfully decoding a codeword, the control die 304 sends only the data bits, but not the parity bits, to memory controller 102. Therefore, bandwidth over communication lines between memory controller 102 and the integrated memory assembly 104 is saved. Also, substantial power may be saved. For example, the interface between the control die and the controller could be a high speed interface.

The on die ECC engine 330 includes syndrome calculation logic 370, an encoder 380, and a decoder 390. The encoder 380 is configured to encode data using an ECC scheme, such as a low-density parity check (LDPC) encoder, a Reed Solomon encoder, a Bose-Chaudhuri-Hocquenghem (BCH) encoder, a Turbo Code encoder, an encoder configured to encode one or more other ECC encoding schemes, or any combination thereof. The encoder 380 may form a codeword, which contains data bits 382 and parity bits 384. The data bits may be provided by memory controller 102.

Based on the bits in the latches 360, the sense amplifiers 350 may control bit line voltages in the memory structure 326 when the non-volatile memory cells are being programmed. In this manner, the codewords may be programmed into non-volatile memory cells in the memory structure 326. It will be appreciated that other voltages may also be applied to the memory structure 326, such applying a program voltage to memory cells that are selected for programming by a voltage generator on control die 304 applying the program voltage and boosting voltages to various word lines of memory structure 326.

Decoder 390 is configured to decode the codewords that were stored in the memory die 302. In one embodiment, sense amplifiers 350 sense bit lines in the memory structure 326 in order to read a codeword. The sense amplifiers 350 may store the read codeword into latches 360. The decoder 390 is able to detect and correct errors in the codeword. In one embodiment, the decoder 390 is a relatively low power decoder, as compared to a decoder on memory controller 102. In one embodiment, the decoder on memory controller 102 is able to correct more bit errors in the codeword than can typically be corrected by decoder 390. Thus, decoder 390 may provide a power versus error correction capability tradeoff. For example, decoder 390 may be very efficient with respect to power consumption, but at the expense of possibly not being able to correct a high number of errors in a codeword.

In one embodiment, the decoder 390 implements a hard bit decoder. In another embodiment, the decoder 390 implements a soft bit decoder. Alternatively, decoder 390 may implement both a hard bit decoder and a soft bit decoder. For example, the control die 304 may first attempt to decode a codeword with the hard bit decoder. If that fails, then the control die 304 may attempt to decode using the soft bit decoder.

In some embodiments, the decoder 390 is based on a sparse bipartite graph having bit (or variable) nodes and check nodes. The decoder 390 may pass messages between the bit nodes and the check nodes. Passing a message between a bit node and a check node is accomplished by performing a message passing computation. The message passing computation may be based on belief propagation.

Syndrome calculation logic 370 (e.g., an electrical circuit and/or software) is able to determine a syndrome weight for codewords. The syndrome weight refers to the number of parity check equations that are unsatisfied. The initial syndrome weight of a codeword may correlate with the bit error rate (BER) of that codeword. Thus, the control die 304 may estimate a BER for a codeword based on the initial syndrome weight. In one embodiment, the syndrome logic is implemented in hardware. The syndrome weight can be determined without fully decoding a codeword. Hence, the initial syndrome weight can be calculated in less time and with less power than for decoding a codeword. In some embodiments, the control die 304 makes management decisions based on the estimated BER. For example, the control die 304 may determine what technique should be used to decode a codeword, what read reference voltages should be used to read memory cells, etc. based on the estimated BER.

Figures 6A, 6B:
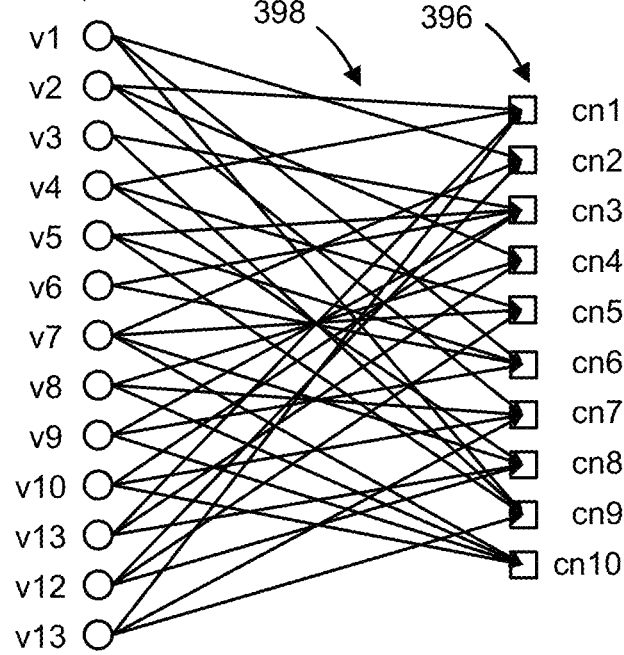
FIG. 6A depicts an example of a sparse parity check matrix.
FIG. 6B depicts a sparse bipartite graph which corresponds to the sparse parity check matrix of FIG. 6A.

In one embodiment, on-die ECC engine 330 uses a sparse parity check matrix. FIG. 6A depicts an example of a sparse parity check matrix H (which may also be represented as a sparse bipartite graph). The matrix includes M rows and K+M columns, which are in correspondence with K information bits and M parity bits in each codeword of length N=K+M. Further, the parity bits are defined such that M parity check equations are satisfied, where each row of the matrix represents a parity check equation.

FIG. 6B depicts a sparse bipartite graph 392 which corresponds to the sparse parity check matrix of FIG. 6A. Specifically, the code can be defined by a sparse bipartite graph G=(V,C,E) with a set V of N bit nodes 394 (N=13 in this example), a set C of M check nodes 396 (M=10 in this example) and a set E (E=38 in this example) of edges 398 connecting bit nodes 394 to check nodes 396. The bit nodes correspond to the codeword bits and the check nodes correspond to parity-check constraints on the bits. A bit node 394 is connected by edges 398 to the check nodes 396 it participates in.

During decoding, one embodiment of the decoder 390 attempts to satisfy the parity checks. In this example, there are ten parity checks, as indicated by the check nodes cn1 through cn10. The first parity check at cn1 determines if $v2 \oplus v4 \oplus v11 \oplus v13=0$, where "$\oplus$" denotes the exclusive-or (XOR) logical operation. This check is satisfied if there is an even number of "1" in bits corresponding to variable nodes v2, v4, v11 and v13. This check is denoted by the fact that arrows from variable nodes v2, v4, v11 and v13 are connected to check node cn1 in the bi-partite graph. The second parity check at cn2 determines if $v1 \oplus v7 \oplus v12=0$, the third parity check at cn3 determines if $v3 \oplus v5 \oplus v6 \oplus v9 \oplus v10=0$, the fourth parity check at cn4 determines if $v2 \oplus v8 \oplus v11=0$, the fifth parity check at cn5 determines if $v4 \oplus v7 \oplus v12=0$, the sixth parity check at cn6 determines if $v1 \oplus v5 \oplus v6 \oplus v9=0$, the seventh parity check at cn7 determines if $v2 \oplus v8 \oplus v10 \oplus v13=0$, the eighth parity check at cn8 determines if $v4 \oplus v7 \oplus v11 \oplus v12=0$, the ninth parity check at cn9 determines if $v1 \oplus v3 \oplus v5 \oplus v13=0$ and the tenth parity check at cn10 determines if $v7 \oplus v8 \oplus v9 \oplus v10=0$.

In one embodiment, the decoder 390 uses an iterative probabilistic decoding process involving iterative message passing decoding algorithms. These algorithms operate by exchanging messages between bit nodes and check nodes over the edges of the underlying bipartite graph representing the code.

The decoder 390 may be provided with initial estimates of the codeword bits (based on the content that is read from the memory structure 326). These initial estimates may be refined and improved by imposing the parity-check constraints that the bits should satisfy as a valid codeword. This may be done by exchanging information between the bit nodes representing the codeword bits and the check nodes representing parity-check constraints on the codeword bits, using the messages that are passed along the graph edges.

FIG. 7 is a block diagram depicting one embodiment of a sense block 450. The sense block is part of the read/write circuits 328. An individual sense block 450 is partitioned into one or more core portions, referred to as sense circuits or sense amplifiers 350(1)-350(4), and a common portion, referred to as a managing circuit 480. In one embodiment, there will be a separate sense circuit for each bit line/NAND string and one common managing circuit 480 for a set of multiple, e.g., four or eight, sense circuits. Each of the sense circuits in a group communicates with the associated managing circuit by way of data bus 454. Thus, there are one or more managing circuits which communicate with the sense circuits of a set of storage elements (memory cells).

The sense amplifier 350(1), as an example, comprises sense circuitry 460 that performs sensing by determining whether a conduction current in a connected bit line is above or below a predetermined threshold level. The sensing can occur in a read or verify operation. The sense circuit also supplies a bit line voltage during the application of a program voltage in a program operation (e.g., write operation).

The sense circuitry 460 may include a Vbl selector 462, a sense node 464, a comparison circuit 466 and a trip latch 468. During the application of a program voltage, the Vbl selector 462 can pass a program enable voltage (e.g., V_pgm_enable) or a program-inhibit voltage (e.g., Vbl_inh) to a bit line connected to a memory cell. The Vbl selector 462 can also be used during sensing operations. Herein, a "program enable voltage" is defined as a voltage applied to a memory cell that enables programming of the memory cell while a program voltage (e.g., Vpgm) is also applied to the memory cell. In certain embodiments, a program enable voltage is applied to a bit line coupled to the memory cell while a program voltage is applied to a control gate of the memory cell. Herein, a "program inhibit voltage" is defined as a voltage applied to a bit line coupled to a memory cell to inhibit programming of the memory cell while a program voltage (e.g., Vpgm) is also applied to the memory cell (e.g., applied to the control gate of the memory cell). Note that boosting voltages (e.g., Vpass) may be applied to unselected word lines along with the program inhibit voltage applied to the bit line. The bit lines are part of memory structure 326 on memory die 302.

Program inhibit voltages are applied to bit lines coupled to memory cells that are not to be programmed and/or bit lines having memory cells that have reached their respective target threshold voltage through execution of a programming process. These may be referred to as "unselected bit lines." Program inhibit voltages are not applied to bit lines ("selected bit lines") having a memory cell to be programmed. When a program inhibit voltage is applied to an unselected bit line, the bit line is cut off from the NAND channel, in one embodiment. Hence, the program inhibit voltage is not passed to the NAND channel, in one embodiment. Boosting voltages are applied to unselected word lines to raise the potential of the NAND channel, which inhibits programming of a memory cell that receives the program voltage at its control gate.

A transistor 470 (e.g., an nMOS) can be configured as a pass gate to pass Vbl from the Vbl selector 462, by setting the control gate voltage of the transistor sufficiently high, e.g., higher than the Vbl passed from the Vbl selector. For example, a selector 472 may pass a power supply voltage Vdd, e.g., 3-4 V to the control gate of the transistor 470.

The sense amplifier 350(1) is configured to control the timing of when the voltages are applied to the bit line. During sensing operations such as read and verify operations, the bit line voltage is set by the transistor 470 based on the voltage passed by the selector 472. The bit line voltage is roughly equal to the control gate voltage of the transistor minus its Vt (e.g., 3 V). For example, if Vbl+Vt is passed by the selector 472, the bit line voltage will be Vbl. This assumes the source line is at 0 V. The transistor 470 clamps the bit line voltage according to the control gate voltage and acts as a source-follower rather than a pass gate. The Vbl selector 462 may pass a relatively high voltages such as Vdd which is higher than the control gate voltage on the transistor 470 to provide the source-follower mode. During sensing, the transistor 470 thus charges up the bit line.

In one approach, the selector 472 of each sense amplifier can be controlled separately from the selectors of other sense amplifiers, to pass Vbl or Vdd. The Vbl selector 462 of each sense amplifier can also be controlled separately from the Vbl selectors of other sense amplifiers.

During sensing, the sense node 464 is charged up to an initial voltage such as Vsense init=3 V. The sense node is then connected to the bit line by way of the transistor 470, and an amount of decay of the sense node is used to determine whether a memory cell is in a conductive or non-conductive state. In one embodiment, a current that flows in the bot line discharges the sense node (e.g., sense capacitor). The length of time that the sense node is allowed to decay may be referred to herein as an "integration time." The comparison circuit 466 is used to compare the sense node voltage to a trip voltage at a sense time. If the sense node voltage decays below the trip voltage Vtrip, the memory cell is in a conductive state and its Vt is at or below the voltage of the verification signal. If the sense node voltage does not decay below Vtrip, the memory cell is in a non-conductive state and its Vt is above the voltage of the verification signal. The sense amplifier 350(1) includes a trip latch 468 that is set by the comparison circuit 466 based on whether the memory cell is in a conductive or non-conductive state. The data in the trip latch can be a bit which is read out by the processor 482.

The managing circuit 480 comprises a processor 482, four example sets of data latches 484, 485, 486, 487 and an I/O Interface 488 coupled between the sets of data latches and data bus 332 (data bus may connect to memory controller 102). One set of data latches, e.g., comprising individual latches LDL, LMDL, UMDL, and UDL, can be provided for each sense amplifier. In some cases, fewer or additional data latches may be used. LDL stores a bit for a lower page of data, LMDL stores a bit for a lower-middle page of data, UMDL stores a bit for an upper-middle page of data, and UDL stores a bit for an upper page of data. This is in a sixteen level or four bits per memory cell memory device. In one embodiment, there are eight levels or three bits per memory cell and, therefore, only three latches (LDL, MDL, UDL) per sense amplifier.

The processor 482 performs computations, such as to determine the data stored in the sensed memory cell and store the determined data in the set of data latches. Each set of data latches 484-487 is used to store data bits determined by processor 482 during a read operation, and to store data bits imported from the data bus 332 during a program operation which represent write data meant to be programmed into the memory. I/O interface 488 provides an interface between data latches 484-487 and the data bus 332.

The processor 482 may also be used to determine what voltage to apply to the bit line, based on the state of the latches.

During reading, the operation of the system is under the control of state machine 312 that controls the supply of different control gate voltages to the addressed memory cell (e.g., by applying voltages from power control 316 to word lines on the memory structure 326 by way of the pathways between control die 304 and memory die 302 discussed herein). As it steps through the various predefined control gate voltages corresponding to the various memory states supported by the memory, the sense circuit may trip at one of these voltages and a corresponding output will be provided from sense circuit to processor 482 by way of the data bus 454. At that point, processor 482 determines the resultant memory state by consideration of the tripping event(s) of the sense circuit and the information about the applied control gate voltage from the state machine by way of input lines 490. It then computes a binary encoding for the memory state and stores the resultant data bits into data latches 484-487.

Some implementations can include multiple processors 482. In one embodiment, each processor 482 will include an output line (not depicted) such that each of the output lines is wired-OR'd together. In some embodiments, the output lines are inverted prior to being connected to the wired-OR line. This configuration enables a quick determination during a program verify test of when the programming process has completed because the state machine receiving the wired-OR can determine when all bits being programmed have reached the desired level. For example, when each bit has reached its desired level, a logic zero for that bit will be sent to the wired-OR line (or a data one is inverted). When all bits output a data 0 (or a data one inverted), then the state machine knows to terminate the programming process. Because (in one embodiment) each processor communicates with four sense amplifiers, the state machine needs to read the wired-OR line four times, or logic is added to processor 482 to accumulate the results of the associated bit lines such that the state machine need only read the wired-OR line one time. Similarly, by choosing the logic levels correctly, the global state machine can detect when the first bit changes its state and change the algorithms accordingly.

During program or verify operations for memory cells, the data to be programmed (write data) is stored in the set of data latches 484-487 from the data bus 332, in the LDL, LMDL, UMDL, and UDL latches, in a four-bit per memory cell implementation.

The program operation, under the control of the state machine, applies a set of programming voltage pulses to the control gates of the addressed memory cells. Each voltage pulse may be stepped up in magnitude from a previous program pulse by a step size in a process referred to as incremental step pulse programming. Each program voltage is followed by a verify operation to determine if the memory cells has been programmed to the desired memory state. In some cases, processor 482 monitors the read back memory state relative to the desired memory state. When the two are in agreement, the processor 482 sets the bit line in a program inhibit mode such as by updating its latches. This inhibits the memory cell coupled to the bit line from further programming even if additional program pulses are applied to its control gate.

Each set of data latches 484-487 may be implemented as a stack of data latches for each sense amplifier. In one embodiment, there are three data latches per sense amplifier 350. In some implementations, the data latches are implemented as a shift register so that the parallel data stored therein is converted to serial data for data bus 332, and vice versa. All the data latches corresponding to the read/write block of memory cells can be linked together to form a block shift register so that a block of data can be input or output by serial transfer. In particular, the bank of read/write circuits is adapted so that each of its set of data latches will shift data in to or out of the data bus in sequence as if they are part of a shift register for the entire read/write block.

The data latches identify when an associated memory cell has reached certain milestones in a program operation. For example, latches may identify that a memory cell's Vt is below a particular verify voltage. The data latches indicate whether a memory cell currently stores one or more bits from a page of data. For example, the LDL latches can be used to store a lower page of data. An LDL latch is flipped (e.g., from 0 to 1) when a lower page bit is stored in an associated memory cell. An LMDL, UMDL or UDL latch is flipped when a lower-middle, upper-middle or upper page bit, respectively, is stored in an associated memory cell. This occurs when an associated memory cell completes programming.

Figure 8:
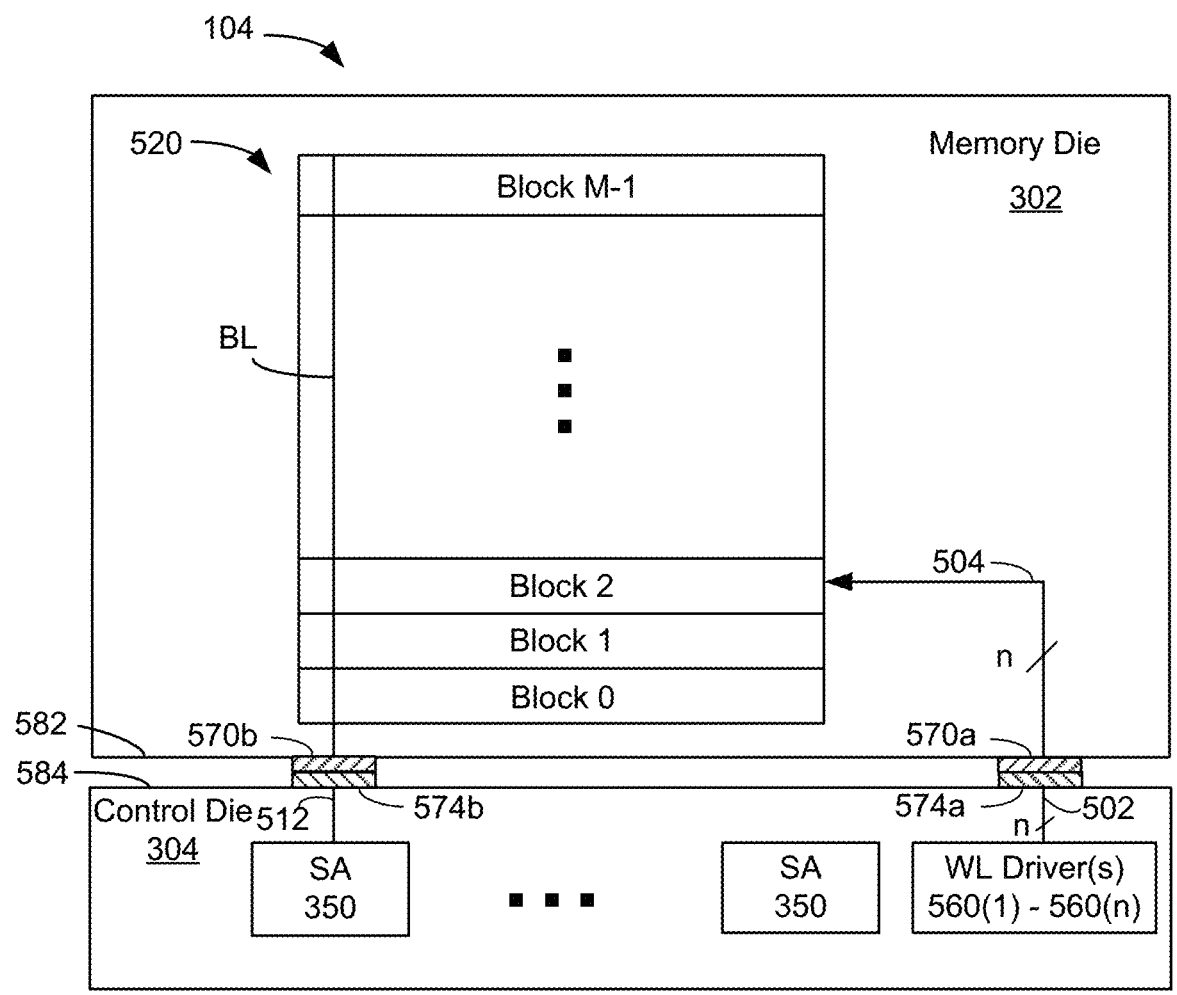
FIG. 8 is a block diagram of one embodiment of an integrated memory assembly.

FIG. 8 is a block diagram of one embodiment of an integrated memory assembly 104. FIG. 8 depicts further details of one embodiment of the integrated memory assembly 104 of FIGS. 1 and 4. Memory die 302 contains a plane 520 of memory cells. The memory die 302 may have additional planes. The plane is divided into M blocks. In one example, each plane has about 1040 blocks. However, different numbers of blocks can also be used. In one embodiment, a block comprising memory cells is a unit of erase. That is, all memory cells of a block are erased together. In one embodiment, the block is the unit of erase. However, other embodiments can utilize other units of erase. In other embodiments, memory cells can be grouped into blocks for other reasons, such as to organize the memory structure 326 to enable the signaling and selection circuits. One representative bit line (BL) is depicted for each plane. There may be thousand or tens of thousands of such bit lines per each plane. Each block may be divided into a number of word lines, as will be described more fully below. In one embodiment, a block represents a groups of connected memory cells as the memory cells of a block share a common set of unbroken word lines and unbroken bit lines. In the structure of FIG. 8, Block 0 and Block M-1 of plane 520 are at the edges of the memory structure (or otherwise referred to as being located in an edge region/section of the memory structure).

Control die 304 includes a number of sense amplifiers (SA) 350. Each sense amplifier 350 is connected to one bit line. The sense amplifier contains a bit line driver. Thus, the sense amplifier may provide a voltage to the bit line to which it is connected. The sense amplifier is configured to sense a condition of the bit line. In one embodiment, the sense amplifier is configured to sense a current that flows in the bit line. In one embodiment, the sense amplifier is configured to sense a voltage on the bit line.

The control die 304 includes a number of word line drivers 560(1)-560(n). The word line drivers 560 are configured to provide voltages to word lines. In this example, there are "n" word lines per block of memory cells. In one embodiment, one of the blocks in the plane 520 is selected at a time for a memory array operation. If the memory operation is a program or read, one word line within the selected block is selected for the memory operation, in one embodiment. If the memory operation is an erase, all of the word lines within the selected block are selected for the erase, in one embodiment. The word line drivers 560 (e.g. part of Power Control 316) provide voltages to the word lines in a first selected block (e.g., Block 2) in memory die 302. The control die 304 may also include charge pumps, voltage generators, and the like, which may be used to provide voltages for the word line drivers 560 and/or the bit line drivers.

The memory die 302 has a number of bond pads 570a, 570b on a first major surface 582 of memory die 302. There may be "n" bond pads 570a, to receive voltages from a corresponding "n" word line drivers 560(1)-560(n). There may be one bond pad 570b for each bit line associated with plane 520. The reference numeral 570 will be used to refer in general to bond pads on major surface 582.

In some embodiments, each data bit and each parity bit of a codeword are transferred through a different bond pad pair 570b, 574b. The bits of the codeword may be transferred in parallel over the bond pad pairs 570b, 574b. This provides for a very efficient data transfer relative to, for example, transferring data between the memory controller 102 and the integrated memory assembly 104. For example, the data bus between the memory controller 102 and the integrated memory assembly 104 may, for example, provide for eight, sixteen, or perhaps 32 bits to be transferred in parallel. However, the data bus between the memory controller 102 and the integrated memory assembly 104 is not limited to these examples.

The control die 304 has a number of bond pads 574a, 574b on a first major surface 584 of control die 304. There may be "n" bond pads 574a, to deliver voltages from a corresponding "n" word line drivers 560(1)-560(n) to memory die 302a. There may be one bond pad 574b for each bit line associated with plane 520. The reference numeral 574 will be used to refer in general to bond pads on major surface 582. Note that there may be bond pad pairs 570a/574a and bond pad pairs 570b/574b. In some embodiments, bond pads 570 and/or 574 are flip-chip bond pads.

In one embodiment, the pattern of bond pads 570 matches the pattern of bond pads 574. Bond pads 570 are bonded (e.g., flip chip bonded) to bond pads 574. Thus, the bond pads 570, 574 electrically and physically couple the memory die 302 to the control die 304. Also, the bond pads 570, 574 permit internal signal transfer between the memory die 302 and the control die 304. Thus, the memory die 302 and the control die 304 are bonded together with bond pads. Although FIG. 5A depicts one control die 304 bonded to one memory die 302, in another embodiment one control die 304 is bonded to multiple memory dies 302.

Herein, "internal signal transfer" means signal transfer between the control die 304 and the memory die 302. The internal signal transfer permits the circuitry on the control die 304 to control memory operations in the memory die 302. Therefore, the bond pads 570, 574 may be used for memory operation signal transfer. Herein, "memory operation signal transfer" refers to any signals that pertain to a memory operation in a memory die 302. A memory operation signal transfer could include, but is not limited to, providing a voltage, providing a current, receiving a voltage, receiving a current, sensing a voltage, and/or sensing a current.

The bond pads 570, 574 may be formed for example of copper, aluminum and alloys thereof. There may be a liner between the bond pads 570, 574 and the major surfaces (582, 584). The liner may be formed for example of a titanium/titanium nitride stack. The bond pads 570, 574 and liner may be applied by vapor deposition and/or plating techniques. The bond pads and liners together may have a thickness of 720 nm, though this thickness may be larger or smaller in further embodiments.

Metal interconnects and/or vias may be used to electrically connect various elements in the dies to the bond pads 570, 574. Several conductive pathways, which may be implemented with metal interconnects and/or vias are depicted. For example, a sense amplifier 350 may be electrically connected to bond pad 574b by pathway 512. There may be thousands of such sense amplifiers, pathways, and bond pads. Note that the BL does not necessarily make direct connection to bond pad 570b. The word line drivers 560 may be electrically connected to bond pads 574a by pathways 502. Note that pathways 502 may comprise a separate conductive pathway for each word line driver 560(1)-560(n). Likewise, there may be a separate bond pad 574a for each word line driver 560(1)-560(n). The word lines in block 2 of the memory die 302 may be electrically connected to bond pads 570a by pathways 504. In FIG. 8, there are "n" pathways 504, for a corresponding "n" word lines in a block. There may be a separate pair of bond pads 570a, 574a for each pathway 504.

Figure 9:
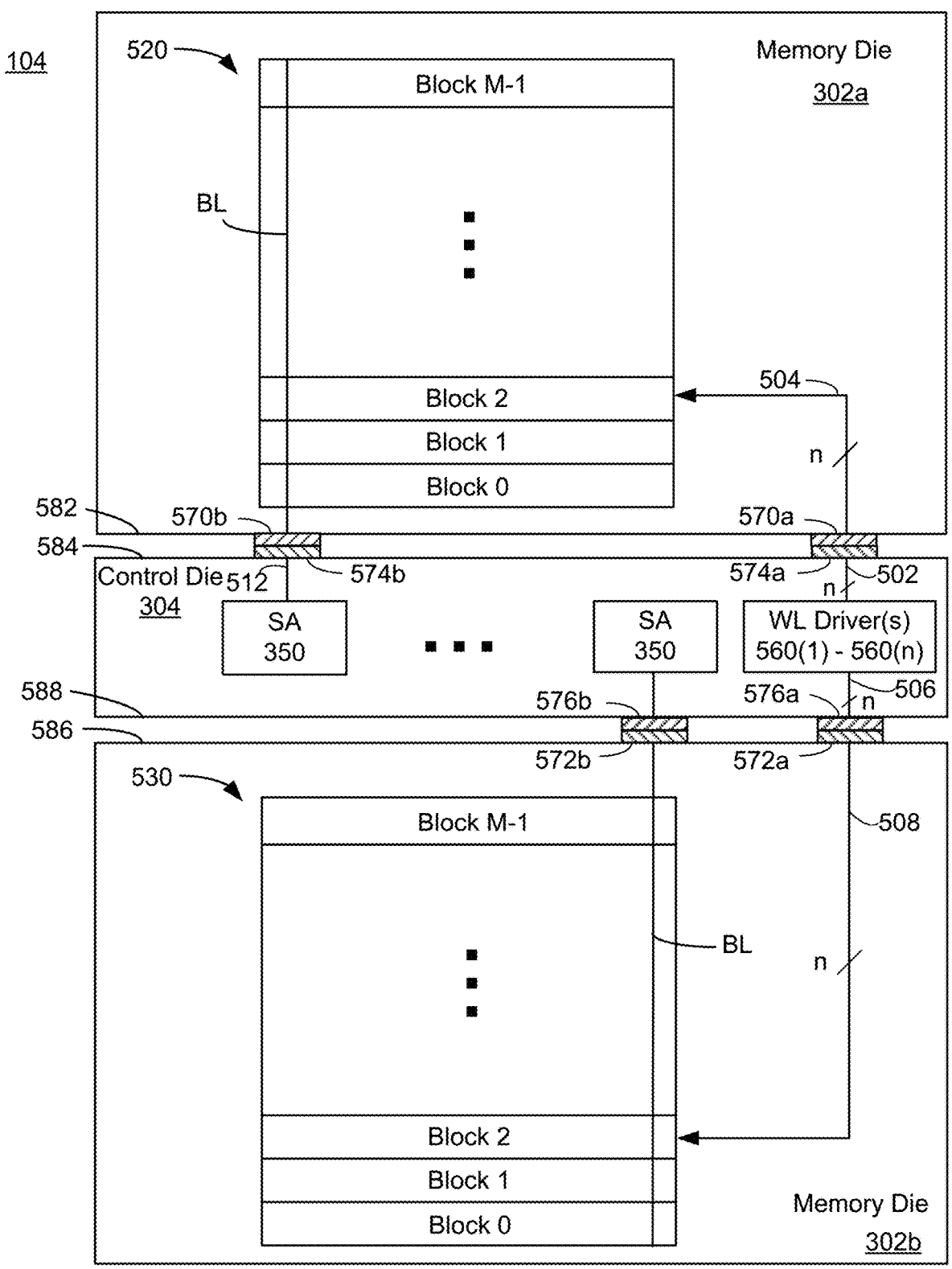
FIG. 9 is a block diagram of one embodiment of an integrated memory assembly in which a control die controls two memory dies.

FIG. 9 depicts another embodiment of an integrated memory assembly 104 in which one control die 304 may be used to control two memory die 302a, 302b. The control die 304 has a number of a number of bond pads 574(a), 574(b) on a first major surface 584, as discussed in connection with FIG. 8. The control die 304 has a number of a number of bond pads 576(a), 576(b) on a second major surface 588. There may be "n" bond pads 576(a) to deliver voltages from a corresponding "n" word line drivers 560(1)-560(n) to memory die 302b. The word line drivers 560 may be electrically connected to bond pads 576a by pathways 506. There may be one bond pad 576b for each bit line associated with plane 530 on memory die 302b. The reference numeral 576 will be used to refer in general to bond pads on major surface 588.

The second memory die 302b has a number of bond pads 572(a), 572(b) on a first major surface 586 of second memory die 302b. There may be "n" bond pads 572(a), to receive voltages from a corresponding "n" word line drivers 560(1)-560(n). The word lines in plane 530 may be electrically connected to bond pads 572a by pathways 508. There may be one bond pad 572(b) for each bit line associated with plane 530. The reference numeral 572 will be used to refer in general to bond pads on major surface 586. Note that there may be bond pad pairs 572(a)/576(a) and bond pad pairs 572(b)/576(b). In some embodiments, bond pads 572 and/or 576 are flip-chip bond pads.

In an embodiment, the "n" word line drivers 560(1)-560(n) are shared between the two memory die 302a, 302b. For example, a single word line driver may be used to provide a voltage to a word line in memory die 302a and to a word line in memory die 302b. However, it is not required that the word line drivers 560 are shared between the memory dies 302a, 302b.

Figure 10A:
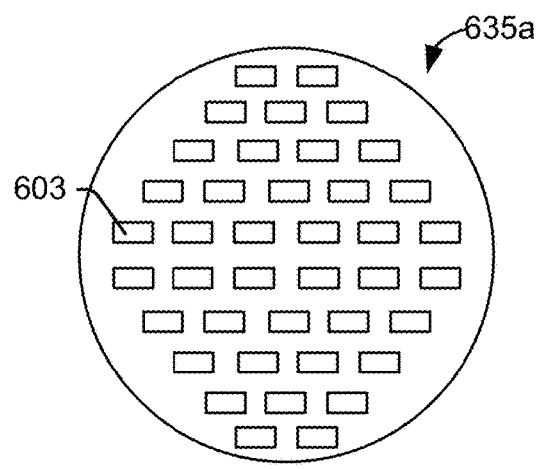
FIGS. 10A and 10B are top views of semiconductor wafers.

FIG. 10A is a top view of a semiconductor wafer 635a from which multiple control die 304 may be formed. The wafer 635a has numerous copies of integrated circuits 603. Each of the integrated circuits 603 contains the control circuitry 310 (see FIG. 4). Wafer 635a is diced into semiconductor dies, each containing one of the copies of the integrated circuits 603. Therefore, numerous control semiconductor dies 304 may be formed from the wafer 635a. Also note that even before the wafer 635a is diced, as the term "control semiconductor die" is used herein, each region in which an integrated circuit 603 resides may be referred to as a control semiconductor die 304.

Figure 10B:
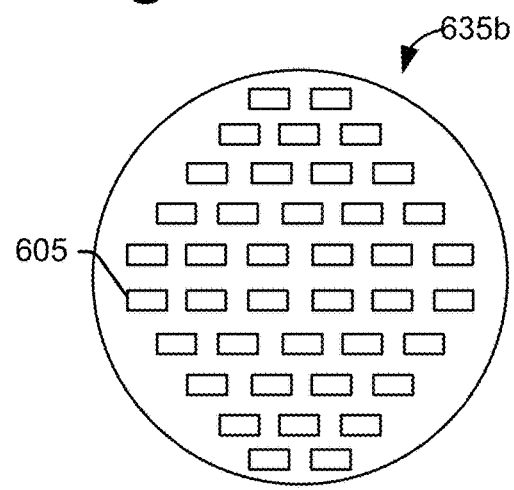

FIG. 10B is a top view of a semiconductor wafer 635b from which multiple memory die 302 may be formed. The wafer 635b has numerous copies of integrated circuits 605. Each of the integrated circuits 605 contains memory structure 326 (see FIG. 4), in one embodiment. The wafer 635b is diced into semiconductor dies, each containing one of the copies of the integrated circuits 605, in some embodiments. Therefore, numerous memory semiconductor dies 302 may be formed from the wafer 635b. Also note that even before the wafer 635b is diced, as the term "memory semiconductor die" is used herein, each region in which an integrated circuit 605 resides may be referred to as a memory semiconductor die 302.

The semiconductor wafers 635 may start as an ingot of monocrystalline silicon grown according to either a CZ, FZ or other process. The semiconductor wafers 635 may be cut and polished on major surfaces to provide smooth surfaces. The integrated circuits 603, 605 may be formed on and/or in the major surfaces. Note that forming the integrated circuits 603, 605 on different wafers 635a, 635b facilitates use of different semiconductor fabrication processes on the different wafers 635a, 635b. For example, semiconductor fabrication processes may involve high temperature anneals. Such high temperature anneals may be needed for formation of some circuit elements, or may be useful for improving properties of circuit elements. For example, a high temperature anneal can desirably reduce the resistance of polysilicon on the memory dies 302. However, the high temperature anneal could be damaging to other circuit elements. For example, a high temperature anneal can potentially be damaging to CMOS transistors, such as the transistors that may be used on the semiconductor dies 304. In one embodiment, a high temperature anneal that is used when fabricating the integrated circuits 605 on wafer 635b is not used when fabricating the integrated circuits 603 on wafer 635a. For example, in one embodiment, a high temperature anneal that is used when fabricating the memory dies is not used when fabricating the control dies.

The dicing of the wafers 635 into semiconductor dies may occur before or after bonding. In one embodiment, the two wafers 635, 635b are bonded together. After bonding the two wafers together, dicing is performed. Therefore, numerous integrated memory assemblies 104 may be formed from the two wafers 635. In another embodiment, the two wafers 635a, 635b are diced into semiconductor dies 304, 302. Then, one of each of the semiconductor dies 304, 302 are bonded together to form an integrated memory assembly 104. Regardless of whether dicing occurs prior to or after bonding, it may be stated that the integrated memory assembly 104 contains a control semiconductor die 304 and a memory semiconductor die 302 bonded together.

Figure 10C:
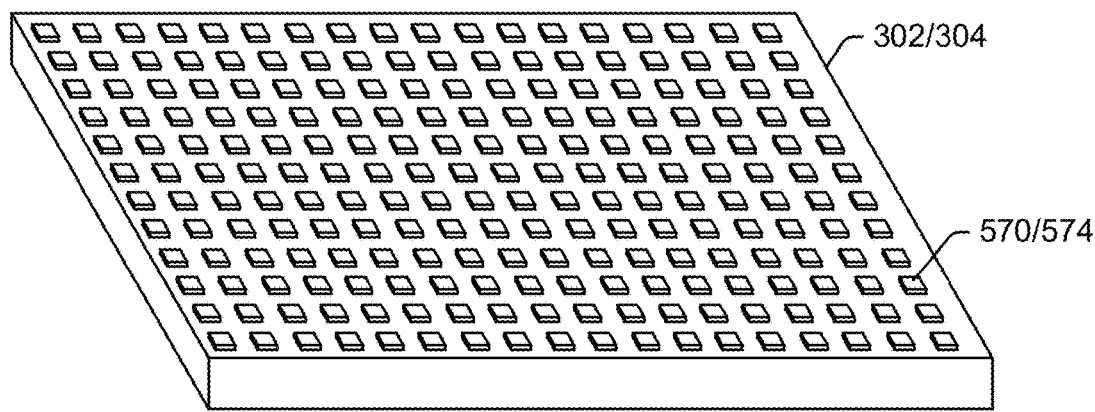
FIG. 10C depicts an example pattern of bond pads on a planar surface of a semiconductor die.

As has been discussed above, the control die 304 and the memory die 302 may be bonded together. Bond pads on each die 302, 304 may be used to bond the two dies together. FIG. 10C depicts an example pattern of bond pads on a planar surface of a semiconductor die. The semiconductor die could be memory die 302 or control die 304. The bond pads could be any of bond pads 570 or 574, as appropriate for the semiconductor die. There may be many more bond pads than are depicted in FIG. 10C. As one example, 100,000 or more interconnections may be required between two of the semiconductor die. In order to support such large numbers of electrical interconnections, the bond pads may be provided with a small area and pitch. In some embodiments, the bond pads are flip-chip bond pads.

The semiconductor dies 302, 304 in the integrated memory assembly 104 may be bonded to each other by initially aligning the bond pads 570, 574 on the respective dies 302, 304 with each other. Thereafter, the bond pads may be bonded together by any of a variety of bonding techniques, depending in part on bond pad size and bond pad spacing (i.e., bond pad pitch). The bond pad size and pitch may in turn be dictated by the number of electrical interconnections required between the first and second semiconductor dies 302 and 304.

In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 µm square and spaced from each other with a pitch of 1 µm to 5 μm. Bonding techniques may be used providing bond pads with even smaller sizes and pitches.

Some embodiments may include a film on surface of the dies 302 and 304. Where no such film is initially provided, a space between the dies may be under filled with an epoxy or other resin or polymer. The under-fill material may be applied as a liquid which then hardens into a solid layer. This under-fill step protects the electrical connections between the dies 302, 304, and further secures the dies together. Various materials may be used as under-fill material, but in embodiments, it may be Hysol epoxy resin from Henkel Corp., having offices in California, USA.

Figure 11:
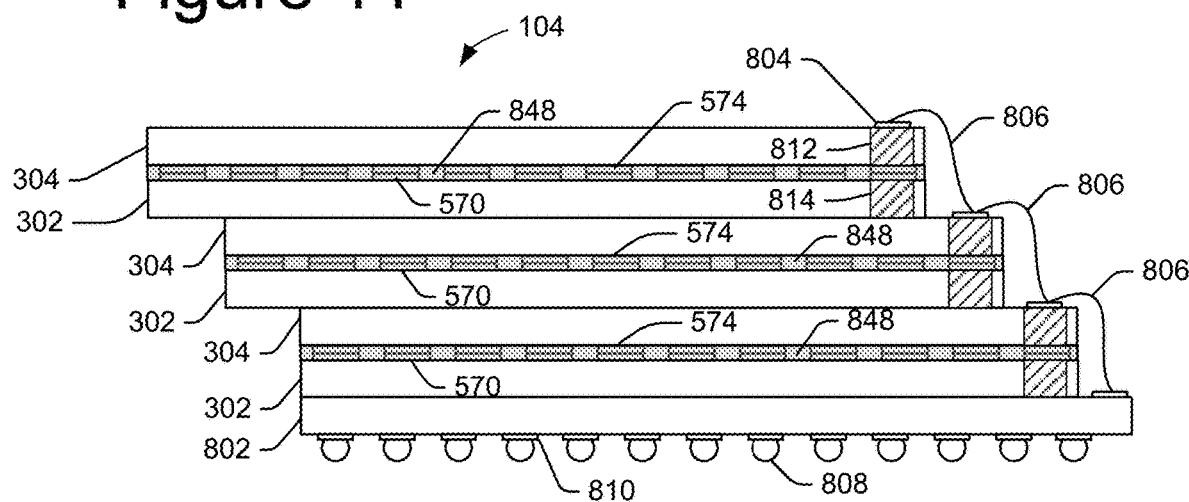
FIG. 11 depicts a side view of an embodiment of an integrated memory assembly stacked on a substrate.

As noted herein, there may be more than one control die 304 and more than one memory die 302 in an integrated memory assembly 104. In some embodiments, the integrated memory assembly 104 includes a stack of multiple control die 304 and multiple memory die 302. FIG. 11 depicts a side view of an embodiment of an integrated memory assembly 104 stacked on a substrate 802. The integrated memory assembly 104 has three control die 304 and three memory die 302. Each control die 304 is bonded to one of the memory die 302. Some of the bond pads 570, 574, are depicted. There may be many more bond pads. A space between two dies 302, 304 that are bonded together is filled with a solid layer 848, which may be formed from epoxy or other resin or polymer. This solid layer 848 protects the electrical connections between the dies 302, 304, and further secures the dies together. Various materials may be used as solid layer 848, but in embodiments, it may be Hysol epoxy resin from Henkel Corp., having offices in California, USA.

The integrated memory assembly 104 may for example be stacked with a stepped offset, leaving the bond pads 804 at each level uncovered and accessible from above. Wire bonds 806 connected to the bond pads 804 connect the control die 304 to the substrate 802. A number of such wire bonds may be formed across the width of each control die 304 (i.e., into the page of FIG. 8A).

A through silicon via (TSV) 812 may be used to route signals through a control die 304. A through silicon via (TSV) 814 may be used to route signals through a memory die 302. The TSVs 812, 814 may be formed before, during or after formation of the integrated circuits in the semiconductor dies 302, 304. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 808 may optionally be affixed to contact pads 810 on a lower surface of substrate 802. The solder balls 808 may be used to electrically and mechanically couple the integrated memory assembly 104 to a host device such as a printed circuit board. Solder balls 808 may be omitted where the integrated memory assembly 104 is to be used as an LGA package. The solder balls 808 may form a part of the interface between the integrated memory assembly 104 and memory controller 102.

In the embodiment of FIG. 11, the memory dies 302 and the control dies 304 are arranged as pairs. That is, each memory die 302 is bonded to and in communication with a corresponding/matching/paired control die.

Figure 12:
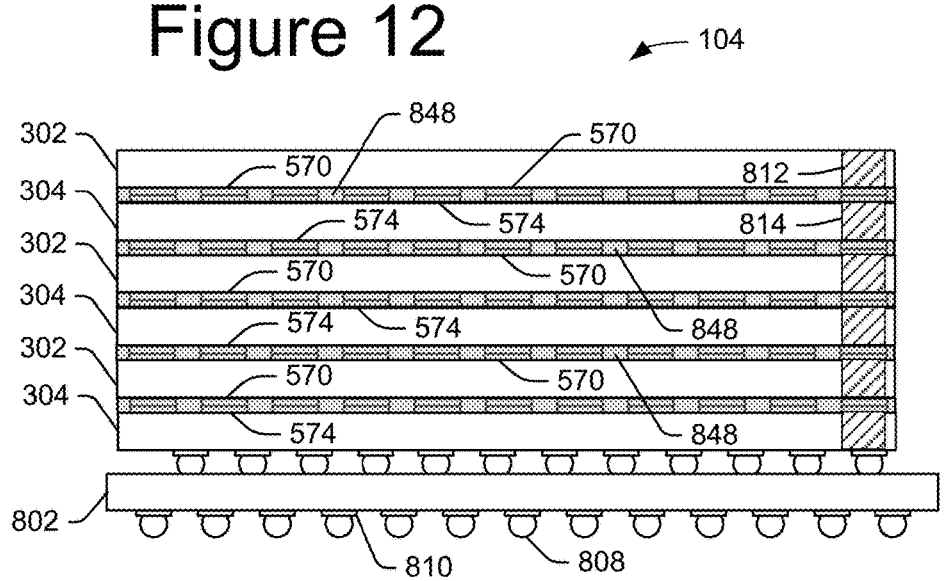
FIG. 12 depicts a side view of an embodiment of an integrated memory assembly stacked on a substrate.

FIG. 12 depicts a side view of an embodiment of an integrated memory assembly 104 stacked on a substrate 802. The integrated memory assembly 104 has three control die 304 and three memory die 302. In this example, each control die 304 is bonded to at least one memory die 302. Optionally, a control die 304 may be bonded to two memory die 302. For example, two of the control die 304 are bonded to a memory die 302 above the control die 304 and a memory die 302 below the control die 304.

Some of the bond pads 570, 574 are depicted. There may be many more bond pads. A space between two dies 302, 304 that are bonded together is filled with a solid layer 848, which may be formed from epoxy or other resin or polymer. In contrast to the example in FIG. 11, the integrated memory assembly 104 in FIG. 12 does not have a stepped offset. A through silicon via (TSV) 812 may be used to route signals through a memory die 302. A through silicon via (TSV) 814 may be used to route signals through a control die 304.

Solder balls 808 may optionally be affixed to contact pads 810 on a lower surface of substrate 802. The solder balls 808 may be used to electrically and mechanically couple the integrated memory assembly 104 to a host device such as a printed circuit board. Solder balls 808 may be omitted where the integrated memory assembly 104 is to be used as an LGA package.

Figure 13:
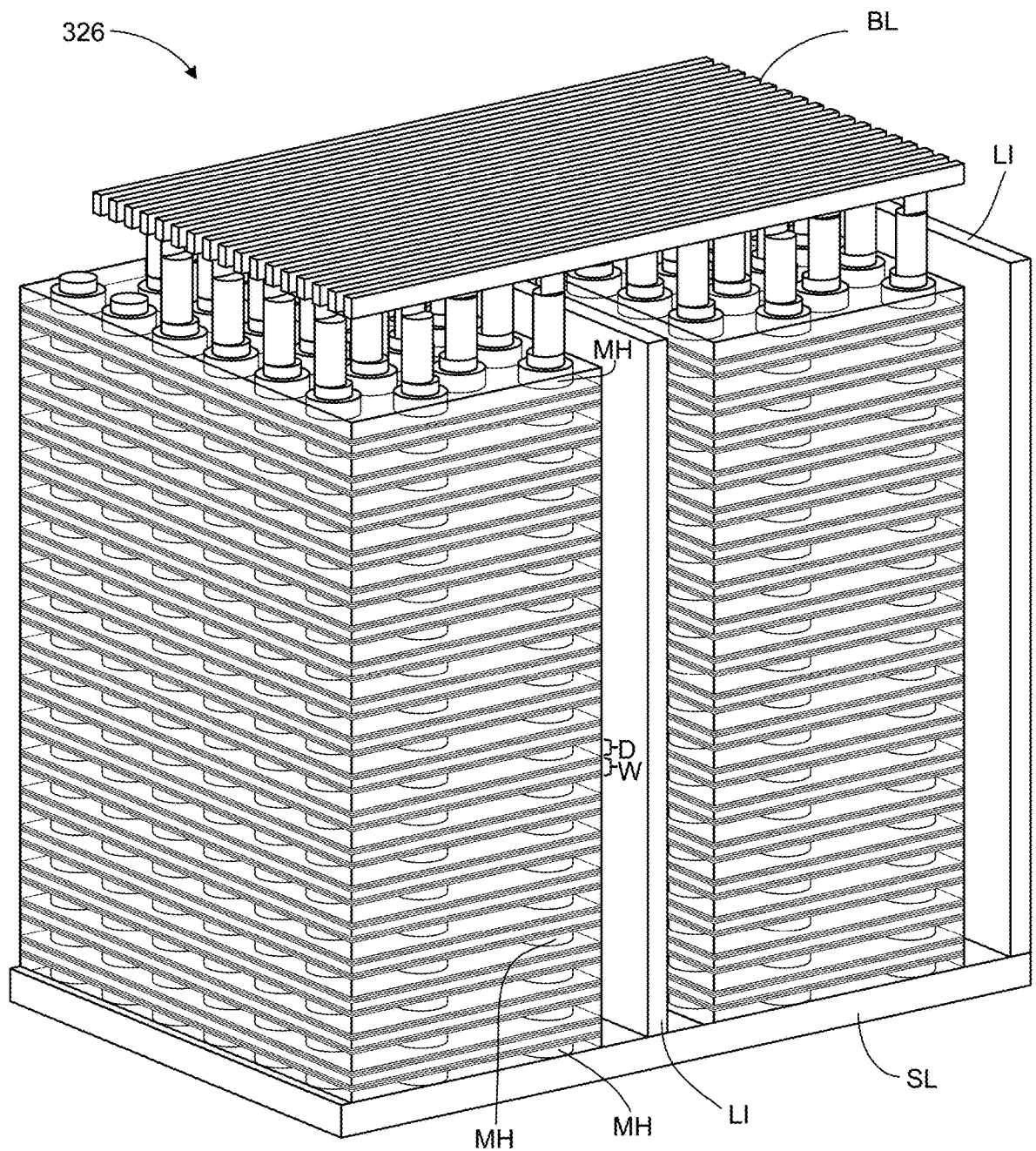
FIG. 13 is a perspective view of a portion of one example embodiment of a monolithic three dimensional memory array.

FIG. 13 is a perspective view of a portion of one example embodiment of a monolithic three dimensional memory array that can comprise memory structure 326, which includes a plurality non-volatile memory cells. For example, FIG. 13 shows a portion of one block comprising memory. The structure depicted includes a set of bit lines BL positioned above a stack of alternating dielectric layers and conductive layers with vertical columns of materials extending through the dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-304 alternating dielectric layers and conductive layers. One example embodiment includes 96 data word line layers, 8 select layers, 6 dummy word line layers and 110 dielectric layers. More or fewer than 108-304 layers can also be used. The alternating dielectric layers and conductive layers are divided into four "fingers" or sub-blocks by local interconnects LI, in an embodiment. FIG. 9 shows two fingers and two local interconnects LI. Below the alternating dielectric layers and word line layers is a source line layer SL. Vertical columns of materials (also known as memory holes) are formed in the stack of alternating dielectric layers and conductive layers. For example, one of the vertical columns/memory holes is marked as MH. Note that in FIG. 913, the dielectric layers are depicted as see-through so that the reader can see the memory holes positioned in the stack of alternating dielectric layers and conductive layers. In one embodiment, NAND strings are formed by filling the vertical column/memory hole with materials including a charge-trapping material to create a vertical column of memory cells. Each memory cell can store one or more bits of data. One example of a suitable memory structure 326 is described in U.S. Pat. No. 10,553,298, incorporated herein by reference in its entirety.

Figure 14:
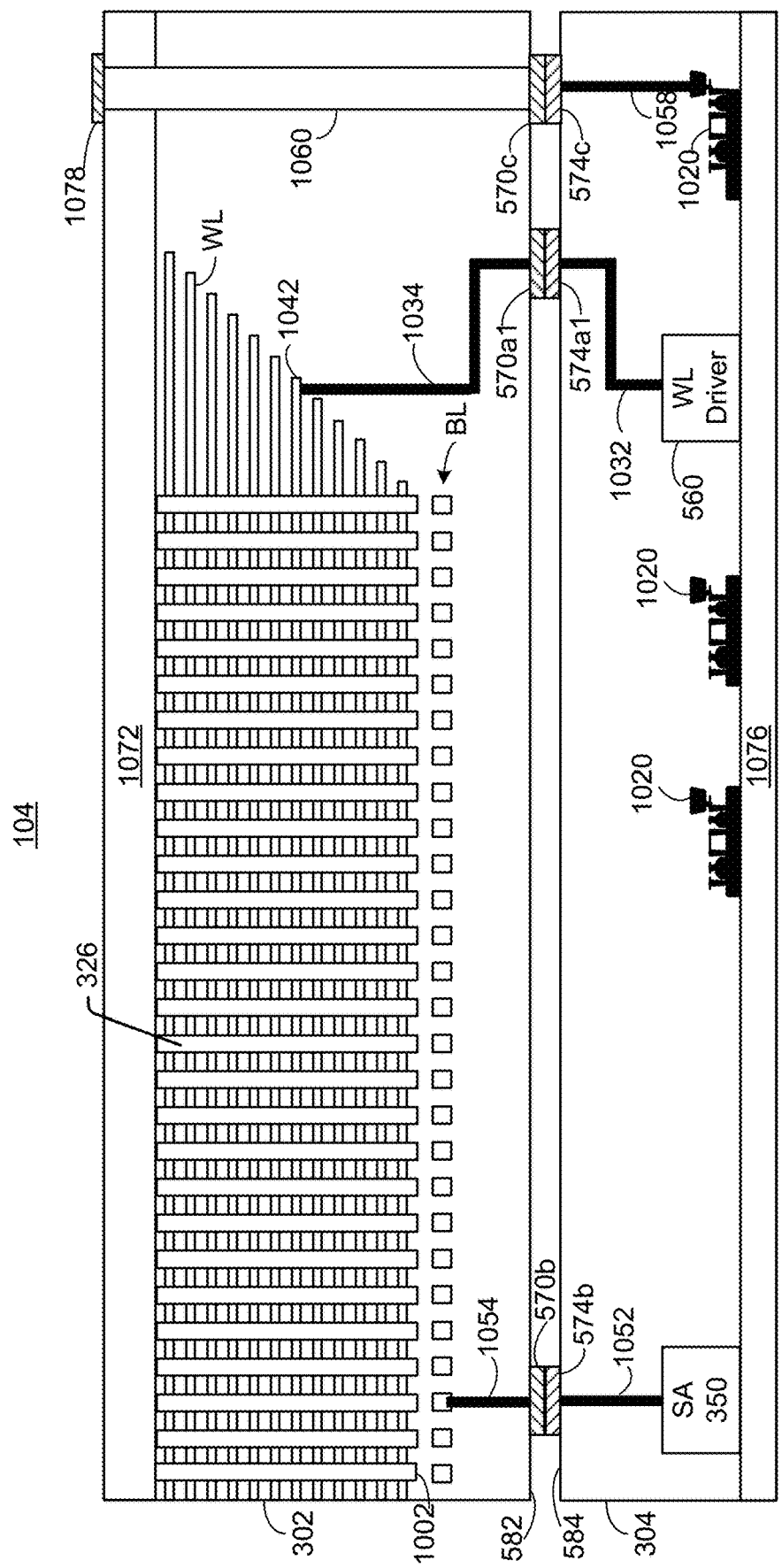
FIG. 14 depicts one embodiment of an integrated memory assembly.

FIG. 14 is a diagram of one embodiment of an integrated memory assembly 104. In an embodiment depicted in FIG. 14, memory die 302 is bonded to control die 304. This bonding configuration is similar to an embodiment depicted in FIG. 8. Note that although a gap is depicted between the pairs of adjacent dies, such a gap may be filled with an epoxy or other resin or polymer. FIG. 14 shows additional details of one embodiment of pathways 352.

The memory die includes a memory structure 326. Memory structure 326 is adjacent to substrate 1072 of memory die 302. In some embodiments, substrate 1072 is formed from a portion of a silicon wafer. In this example, the memory structure 326 include a three-dimensional memory array. The memory structure 326 has a similar structure as the example depicted in FIG. 13. There are a number of word line layers (WL), which are separated by dielectric layers. The dielectric layers are represented by gaps between the word line layers. Thus, the word line layers and dielectric layers form a stack. There may be many more word line layers than are depicted in FIG. 14. As with the example of FIG. 13, there are a number of columns that extend through the stack. One column 1002 is referred to in each stack with reference numeral 1002. The columns contain memory cells. For example, each column may contain a NAND string. There are a number of bit lines (BL) adjacent to the stack.

Word line driver 560 concurrently provides voltages to a word line 1042 in memory die 302. The pathway from the word line driver 560 to the word line 1042 includes conductive pathway 1032, bond pad 574a1, bond pad 570a1, and conductive pathway 1034. In some embodiments, conductive pathways 1032, 1034 are referred to as a pathway pair. Conductive pathways 1032, 1034 may each include one or more vias (which may extend vertically with respect to the major surfaces of the die) and one or more metal interconnects (which may extend horizontally with respect to the major surfaces of the die). Conductive pathways 1032, 1034 may include transistors or other circuit elements. In one embodiment, the transistors may be used to, in effect, open or close the pathway. Other word line drivers (not depicted in FIG. 10A) provide voltages to other word lines. Thus, there are additional bond pad 574a, 570a in addition to bond pads 574a1, 570a1. As is known in the art, the bond pads may be formed for example of copper, aluminum and alloys thereof.

Sense amplifier 350 is in communication with a bit line in memory die 302. The pathway from the sense amplifier 350 to the bit line includes conductive pathway 1052, bond pad 574b, bond pad 570b, and conductive pathway 1054. In some embodiments, conductive pathways 1052, 1054 are referred to as a pathway pair. Conductive pathways 1052, 1054 may include one or more vias (which may extend vertically with respect to the major surfaces of the die) and one or more metal interconnects (which may extend horizontally with respect to the major surfaces of the die). The metal interconnects may be formed of a variety of electrically conductive metals including for example copper and copper alloys as is known in the art, and the vias may be lined and/or filled with a variety of electrically conductive metals including for example tungsten, copper and copper alloys as is known in the art. Conductive pathways 1052, 1054 may include transistors or other circuit elements. In one embodiment, the transistors may be used to, in effect, open or close the pathway.

The control die 304 has a substrate 1076, which may be formed from a silicon wafer. The sense amplifiers 350, word line driver(s) 560, and other circuitry 1020 may be formed on and/or in the substrate 1076. The circuitry 1020 may include some or all of the control circuitry 310. In some embodiments, sense amplifiers 350, word line driver(s) 560, and/or other circuitry 1020 comprise CMOS circuits.

There is an external signal path that allows circuitry on the control die 304 to communicate with an entity external to the integrated memory assembly 104, such as memory controller 102. Therefore, circuitry 1020 on the control die 304 may communicate with, for example, memory controller 102. Optionally, circuitry on the control die 304 may communicate with, for example, host 120. The external pathway includes via 1058 in control die 304, bond pad 574c, bond pad 570c, through silicon via (TSV) 1060, and external pad 1078. The TSV 1060 extends through substrate 1072.

The TSV 1060, may be formed before, during or after formation of the integrated circuits in the semiconductor dies 302, 304. The TSV may be formed by etching holes through the wafers. For example, holes may be etched through substrate 1072. The holes also may be etched through material adjacent to the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Numerous modifications to the embodiment depicted in FIG. 14 are possible. One modification is for sense amplifiers 350 to be located on memory die 302.

Figure 15:
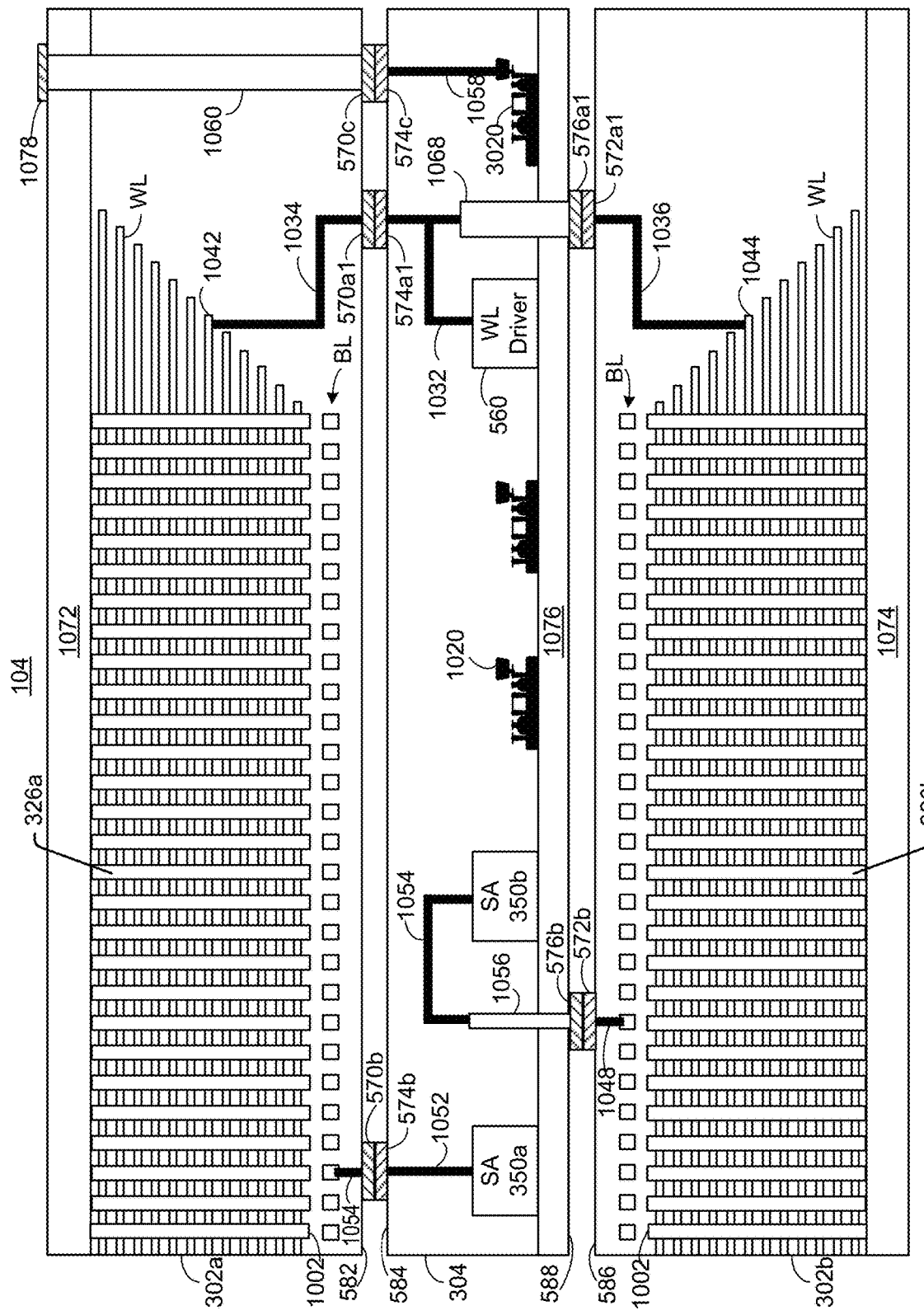
FIG. 15 depicts one embodiment of an integrated memory assembly in which one control die controls two memory die.

FIG. 15 depicts one embodiment of an integrated memory assembly 104. This bonding configuration is similar to an embodiment depicted in FIG. 8. The configuration in FIG. 15 adds an extra memory die relative to the configuration in FIG. 14. Hence, similar reference numerals are used for memory die 302a in FIG. 15, as were used for memory die 302 in FIG. 14. In an embodiment depicted in FIG. 15, first memory die 302a is bonded to control die 304, and control die 304 is bonded to second memory die 302b. Note that although a gap is depicted between the pairs of adjacent dies, such a gap may be filled with an epoxy or other resin or polymer.

Each memory die 302a, 302b includes a memory structure 326. Memory structure 326a is adjacent to substrate 1072 of memory die 302a. Memory structure 326b is adjacent to substrate 1074 of memory die 302b. The substrates 1072, 1074 are formed from a portion of a silicon wafer, in some embodiments. In this example, the memory structures 326 each include a three-dimensional memory array.

Word line driver 560 concurrently provides voltages to a first word line 1042 in memory die 302a and a second word line 1044 in memory die 302b. The pathway from the word line driver 560 to the second word line 1044 includes conductive pathway 1032, through silicon via (TSV) 1068, bond pad 576a1, bond pad 572a1, and conductive pathway 1036. Other word line drivers (not depicted in FIG. 10B) provide voltages to other word lines.

Sense amplifier 350a is in communication with a bit line in memory die 302a. The pathway from the sense amplifier 350a to the bit line includes conductive pathway 1052, bond pad 574b, bond pad 570b, and conductive pathway 1054. Sense amplifier 350b is in communication with a bit line in memory die 302b. The pathway from the sense amplifier 350b to the bit line includes conductive pathway 1054, TSV 1056, bond pad 576b, bond pad 572b, and conductive pathway 1048.

Numerous modifications to the embodiment depicted in FIG. 10B are possible. One modification is for sense amplifiers 350a to be located on first memory die 302a, and for sense amplifiers 350b to be located on second memory die 302b.

Figure 16:
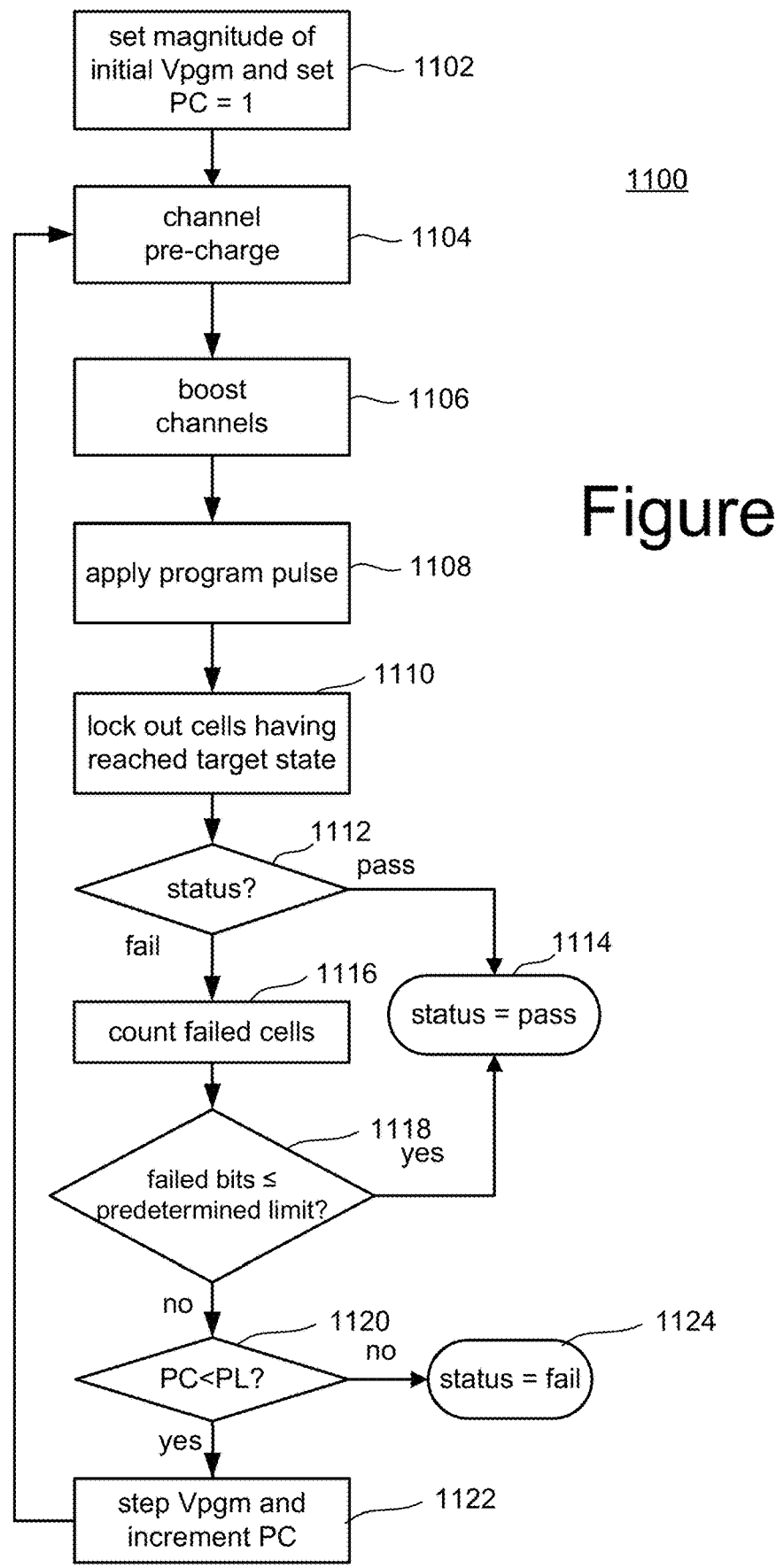
FIG. 16 is a flowchart describing one embodiment of a process for programming non-volatile memory cells organized into a memory array on a memory die.

FIG. 16 is a flowchart describing one embodiment of a process 1100 for programming NAND strings of memory cells. For purposes of this document, the term program and programming are synonymous with write and writing. In one embodiment, erasing memory cells can also be thought of as writing. In one example embodiment, the process of FIG. 16 is performed on integrated memory assembly 104 using the control circuitry 310 discussed above. For example, the process of FIG. 16 can be performed at the direction of state machine 312. In one embodiment, process 1100 is used to program a codeword into memory structure 326. The process of FIG. 16 is performed by control die 104 to program memory cells on the memory die. In one embodiment, the process of FIG. 16 is performed at the direction of state machine 312.

In many implementations, the magnitude of the program pulses is increased with each successive pulse by a predetermined step size. In step 1102 of FIG. 11, the programming voltage (Vpgm) is initialized to the starting magnitude (e.g., ~12-16V or another suitable level) and a program counter PC maintained by state machine 312 is initialized at 1.

In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 1104 the control die will pre-charge channels of NAND strings that include memory cells connected to the selected word line that are to be inhibited from programming.

In step 1106, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled the unselected NAND string.

In step 1108, a program pulse of the program signal Vpgm is applied to the selected word line (the word line selected for programming) by the control die. If a memory cell on a NAND string should be programmed, then the corresponding bit line is biased at a program enable voltage, in one embodiment. Herein, such a NAND string is referred to as a "selected NAND string."

In step 1108, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 1110, memory cells that have reached their target states are locked out from further programming by the control die. Step 1110 may include performing verifying at one or more verify reference levels. In one embodiment, the verification process is performed by testing whether the threshold voltages of the memory cells selected for programming have reached the appropriate verify reference voltage. In step 1110, a memory cell may be locked out after the memory cell has been verified (by a test of the Vt) that the memory cell has reached its target state.

If, in step 1112, it is determined that all of the memory cells have reached their target threshold voltages (pass), the programming process is complete and successful because all selected memory cells were programmed and verified to their target states. A status of "PASS" is reported in step 1114. Otherwise if, in step 1112, it is determined that not all of the memory cells have reached their target threshold voltages (fail), then the programming process continues to step 1116.

In step 1116, the storage system counts the number of memory cells that have not yet reached their respective target threshold voltage distribution. That is, the system counts the number of memory cells that have, so far, failed to reach their target state. This counting can be done by state machine 312, memory controller 102, or other logic. In one implementation, each of the sense blocks will store the status (pass/fail) of their respective cells. In one embodiment, there is one total count, which reflects the total number of memory cells currently being programmed that have failed the last verify step. In another embodiment, separate counts are kept for each data state.

In step 1118, it is determined whether the count from step 1116 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 1114. In this situation, enough memory cells programmed correctly such that the few remaining memory cells that have not been completely programmed can be corrected using ECC during the read process. In some embodiments, the predetermined limit used in step 1118 is below the number of bits that can be corrected by error correction codes (ECC) during a read process to allow for future/additional errors. When programming less than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, than the programming process continues at step 1120 and the program counter PC is checked against the program limit value (PL). Examples of program limit values include 6, 12, 16, 19 and 30; however, other values can be used. If the program counter PC is not less than the program limit value PL, then the program process is considered to have failed and a status of FAIL is reported in step 1124. If the program counter PC is less than the program limit value PL, then the process continues at step 1122 during which time the Program Counter PC is incremented by 1 and the program voltage Vpgm is stepped up to the next magnitude. For example, the next pulse will have a magnitude greater than the previous pulse by a step size (e.g., a step size of 0.1-1.0 volts). After step 1122, the process loops back to step 1104 and another program pulse is applied to the selected word line (by the control die) so that another iteration (steps 1104-1122) of the programming process of FIG. 16 is performed.

Figure 17A:
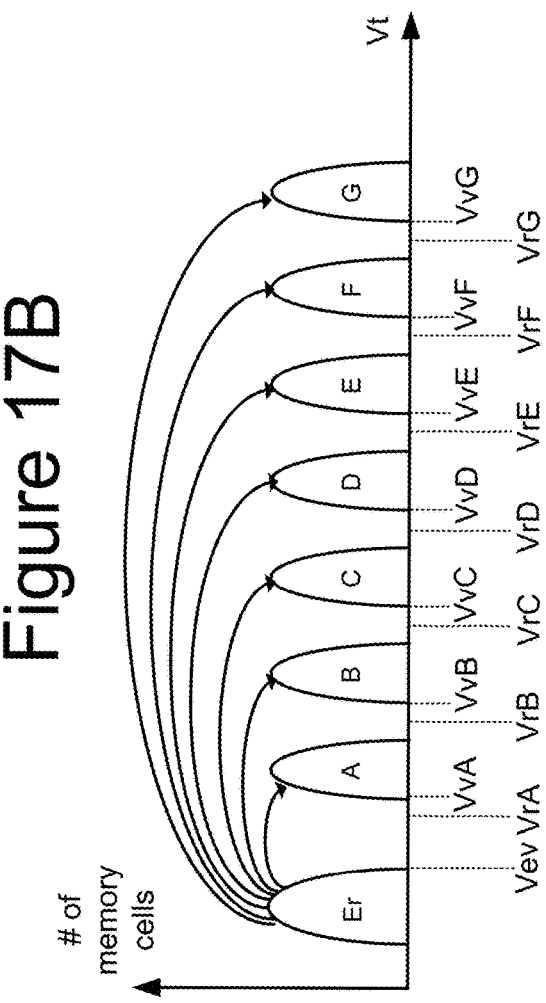
FIG. 17A illustrates example threshold voltage distributions for a population of non-volatile memory cells when each memory cell stores one bit of data.

At the end of a successful programming process, the threshold voltages of the memory cells should be within one or more distributions of threshold voltages for programmed memory cells or within a distribution of threshold voltages for erased memory cells, as appropriate. FIG. 17A is a graph of threshold voltage versus number of memory cells, and illustrates example threshold voltage distributions for the memory array when each memory cell stores single bit per memory cell data. FIG. 17A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." Memory cells that store single bit per memory cell data are referred to as single level cells ("SLC").

Figure 17B:
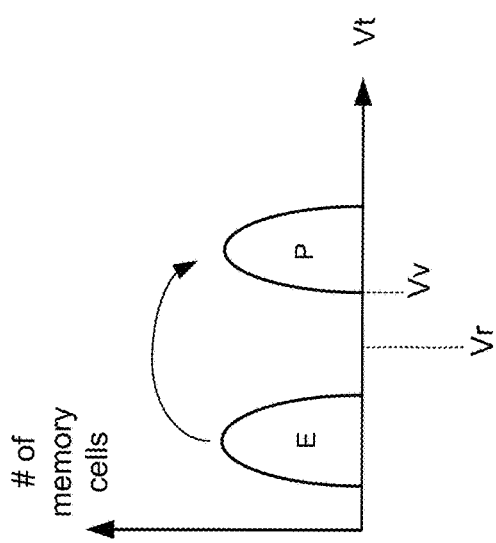
FIG. 17B illustrates example threshold voltage distributions for a population of non-volatile memory cells when each memory cell stores three bits of data.

FIG. 17B illustrates example threshold voltage distributions for the memory array when each memory cell stores multiple bit per memory cell data. Memory cells that store multiple bit per memory cell data are referred to as multi-level cells ("MLC"). In the example embodiment of FIG. 17B, each memory cell stores three bits of data. Other embodiments, however, may use other data capacities per memory cell (e.g., such as one, two, four, or five bits of data per memory cell). FIG. 17b shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected.

FIG. 17B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in.

FIG. 17B also shows seven verify reference voltages, VvA, VvB, VvC, VvD, VvE, VvF, and VvG. In some embodiments, when programming memory cells to data state A, the system will test whether those memory cells have a threshold voltage greater than or equal to VvA. When programming memory cells to data state B, the system will test whether the memory cells have threshold voltages greater than or equal to VvB. When programming memory cells to data state C, the system will determine whether memory cells have their threshold voltage greater than or equal to VvC. When programming memory cells to data state D, the system will test whether those memory cells have a threshold voltage greater than or equal to VvD. When programming memory cells to data state E, the system will test whether those memory cells have a threshold voltage greater than or equal to VvE. When programming memory cells to data state F, the system will test whether those memory cells have a threshold voltage greater than or equal to VvF. When programming memory cells to data state G, the system will test whether those memory cells have a threshold voltage greater than or equal to VvG. FIG. 17B also shows Vev, which is a voltage level to test whether a memory cell has been properly erased.

In one embodiment, known as full sequence programming, memory cells can be programmed from the erased data state Er directly to any of the programmed data states A-G using the process of FIG. 16. For example, a population of memory cells to be programmed may first be erased so that all memory cells in the population are in erased data state Er. Then, a programming process is used to program memory cells directly into data states A, B, C, D, E, F, and/or G. For example, while some memory cells are being programmed from data state ER to data state A, other memory cells are being programmed from data state ER to data state B and/or from data state ER to data state C, and so on. The arrows of FIG. 17B represent the full sequence programming. In some embodiments, data states A-G can overlap, with control die 304 and/or memory controller 102 relying on error correction to identify the correct data being stored.

In general, during verify operations and read operations, the selected word line is connected to a voltage (one example of a reference signal), a level of which is specified for each read operation (e.g., see read compare levels VrA, VrB, VrC, VrD, VrE, VrF, and VrG, of FIG. 17) or verify operation (e.g. see verify target levels VvA, VvB, VvC, VvD, VvE, VvF, and VvG of FIG. 17B) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

Figure 18:
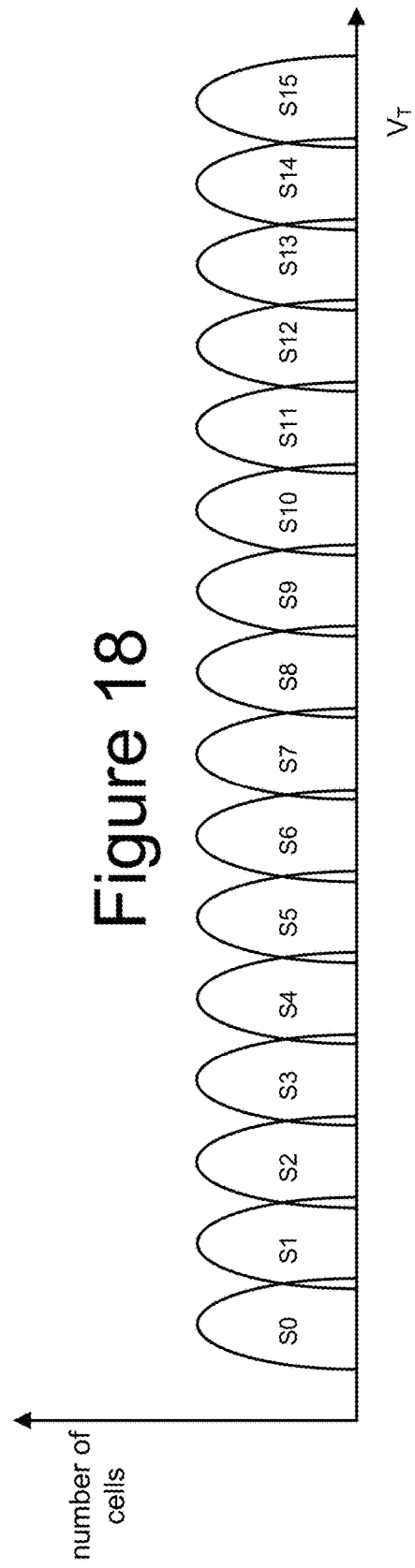
FIG. 18 illustrates example threshold voltage distributions for a population of non-volatile memory cells when each memory cell stores four bits of data.

FIG. 18 depicts threshold voltage distributions when each memory cell stores four bits of data. FIG. 18 depicts that there may be some overlap between the threshold voltage distributions (data states) S0-S15. The overlap may occur due to factors such as memory cells losing charge (and hence dropping in threshold voltage). Program disturb can unintentionally increase the threshold voltage of a memory cell. Likewise, read disturb can unintentionally increase the threshold voltage of a memory cell. Over time, the locations of the threshold voltage distributions may change. Such changes can increase the bit error rate, thereby increasing decoding time or even making decoding impossible. Changing the read reference voltages can help to mitigate such effects. Using ECC during the read process can fix errors and ambiguities. When using four bits per memory cell, the memory can be programmed using the full sequence programming discussed above, or multi-pass programming processes.

Figure 19:
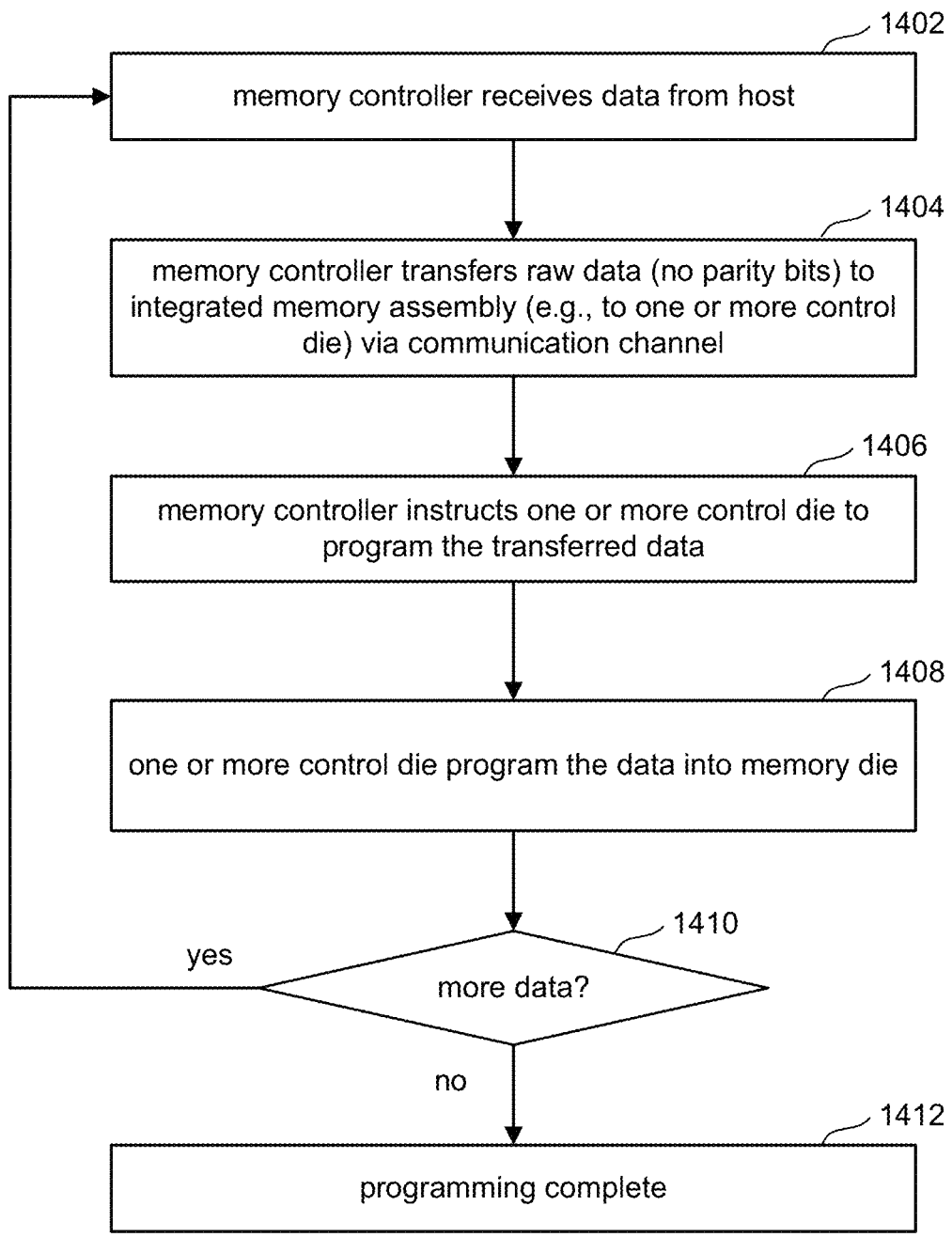
FIG. 19 is a flowchart describing one embodiment of a process for programming a storage system.

FIG. 19 is a flow chart describing one embodiment of a process performed by memory controller 102 to cause data to be programmed into memory cells on memory die 302. In the embodiment of FIG. 19, control die 304 encodes data for ECC purposes, rather than memory controller 102. In step 1402, memory controller 102 receives data from host 120 by way of interface 130 (see FIG. 1). The data can be user data. For purposes of this document, user data is data received from an entity external to the storage system for storage in the storage system. For example, user data may be received from a host, another computing device, a sensor (e.g., a camera), etc. User data is not data preloaded in the storage system or data generated by the storage system. In an example implementation where the storage system is embedded in a digital camera, then user data would include image files captured by the camera. The memory controller may also receive a write command from the host and one or more logical addresses for the write command. The memory controller can translate the logical addresses to physical addresses.

In step 1404 of FIG. 19, memory controller 102 transfers raw data (e.g., user data not encoded with ECC information) to integrated memory assembly 104 (e.g., to one or more control die 304) by way of communication channel (e.g., a Toggle Mode interface). In step 1406, memory controller 102 instructs one or more control die 304 to program the transferred raw data into one or more memory die 302. In one embodiment, the instruction to perform the programming comprises sending one or more addresses and one or more commands by way of the communication channel (e.g., a Toggle Mode Interface—see memory controller interface 332). In some embodiments, step 1408 is performed before step 1406. In step 1408, the one or more control die 304 program the data into one or more memory die 302. If there is more data to be programmed (step 1410), then the process of FIG. 22 loops back to step 1402; otherwise, programming is complete (step 1412).

Figure 20:
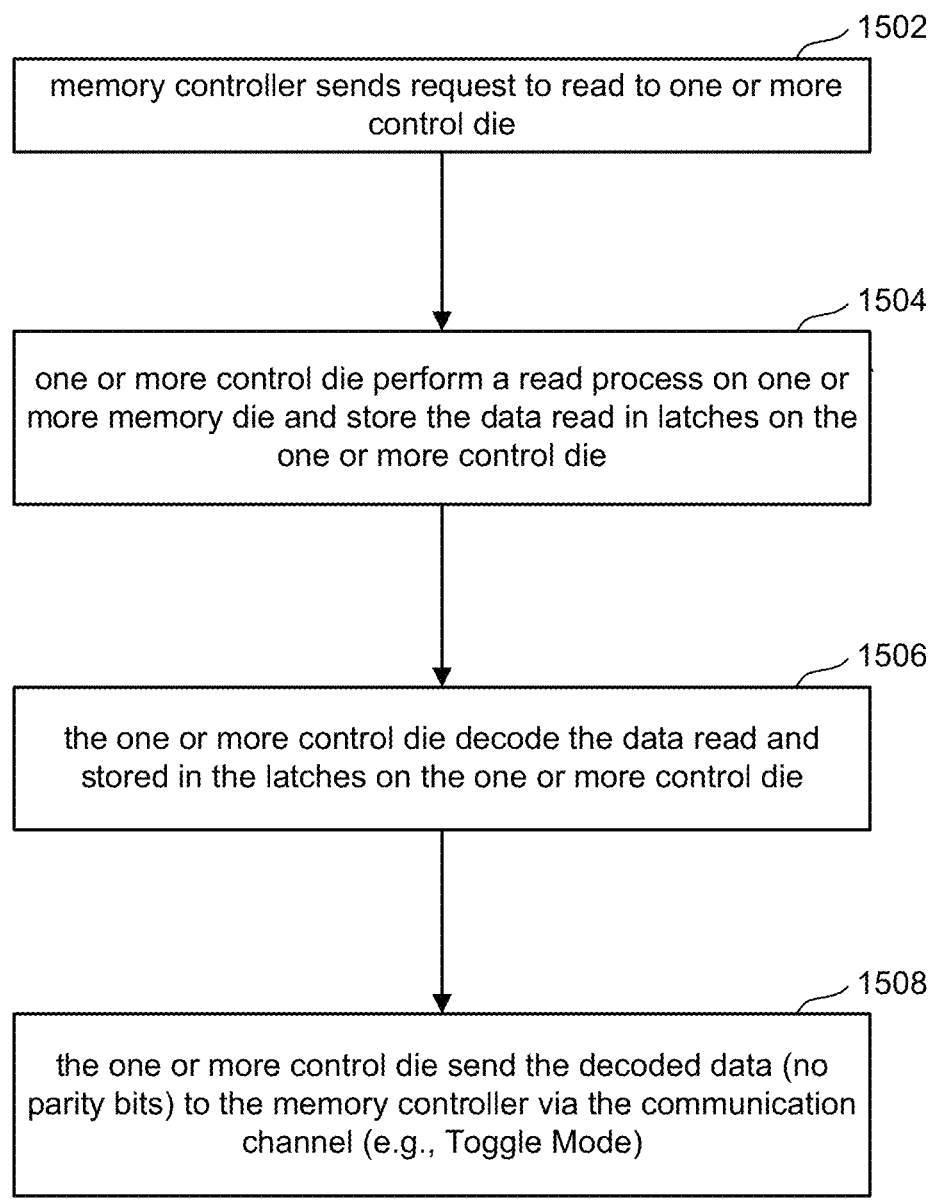
FIG. 20 is a flowchart describing one embodiment of a process for reading data from a storage system.

FIG. 20 is a flow chart describing one embodiment of a process performed by memory controller 102 to cause data to be read from memory cells on memory die 302. In step 1502, memory controller 102 sends a request to read to one or more control die 304. In one embodiment, the instruction to perform the reading comprises sending one or more addresses and one or more commands by way of the communication channel (e.g., a Toggle Mode Interface—see memory controller interface 332). In step 1504, one or more control die 304 perform a read process on one or more memory die 302 and store the data read in latches 360 on the one or more control die 302. In step 1506, the one or more control die 304 (e.g., decoder 390) decode the data read (as discussed above) and stored in the latches 360 on the one or more control die 304. In step 1508, the one or more control die 304 send the decoded data to memory controller 102 by way of the communication channel (e.g., a Toggle Mode Interface—see memory controller interface 332). In one embodiment, the one or more control die 304 send the decoded data bits but not the parity bits to memory controller 102 by way of the communication channel. In another embodiment, the control die sends the data read to the memory controller, and the memory controller decodes the data.

In one embodiment, a memory structure 326 is divided into blocks. A block may be divided into pages. In one example, a page is the unit of programming and/or the unit of reading, and a page comprises data in memory cells connected to a same word line. In other examples, different units of programming and reading can be used, and different arrangements of pages can be used. In some embodiments, pages are divided into fragments (also referred flash management units). In some example implementations, a fragment is the unit of programming and/or the unit of reading. In one example implementation, a page is 16K of data and a fragment is 4K of data; however, other amounts can also be implemented.

The above-described architecture provides a multi-stage compute storage device such that compute tasks can be performed by the memory controller processor or by processors on the control dies. Certain compute tasks require a lot of data transfer to and from the non-volaille memory on the memory dies. The performance of a compute tasks using data in the memory dies would waste time transferring the data back and forth between the memory controller and the integrated memory assemblies. If the entire data set for a compute task were able to fit in the local RAM for the memory controller (e.g., DRAM 106), then some of the inefficiencies of transferring data back and forth to the non-volatile memory can be reduced (but not eliminated). However, to allow all of large data sets to be stored in local RAM for the memory controller, that local RAM would need to be very large which would make the costs of the storage system too high.

It may be tempting to have the control die perform all compute tasks on data stored in the non-volaille memory on the memory dies to minimize data transfer. However, the processing power of the control die is less than the processing power of the memory controller and there are some compute tasks that may need the increased processing power of the memory controller.

To resolve the issues discussed above regarding whether to perform compute tasks at the memory controller or the control dies, the storage system includes compute task distributor module 157 (see FIG. 2) to determine where to assign compute tasks within storage system 100. For example, when a compute tasks is assigned to storage device 100, compute task distributor module 157 will rely on one or more of anticipated amount of data to be transferred to or from non-volatile memory for the compute task, computational resource need of the compute task, and/or available bandwidth of the memory controller and the control dies to decide where the compute task should be performed. For example, a compute task that is not compute intensive and will require many data transfers should be performed on a control die connected to the memory die storing the data, and a compute task that is compute intensive and will not require many data transfers should be performed at the memory controller. In one example implementation, task distributor module 157 identifies the compute complexity and data transfer requirements of multiple compute tasks, ranks them accordingly and, based on the rankings, assigns them to the memory controller or appropriate control dies.

Convolution is one example of a compute task which is data transfer intensive. To illustrate, both the data and the convolution kernel weights need to be provided to the processor performing the convolution. The processing is not necessarily complex, but it involves many data transfers (both data and kernels). Further, the life of the transferred data may be very small, that is, once the multiple accumulate (MAC) is performed it is no longer required and the next data set is provided to processor to perform the next set of operations. This leads to many data transfers between the processor and memory die 302. If the processing resources in the control die are sufficient, then compute task distributor module 157 will decide to process the data using control die 304.

Some operations may use a lot of hardware resources for computation. The RISC speed, amount of cache, and the presence or absence of application specific accelerators will influence real time processing requirements in an edge solution. The logic in a control die 304 may not be sufficient for certain compute tasks needing hardware accelerator support. For example, transcode IP accelerators, which can perform decoding of video data and re-encoding into another format in real time may need a lot of resources, something some embodiments of control die 304 may not be able manage by itself. In such a case, compute task distributor module 157 will decide that the memory controller should process the data because it has larger compute resources. The drawback of transferring the data to the controller is offset by its higher processing ability, better resources and speed.

Available system bandwidth of the memory controller and control die is another parameter which can influence the decision. For example, there may be compute tasks that can be equally performed by either the control die or the memory controller. In such situations, compute task distributor module 157 may dynamically decide to choose one of the destinations based on their available bandwidth and queued tasks.

Figure 21:
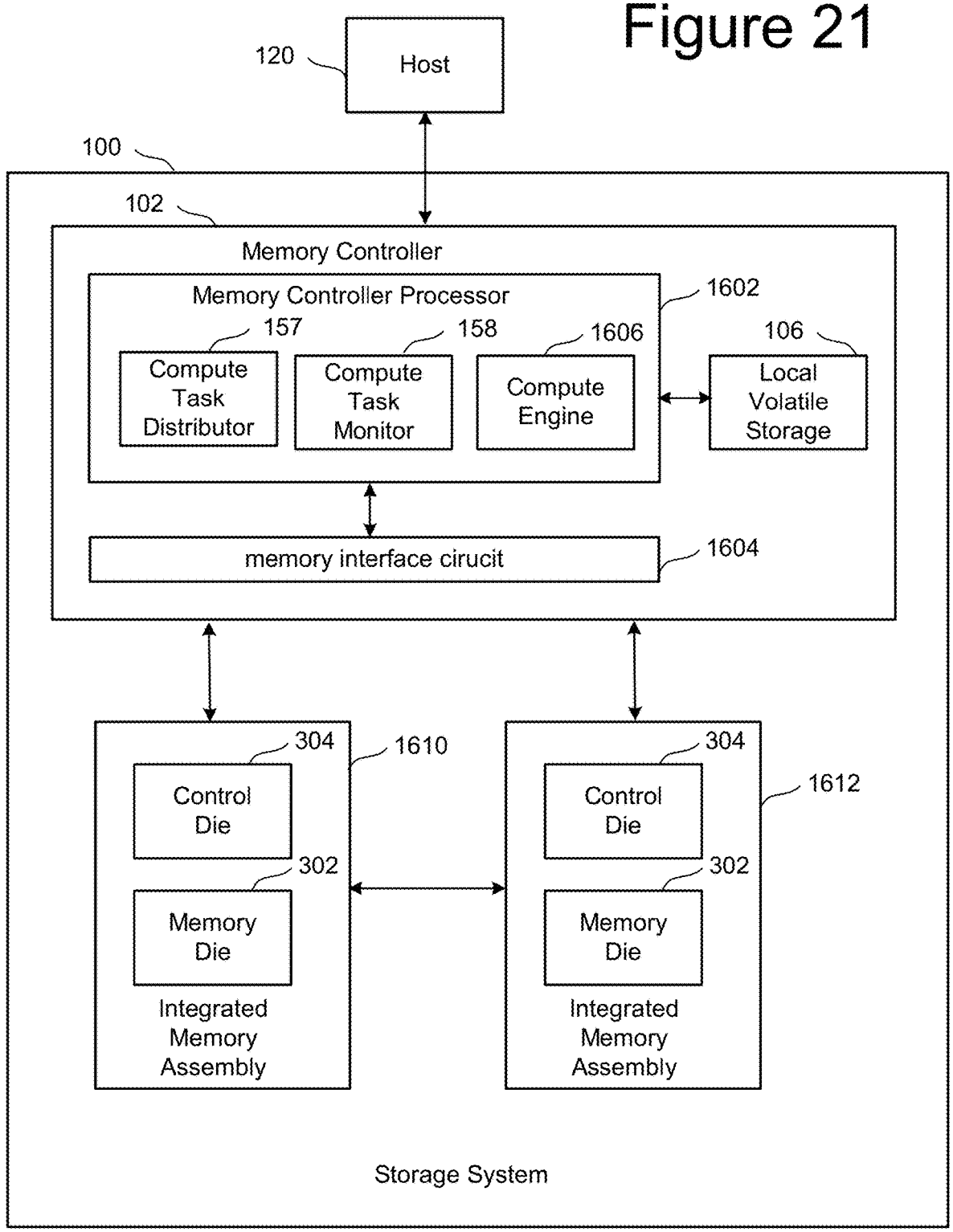
FIG. 21 is a block diagram of a host connected to a storage system.

FIG. 21 is a block diagram depicting host 120 connected to stored system 100, showing those components that are involved in intelligently assigning to compute tasks between the memory controller 102 and one or more integrated memory assemblies. FIG. 21 only shows a subset of the components of storage system 100, memory controller 102, the integrated memory assemblies and host 120 in order to explain the intelligent distribution of compute tasks. For example, FIG. 21 depicts memory controller 102 including memory controller processor 1602 in communication with memory interface circuit 1604 and local volatile storage 106. As discussed above, one embodiment of local volatile storage 106 is DRAM. Memory interface circuit 1604 corresponds to interface circuits 228/258. In another embodiment, memory interface circuit 1604 can correspond to backend processor 112 or another electrical circuit. Memory controller processor can be any of the embodiments discussed above. FIG. 21 shows memory controller processor including compute task distributor module 157, compute task monitor module 158, and compute engine 1606. In one embodiment, compute engine 160 is all or a portion of memory processor 156. Compute engine 160 can also include DRAM controller 162, host processor 152, processor 220, processor 250 or another processor. Memory controller 102 is connected to a plurality of integrated memory assemblies, including integrated memory assembly 1610 and integrated memory assembly 1612, each of which include a memory die 302 connected (e.g., bonded) to a control die 304. Integrated memory assemblies 1610 and 1612 are embodiments of the structure depicted in FIG. 4 or 4A.

Figure 22:
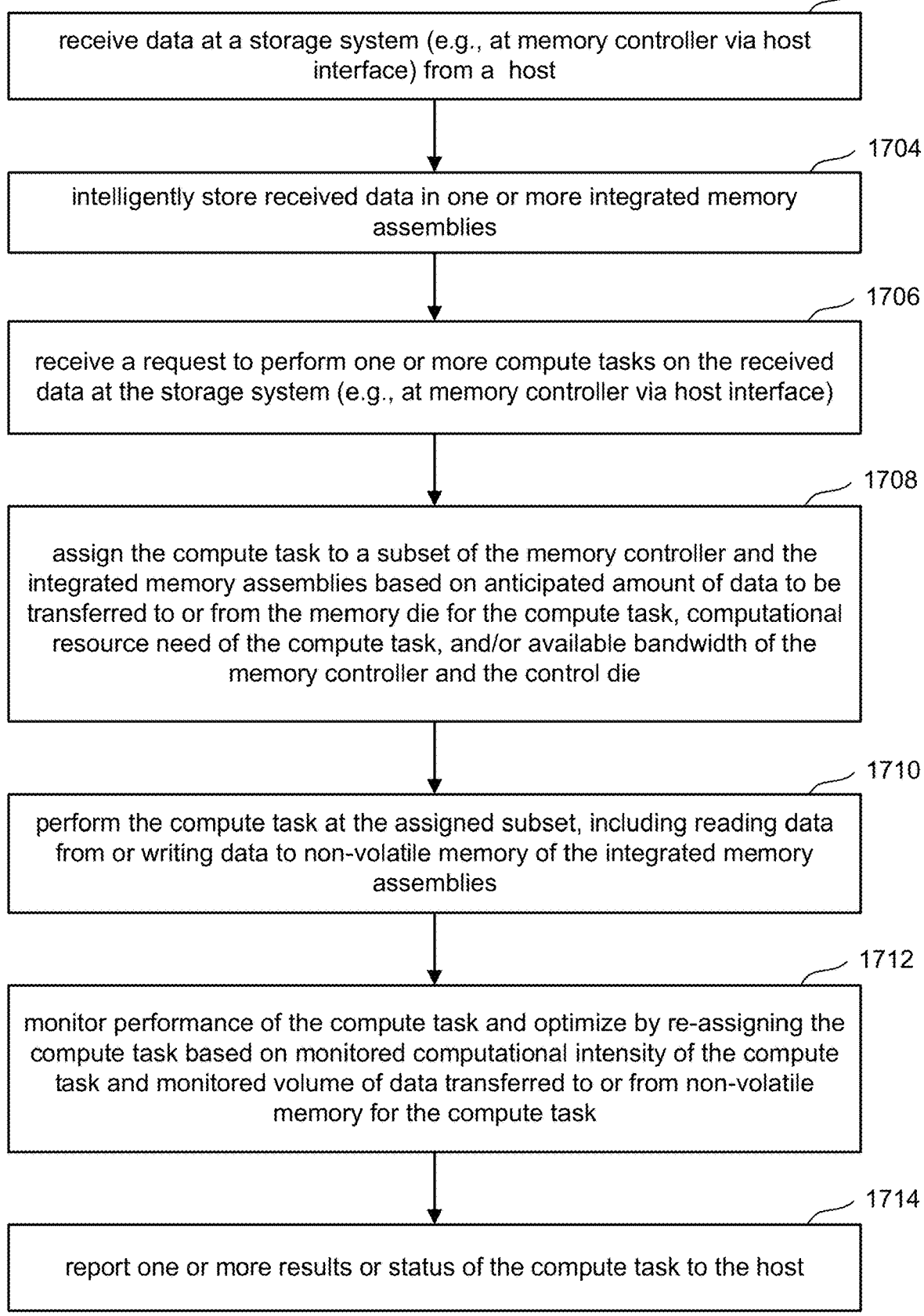
FIG. 22 is a flow chart describing one embodiment of a process for performing a compute task in a storage system.

FIG. 22 is a flow chart describing one embodiment of a process for intelligently distributing compute tasks between memory controller 102 and one or more integrated memory assemblies (e.g., integrated memory assemblies 1610 and 1612). The process of FIG. 22 will be explained with reference to the structure of FIG. 21. In step 1702 of FIG. 22, data is received at the storage system 100 from host 120. For example, the data can be received by memory controller 102. In step 1704, memory controller 102 intelligently stores the received data in one or more integrated memory assemblies (e.g., integrated memory assemblies 1610 and 1612). For example, memory controller 102 stores the data in one or more memory dies 302. More details about step 1704 are provided below. In step 1706, a request is received from the host to perform one or more compute tasks on the received data. The one or more compute tasks are to be performed at storage system 100. In one embodiment, the request is received by memory controller 102 (e.g., via host interface 150).

In step 1708, compute task distributor module 157 assigns the compute task to a subset of the memory controller (e.g., to compute engine 1606) and the integrated memory assemblies based on anticipated amount of data to be transferred to or from the memory die for the compute task, computational resource need of the compute task, and/or available bandwidth of the memory controller and the control die. More details are provided below. For purposes of this document, the phrase "anticipated amount of data to be transferred" refers to an amount of data that is estimated to be transferred, where the estimate is provided in advance of the transfer. Compute task distributor module 157 (which is part of storage system 100) assigns the compute task to a subset of the memory controller and the integrated memory assemblies by assigning all of the compute task to the memory controller, assigning all of the compute task to one control die of one integrated memory assembly, assigning one or more portions of the compute task to the memory controller and one or more portions of the compute task to one or more control dies, and/or assigning different portions of the compute task to different control dies of different integrated memory assemblies.

In step 1710, the entity that was assigned the compute task (e.g., compute engine 1606 or a control die) performs the assigned compute task. Step 1710 includes reading data from or writing data to non-volatile memory of the integrated memory assemblies. In one embodiment, if a compute task is assigned to a control die 304, then the data is read from the memory die that is connected to that control die (i.e. part of the same integrated memory assembly). In one embodiment, the data read is the data stored in step 1704, and that data is used for the compute task.

In step 1712 of FIG. 22, compute task monitor module 158 monitors performance of the compute task and optimizes performance of the storage system by reassigning the compute task (if necessary) based on monitored computational intensity of the compute task and monitored volume of data transferred to or from non-volatile memory for the compute task. During the performance of step 1712, compute task monitor module 158 may determine that the compute task was appropriately assigned; therefore, no reassigning is necessary. Alternatively, compute task monitor module 158 may determine that, due to the amount of data transferred being different than anticipated or the computational intensity being different than anticipated, the compute task should be reassigned. For example, if it was initially thought that a compute task was computationally simple but was going to require a lot of transfer of data, then that compute task may have been initially assigned to a control die 304 of integrated memory assembly 1612. However, during step 1712, compute task monitor module 158 may determine that the computational intensity was much greater than anticipated and, therefore, compute task monitor module 158 reports back to compute task distributor module 157 to redistribute (reassign) the compute task to compute engine 1606 of memory controller processor 1602. Alternatively, compute task distributor module 157 (step 1708) may have initially determined that the compute task was computationally intensive and assigned that compute task to compute engine 1606 of memory controller processor 1602. However, in step 1712, compute task monitor module 158 may determine that the compute task is not computationally intensive but did require a lot of data to be transferred; therefore, compute task monitor module 158 recommends the compute task distributor module 157 to reassign the compute task. In one embodiment, step 1712 is performed concurrently with performance of step 1710

In step 1714, the results or status of the compute task (after completion of the compute task) is reported to the host. For example, if the compute task was performed by a control die 304, then the status and/or result can be reported back to memory controller 1602, which then reports back to host 120.

Figure 23:
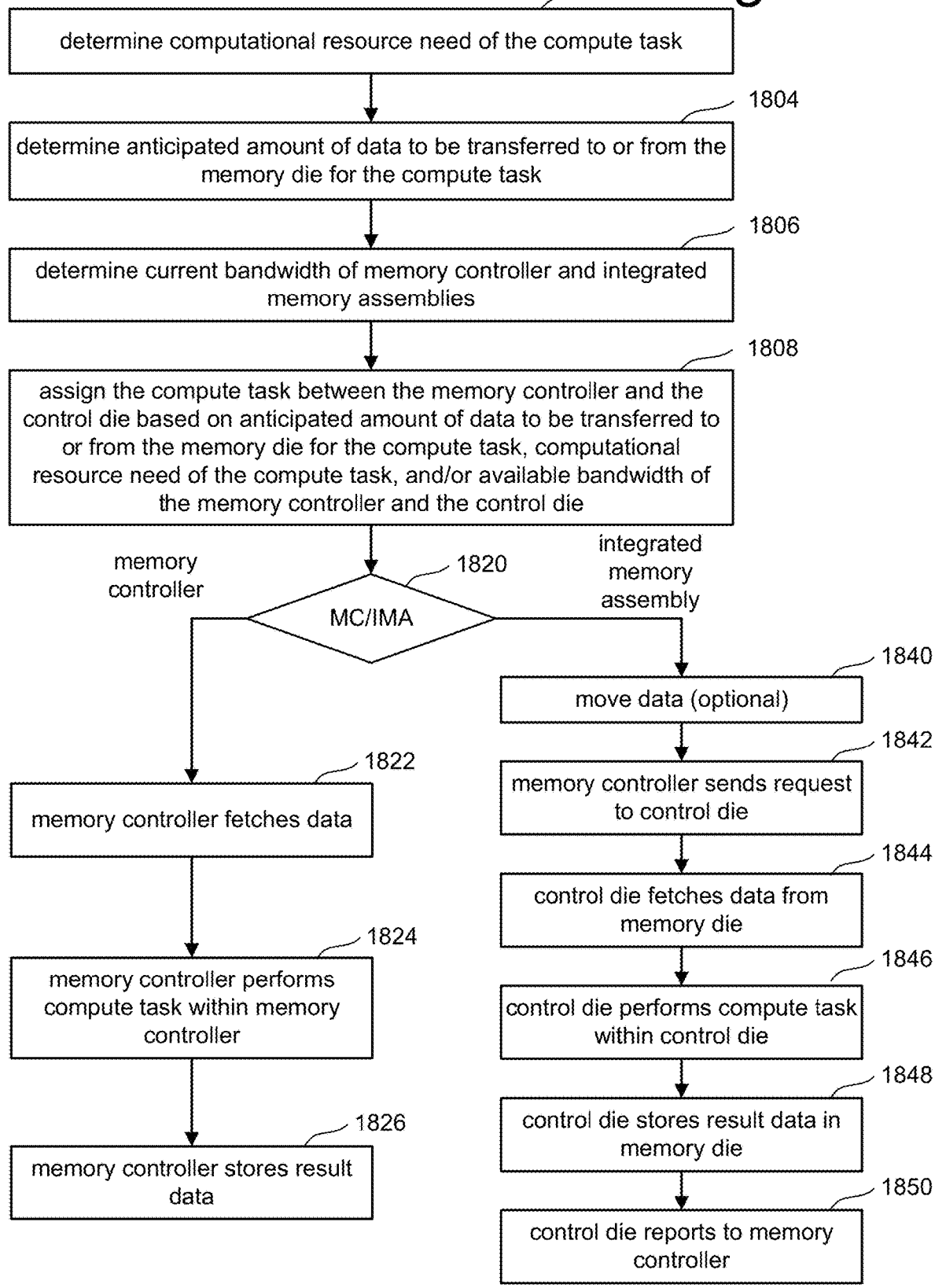
FIG. 23 is a flow chart describing one embodiment of a process for performing a compute task in a storage system.

FIG. 23 is a flowchart chart describing one embodiment of a process for assigning a compute task and performing the compute task. Thus, the process of FIG. 23 is one example embodiment of steps 1708 and 1710 of FIG. 22. In step 1802 of FIG. 23, compute task distributor module 157 determines the computational resource needed for the compute tasks assigned by host 120. In step 1804, compute task distributor module 157 determines the anticipated amount of data to be transferred to or from the non-volatile memory of memory die for the compute task. There are many different means for determining the computational resource need and the amount of data to be transferred for a compute task. No particular means for making those determinations is required for the technology described herein. In one embodiment, compute task distributor module 157 will maintain a table that includes a static mapping of functions that indicates the computational resource need and anticipated amount of data to be transferred for each function. In another embodiment, host 120 can provide an indication to memory controller 102 of the computational resource need and anticipated amount of data to be transferred for a compute task. In another embodiment, compute task distributor module 157 can use machine learning based on past performance of various compute tasks to determine the computational resource need and anticipated amount of data to be transferred for the current compute task. In another embodiment, compute task distributor module 157 can look at the code (software) to be performed and/or the amount of data referenced by the code in order to determine computational resource need and/or anticipated amount of data to be transferred. Other means for determining computational resource need and anticipated amount of data to be transferred can also be used.

In step 1806, compute task distributor module 157 determines the current bandwidth of memory controller 102 (e.g., of compute engine 1606 of memory control processor 1602) as well as the current bandwidth of each of the control dies for each of the integrated memory assemblies. In step 1808, compute task distributor module 157 assigns the compute task between the memory controller and the control dies of the integrated memory assemblies based on the computational resource need of the compute task determined in step 1802, anticipated amount of data to be transferred that was determined in step 1804, and/or the available bandwidth of the memory controller and the various control dies determined in step 1806. If compute task distributor module 157 determines that the compute task should be performed by memory controller 102 (e.g., performed by compute engine 1606 of memory controller processor 1602), in step 1820, then memory controller 102 fetches the data needed for the compute task in step 1822. For example, memory controller 102 can request data to be read from any one or more of the memory die of the various integrated memory assemblies and that data is provided back to memory controller 102. In step 1824, memory controller 102 (e.g., compute engine 1606) performs the compute task. In step 1826, memory controller 102 will store the result data from the compute task into one or more memory dies 302 of the various integrated memory assemblies.

If (in step 1820) compute task distributor module 157 determined that the compute task should be performed by a control die of an integrated memory assembly, then memory control 102 sends a request to the chosen control die of the chosen integrated memory assembly to perform the compute task. In addition to sending the request to perform the compute task, memory controller 102 may determine that data may needs to be moved (optional) in step 1840. For example, if the data is stored in a first integrated memory assembly but the compute task is to be assigned to a second integrated memory assembly, then data from the memory die of the first integrated memory assembly will be transferred to a memory die of the second integrated memory assembly. Alternatively, data can be stored across multiple memory die of multiple integrated memory assemblies and step 1840 can include moving all the data to one memory die of the same integrated memory assembly of the control die that will be performing the compute task. In step 1844 of FIG. 23, the assigned control die 304 fetches the data for the compute task from the memory die 302 that is connected to that control die. In step 1846, the assigned control die 304 performs the compute task wholly within that control die 304. In step 1848, the control die 304 stores the data that is the result of the compute task (if any) in the memory die connected (e.g., bonded) to that control die (in the same integrated memory assembly). In step 1850, the control die reports back to the memory controller. For example, the control die can report the result data back to the memory controller and/or the status of the compute task back to the memory controller. Note that the control die can perform the compute task using state machine 312 (see FIGS. 4 and 4A), RISC processor 334 (see FIG. 4A)m or other processing circuits on the control die.

Figure 24:
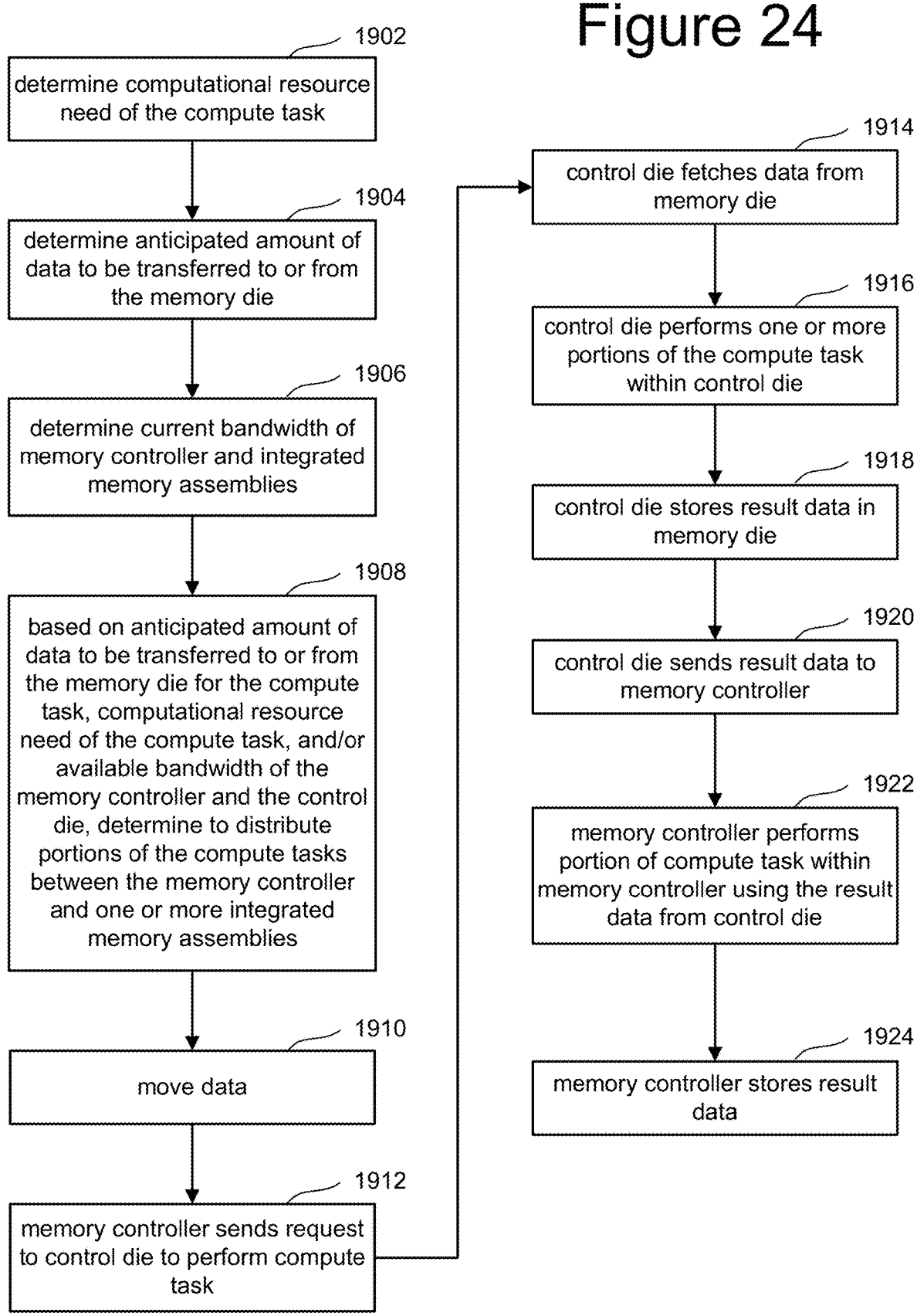
FIG. 24 is a flow chart describing one embodiment of a process for distributing compute tasks between a memory controller and an integrated memory assembly.

In one embodiment, the assigning of the compute task includes assigning the entire compute task to either the memory controller or one of the control die of an integrated memory assembly. In another embodiment, the assignment of the compute task can include breaking up the compute task into portions (e.g., subtasks) of the compute task and distributing those portions to different entities. For example, one portion can be assigned to the memory controller and another portion of the compute task can be assigned to the control die. In one embodiment, a first portion of a compute task is assigned to and performed by a control die of an integrated memory assembly, the second portion of the compute task is assigned to the memory controller such that the second portion of the compute task uses the result of the first portion of the compute task. FIG. 24 is a flowchart describing one embodiment of a process for assigning compute tasks and performing the compute tasks when the compute task is broken up into portions which are assigned between a memory controller and control die of an integrated memory assembly. Thus, the process of FIG. 24 represents another embodiment (another example implementation) of steps 1708 and 1710 of FIG. 22.

In step 1902 of FIG. 24, compute task distributor module 157 determines the computational resource need of the compute task (similar to step 1802). In step 1904, compute task distributor module 157 determines the anticipated amount of data to be transferred to or from the non-volatile memory of the memory die for the compute task (similar to step 1804). In step 1906, compute task distributor module 157 determines the current bandwidth of the memory controller and integrated memory assemblies (similar to step 1806). In step 1908, compute task distributor module 157 determines to distribute portions of the compute task between the memory controller and one or more integrated memory assemblies based on the anticipated amount of data to be transferred to or from the non-volatile memory of the memory die for the compute task, computations resource need of the compute task, and/or available bandwidth of the memory controller and the control die of the integrated memory assembly.

In step 1910, the data is moved to the appropriate memory die connected to the control die that is assigned a portion of the compute task. In step 1912, memory controller 102 sends a request to the appropriate control die 304 to perform a portion of the compute task. In step 1914, the control die 304 fetches the data for the compute task from memory die 302 that is connected to it (in the same integrated memory assembly). In step 1916, control die 304 performs one or more portions of the compute task. This performance of the one or more portions of the compute task are performed wholly within the control die 304. In step 1918, control die 304 stores the result data from the one or more portions of compute task in the memory die 302 connected to that control die 304 (in the same integrated memory assembly). In step 1920, control die 304 sends that same result data (or a subset of that result data) to memory controller 302 (e.g., to compute engine 1606). In step 1922, memory controller 102 (e.g., compute engine 1606) performs a portion of the compute task within the memory controller using the result data received from the control die in step 1920. In step 1924, the memory controller 102 stores the result data in local volatile storage 106. Note that in one embodiment the portion(s) of the compute task performed by the memory controller 102 (e.g., compute engine 1606) is a different portion(s) than the portion(s) of the compute task performed by the control die.

Figure 25:
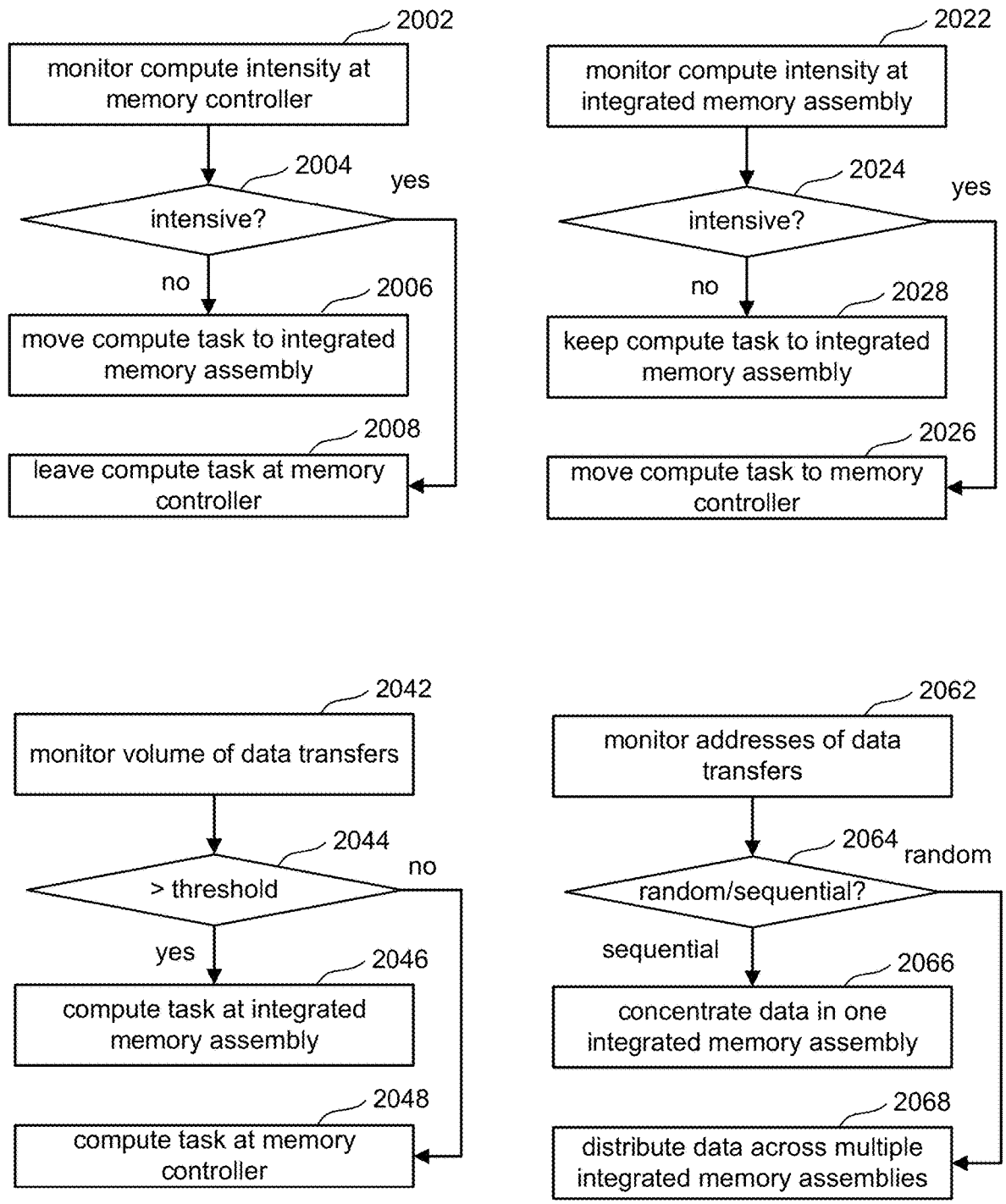
FIG. 25 is a flow chart describing one embodiment of a process for monitoring compute tasks.

Looking back at FIG. 22, step 1712 includes monitoring performance of the compute task. In one embodiment, the compute task is monitored concurrently with its performance in step 1710. FIG. 25 is a flowchart describing one embodiment of a set of processes for monitoring performance of the compute task and optimizing resource usage by reassigning compute tasks (if necessary). Thus, the process of FIG. 25 is an example implementation of step 1712 of FIG. 22. Note that FIG. 25 includes four processes that are performed concurrently. The first concurrent process starts at step 2002, and includes compute task monitor module 158 monitoring the compute intensity at the memory controller (e.g., compute engine 1606) of any compute task being performed by the memory controller. If that compute task monitor module 158 determines that a compute task is computationally intensive (step 2004), then compute task monitor module 158 will leave the compute task to be performed at memory controller 102 (e.g., compute engine 1606) in step 2008. If compute task monitor module 158 determines that a compute task being performed at compute engine 1606 of memory controller 102 is not computational intensive, then in step 2006 compute task monitor module 158 will recommend to compute task distributor module 157 to move that compute task to a control die of an integrated memory assembly.

In step 2022, compute task monitor module 158 monitors the computational intensity of a compute task being performed at a control die of an integrated memory assembly. This can be performed at every control die of every integrated memory assembly, or a subset. If compute task monitor module 158 determines that the compute task being performed by the control die is computationally intensive, then in step 2026, compute task monitor module 158 will recommend to compute task distributor module 157 to move the compute task to memory controller (e.g., to compute engine 1606 of memory controller process 1602). If compute task monitor module 158 determines that the compute task being performed at the control die of the integrated memory assembly is not computationally intensive, then the step 2028 compute task monitor module 158 will recommend to compute task distributor module 157 to keep that compute task at the control die of the integrated memory assembly.

In step 2042, compute task monitor module 158 will monitor the volume of data transfers between the integrated memory assemblies and memory controller 102. If the number of data transfers for a particular compute task is greater than a threshold number of data transfers (step 2044), then compute task monitor module 158 will recommend to compute task distributor module 157 that that particular compute task should be performed at a control die of an integrated memory assembly in step 2046. If for a given compute task the number of data transfers is not greater than a threshold, then compute task monitor module 158 will recommend to compute task distributor module 157 that the compute task should be performed at memory controller 102 (e.g., by compute engine 1606). In one embodiment, compute task distributor module 157 performs the reassigning recommended by compute task monitor module 158.

In step 2062, compute task monitor 158 monitors addresses of data transfers for each of the compute tasks being performed. By monitoring the addresses, compute task monitor 158 can determine whether the data is random data or sequential data. Sequential data will have consecutive addresses while random data will not. If, for particular compute tasks, compute task monitor 158 determines that the data is sequential data (step 2064), then compute task monitor 158 will recommend to compute task distributor 157 (or another entity within memory controller processor 1602) to concentrate all the data for that compute task or future compute task that are the same type in a single integrated memory assembly. If the data is sequential data, then compute task monitor 158 will recommend to compute task distributor 157 to distribute the data across multiple integrated memory assemblies step 2068 in order to be able to perform reads and writes concurrently.

Figure 26:
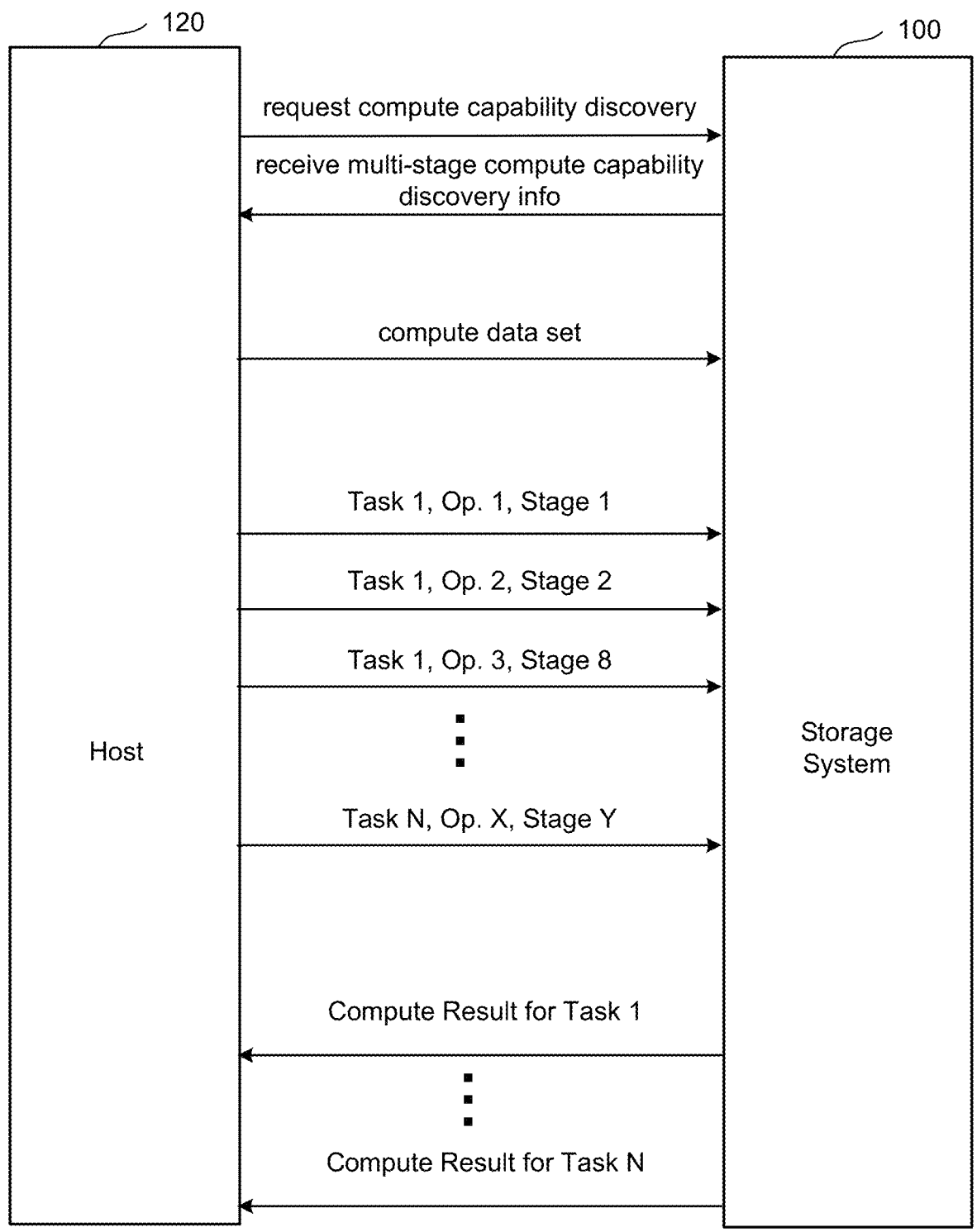
FIG. 26 is a block diagram of a host connected to a storage system.

As discussed above, in one example embodiment, host 120 will tell the storage system 100 how to distribute the compute task or portions of the compute tasks. An example embodiment is provided by FIG. 26 which shows host 120 in communication with memory storage system 100. First, host 120 requests compute capability discovery of storage system 100. This includes determining which integrated memory assemblies exist, the compute power and resources of each integrated memory assembly, and the bandwidth available for each integrated memory assembly and the memory controller. The results of that discovery is provided back to host 120. Subsequently, when host 120 is ready to send a compute task, host 120 send the data set to storage system 100. After sending the data set, host 120 sends the various operations to be performed for the compute task. For each operation (portion of a computer task) to be performed, host 120 tell storage system 100 which stage of the multi-stage processing system should perform that particular operation. From the host point of view, storage system 100 represents a multi stage processor. One stage can include the memory controller and the other stages can include the various control die of the integrated memory assemblies. For example, host 120 indicate that for Task 1 perform operation Op. 1 at Stage 1, for Task 1 perform operation Op. 2 at Stage 2, and for Task 1 perform operation Op. 3 at Stage 18, for Task N, perform operation Op. X at Stage Y, etc. Stage one, two, and eight may be control dies in different integrated memory assemblies. The results for each of the tasks will then be sent back from storage system 100 to host 120.

Figure 27:
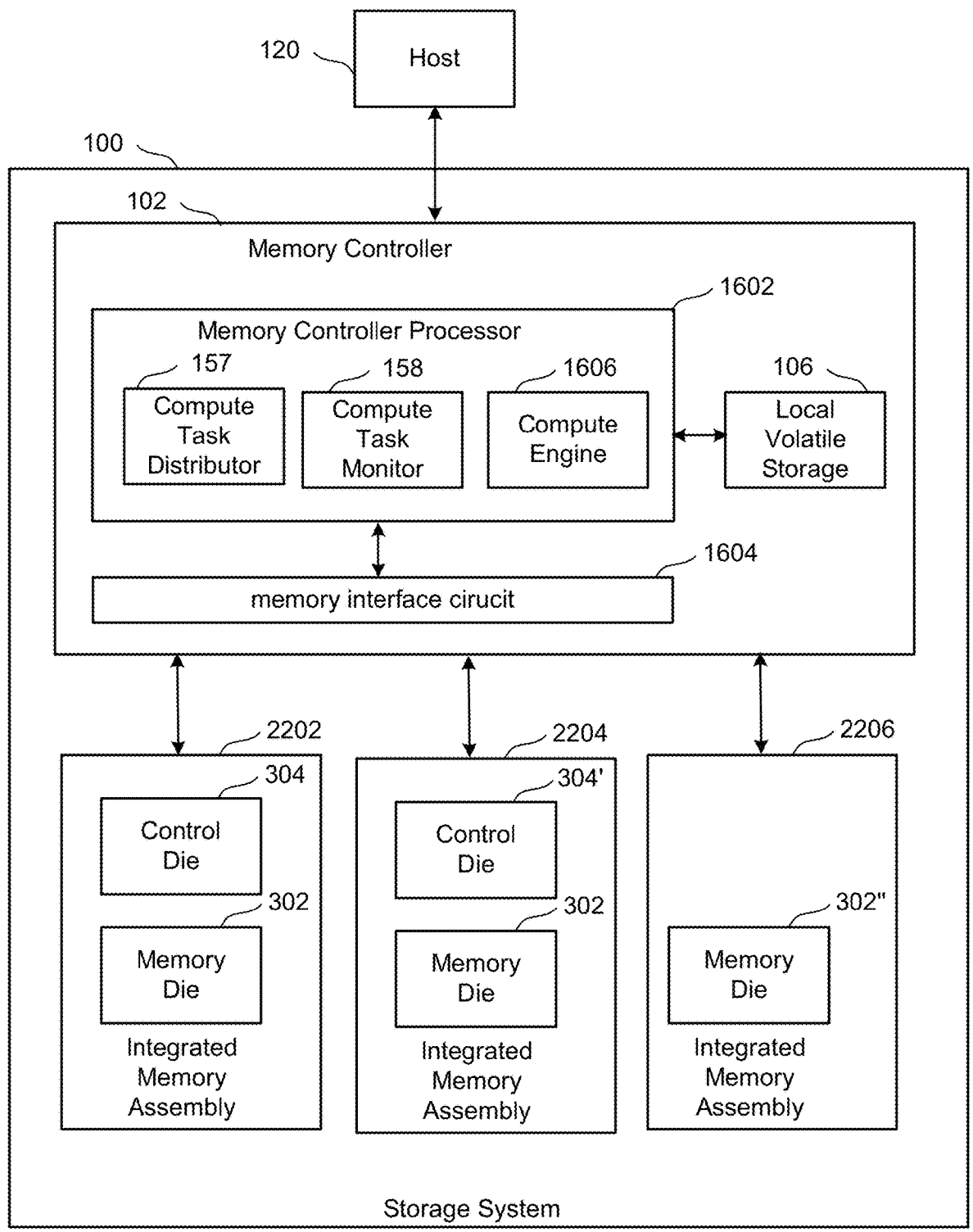
FIG. 27 is a block diagram of a host connected to a storage system.

FIG. 27 is a block diagram depicting another configuration of host 120 in communication with storage system 100. In the configuration of FIG. 27, storage system 100 includes multiple integrated memory assemblies with each having different amounts of computational resources. For example, FIG. 27 shows integrated memory assembly 2202, integrated memory assembly 2204, and integrated memory assembly 2206. Integrated memory assembly 2202 includes memory die 302 and control die 304, both of which are depicted in more detail in FIG. 4 (discussed above). Integrated memory assembly 2204 includes memory die 302 and a control die 304'. The structure of control die 304' is described above with respect to FIG. 4A. Control die 304' has greater computational resources than control die 304 as control die 304' includes an extra RISC processor 334. Integrated memory assembly 2206 includes memory die 302" (see FIG. 4B), but does not include a control die. Therefore, the three integrated memory assemblies 2202, 2204, 2206 depicted in FIG. 27 have different amounts of computational resources. One reason that a storage system 100 may include different integrated memory assemblies having different amounts of computational resources is because having integrated memory assemblies with more computational resources costs more. Therefore, some storage systems may include some integrated memory assemblies with large computational resources to perform certain tasks, with the remaining integrated memory assemblies having smaller computational resources to save costs. Although FIG. 27 shows three different types of integrated memory assemblies having different amounts of computational resources, other embodiments can implement less than three or more than three integrated memory assemblies having different amounts of computational resources.

Figure 28:
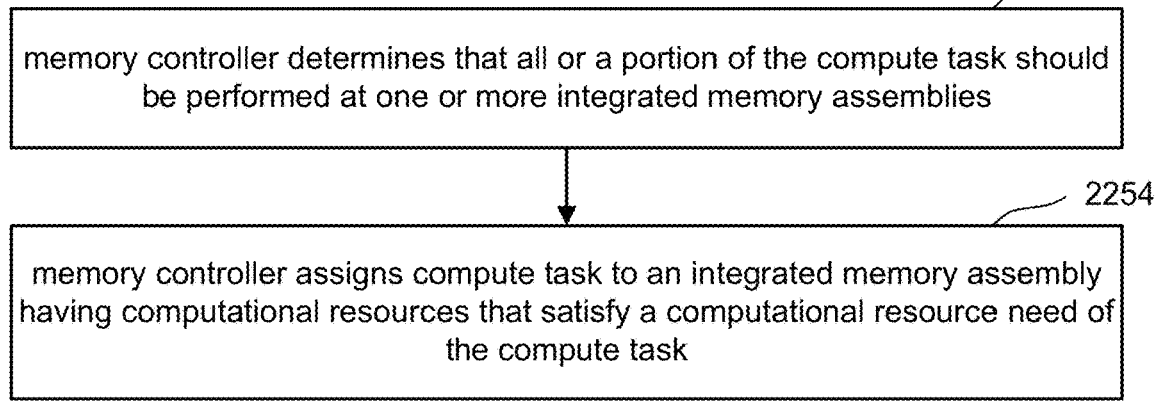
FIG. 28 is a flow chart describing one embodiment of a process for assigning a compute task in a storage system.

FIG. 28 is a flowchart describing one embodiment of operating the structure of FIG. 27 while performing the processes of FIG. 22 or FIG. 23 and/or FIG. 24. In step 2252 of FIG. 28, memory controller 102 (e.g., compute task distributor module 157) determines that all or a portion of the compute task should be performed at one or more integrated memory assemblies (rather than at the memory controller). In step 2254, memory controller 102 (e.g., compute task distributor module 157) assigns the compute task to an integrated memory assembly having a computational resources that satisfy a computational resource need of the compute task. That is if a compute task needs a very large amount of computational resources, then compute task distributor module 157 assigns the compute task to control die 304' of integrated memory assembly 2204 and if the compute task only needs a small amount of computational resources, then compute task distributor module 157 will assign the compute task to control die 304 of integrated memory assembly 2202. In one embodiment, steps 2252 and 2254 perform as part of step 1708 of FIG. 22, step 1808 of FIG. 23, and/or step 1908 of FIG. 24.

Figure 28A:
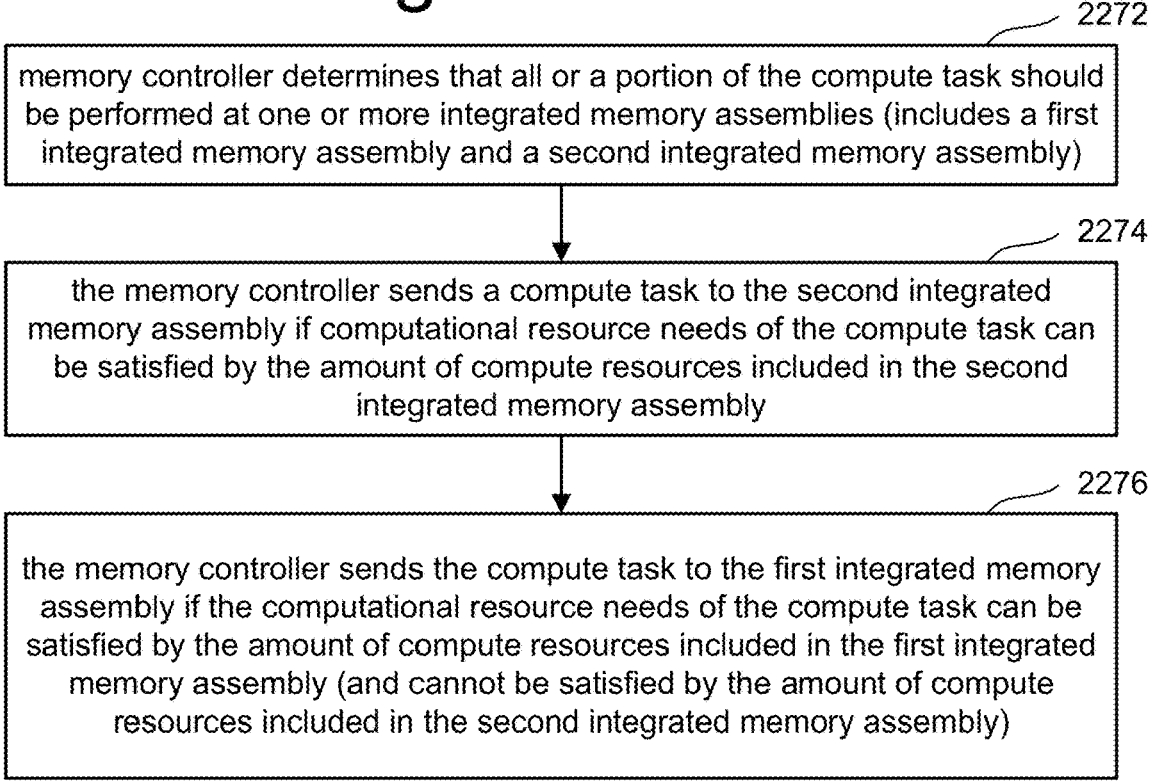
FIG. 28A is a flow chart describing one embodiment of a process for assigning a compute task in a storage system.

FIG. 28A is a flowchart describing another embodiment of the process of distributing compute task to the structure of FIG. 27. FIG. 28A provides more details of one embodiment of the process of FIG. 28. In step 2272, memory controller 102 (e.g., compute task distributor module 157) determines that all or a portion of the compute tasks should be performed at one or more integrated memory assemblies. In one embodiment, the one or more integrated memory assemblies includes the first integrated memory assembly (e.g., integrated memory assembly 2204) and a second integrated memory assembly (e.g., integrated memory assembly 2202). In step 2274, memory control 102 (e.g., compute task distributor module 157) sends a compute task to the second integrated memory assembly (e.g., integrated memory assembly 2202) if computational resource needs of the compute task can be satisfied by the amount of compute resources included in the second integrated memory assembly. In step 2276, memory controller 102 (compute task distributor module 157) sends a compute task to the first integrated memory assembly (e.g., integrated memory assembly 2204) if the computational resource needs of the compute task can be satisfied by the amount of compute resources included in the first integrated memory assembly and cannot be satisfied by the amount of compute resources included in the second integrated memory assembly. For example, if the compute task is too computationally intense for control die 304 of integrated memory assembly 2202, then that compute task will be assigned to control die 304' of integrated memory assembly 2204.

In some embodiments, data can be arranged in logical blocks. For purposes of this document, a logical block is a collection of blocks (physical blocks) across multiple memories dies (e.g., one physical of each of a plurality of memory dies). A logical block may be divided into pages. In some embodiments, a physical block is a unit of erase. In some embodiments, a physical block includes a collection of non-volatile memory cells that share a set of bit lines and word lines. Usually, physical blocks are combined into logical blocks based on health (endurance of the blocks) or by blindly interleaving blocks from different memory die. It is now proposed to form logical blocks based on the amount of compute resources available in the integrated memory assembly of the memory die. That is, the storage system will include multiple types of logical blocks of non-volatile memory cells. Each type of logical block comprises physical blocks from multiple memory die connected to control die having a same amount of compute resources.

In one example, there can be three types of logical blocks: premium logical blocks, standard logical blocks and legacy logical blocks. Premium logical blocks would be logical blocks made up of physical blocks from memory die that are in the same integrated memory assemblies as control die 304', standard logical blocks are made up of physical blocks from memory die 302 that are in the same integrated memory assembly as control die 304, and legacy logical blocks are made up of physical blocks from memory die 302" that are not connected to control die. This concept is depicted in FIG. 29 which shows three sets of memory die. Note that there can be more than three sets of memory dies. The first set of memory dies include memory dies 2302, 2304, and 2306. The second set of memory dies include memory dies 2312, 2314, and 2316. The third set of memory dies include memory dies 2322, 2324, and 2326. The first set of memory dies are part of integrated memory assemblies that include control die having a first amount of compute resources. The second set of memory dies a part of integrated memory assemblies that have control die having a second amount of compute resources. The third set of memory dies are part of integrated memory summaries that do not have control die (and do not have any compute resources). In a different embodiment, the third set of memory dies are part of integrated memory summaries that have a third amount of compute resources. For example, the first set of memory dies (2302, 2304, 2306) can be part of integrated memory assemblies similar to integrated memory assembly 2204 having control die 304'; the second set of memory dies (2312, 2314, 2316) are part of integrated assemblies such as integrated assembly 2202 having control die 304; and the third set of control dies (2322, 2324, 2326) are part of integrated memory summaries that have no control die such as integrated assembly 2206. The first set of control dies include a first logical block 2310 which includes physical block 2310a from memory die 2302, physical block 2310b from memory die 2304, and physical block 2310c from memory die 2306. The second set of memory dies include logical block 2318 which comprises physical block 2318a from memory die 2312, physical block 2318b from memory die 2314, and physical block 2318c from memory die 2316. The third set of memory dies include logical block 2328 which includes physical block 2328a from memory die 2322, physical block 2328b from memory die 2324, and physical block 2328c from memory die 2326.

Data that will be used by a compute task that is computationally intensive can be stored in a premium logical block, such as logical block 2310 so that it can be used by control die connected to any one of memory dies 2302, 2304 and 2306. Data which will be used by a compute task that is less computationally intensive can be stored in a standard logical block, such as logical block 2318 so that it can be used by control die connected to any one of memory dies 2312, 2314, or 2316. Data that will not be used by compute tasks (e.g., data to be archived long term) can be stored in a legacy logical block such as logical block 2328 that is part of integrated memory assemblies that do not include control dies. In another embodiment, it is possible to have a hybrid logical block that includes physical blocks from different types of memory die associated with integrated memory assemblies having different amounts of compute resources. FIG. 28 depicts an example of a hybrid logical block 2340, which includes physical blocks from memory dies 2302, 2304, 2314, and 2326.

Figure 30:
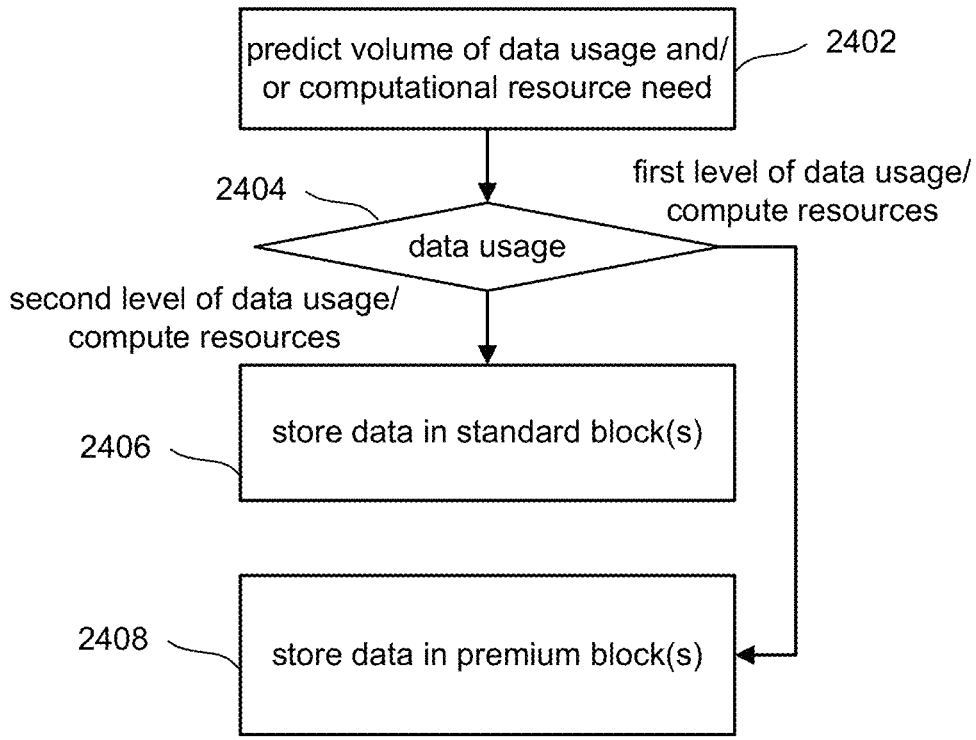
FIG. 30 is a flow chart describing one embodiment of a process for intelligently storing data.
Figure 31:
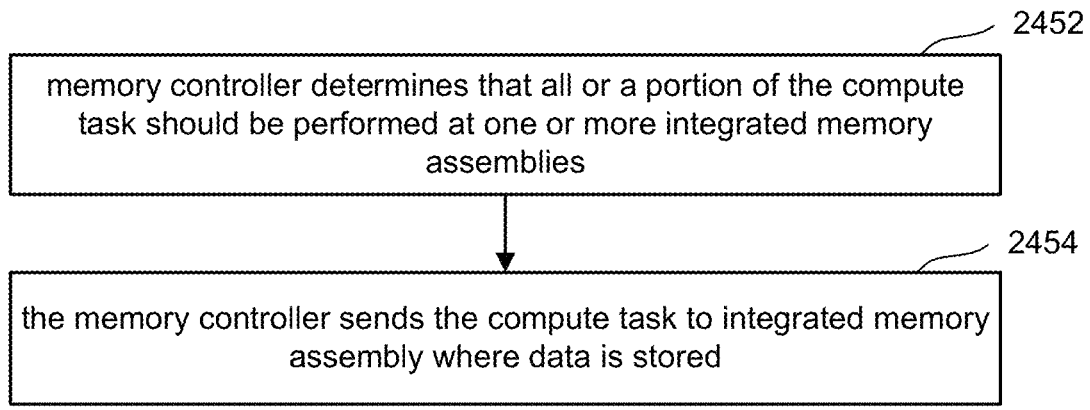
FIG. 31 is a flow chart describing one embodiment of a process for assigning compute tasks in a storage system

In the embodiment of FIG. 29, memory controller 102 can route data based on a level of computational resources need or data transfer need of one or more applications that will use the data. Once the data is routed to the appropriate integrated memory assembly, then the compute task can be routed to the same integrated memory assembly. This routing of data to the appropriate integrated memory assembly associated with the appropriate amount of data usage (e.g., requiring transfer of data) and/or amount of compute resources is one example of the intelligent storing of received data discussed above with respect to step 1704 of FIG. 22. FIG. 30 is a flowchart describing one embodiment of a process for intelligently storing data using the structure of FIGS. 27 and 29. In step 2402 of FIG. 30, compute task distributor module 157 predicts a volume of data usage for data received and/or the amount of compute resources that will be used by a compute task operating on the data. In one embodiment, there is a first level of data usage/compute resources and a second level of data usage/compute resources. If predicted data usage/compute resources is a first level of data usage/compute resources (step 2404), then the data is stored in premium blocks (step 2408). If the data usage is a second level of data usage/compute resources, then the data is stored in standard blocks (step 2406). In other embodiments, there can be three levels of data usage/compute resources, four levels of data usage/compute resources, etc. Thus, the memory controller is configured to receive data to be stored in non-volatile memory, predict the level of data usage/compute resources for that received data, store the received data in a first logical block if a predicted level is a first level of data usage/compute resources and store the received data in second logical block if the predicted level is the second level of data usage/compute resources (with the first level being higher than the second level). In an alternative embodiment, the memory controller will predict and route data only based on data usage (e.g., requiring transfer of data). In another alternative embodiment, the memory controller will predict and route data only based on computational resources need of one or more applications that will use the data FIG. 31 is a flowchart describing one embodiment of a process for assigning compute tasks. The process of FIG. 31 is performed in conjunction with the process of FIG. 30 and using the structure of FIGS. 27 and 29. In step 2452, memory controller 102 (e.g., compute task distributor module 157) determines that all or a portion of the compute task should be performed at one or more integrated memory assemblies. In step 2454, memory controller (e.g., compute task distributor module 157) sends the compute task to an integrated memory assembly where the data is already stored. For example, if the data was already stored in a premium block, then the compute task is sent to a control die in the same integrated memory assembly or a group of integrated memory assemblies that the data is already stored in. In one embodiment, steps 2452 and 2454 performed as part of steps 1708 of FIG. 22, or as part of step 1808 of FIG. 23.

Thus, the embodiment of FIGS. 29-31 describe a system that, determining that data will be used by an application that is compute intensive and that there is clear value in latency reduction, the memory controller routes the compute intensive data into a premium logical block. Otherwise, the memory controller routes data into a standard block or a block without any compute resources.

In one example, multiple streams of media data are written to the storage device and one of the program streams requires continuous data monitoring such as for a high security traffic zone analyzing the license plates of vehicles moving around streets. The memory controller can route only the program stream needing the data analysis to the premium logical blocks owing to the enormous convolution requirements. The rest of the data captured at other places is just for archiving purposes, does not require immediate computations, can be routed to standard logical blocks or logical blocks in memory die that are not connected to a control die (do not need the benefit of the proposed system). In another example involving NVMe, the storage system determines or is instructed by the host that a particular NVMe data set is compute intensive. Accordingly, the storage device prioritizes such NVMe data set into premium logical blocks. In another example, of a pool of applications running on a host that access the storage device, different applications may be marked for difference endurance or in protection layers under NVMe specifications. In the proposed approach, the compute requirements of different applications may be another parameter that is used to identify storage requirements. Accordingly, the data for applications (e.g., image or video analysis) needing high compute requirements are routed to premium logical blocks and other data to standard logical blocks.

Three are many known methods on how a storage device classifies the data. The storage device may run machine learning logic or simple logical data tracking to automatically identify whether the data is hot or cold in the context of compute access. Also, the storage device may include a table with a static mapping of applications to classifications (e.g., compute intensive or not, many data transfers or not). Similarly, the storage device may identify if the stored logical data is compute intensive or non-compute intensive based on host indication or predetermined application requirements covering endurance group or NVMe data sets. In some embodiments, data is tagged with tokens or a compute trigger. Subsequently data may be routed (or rerouted) into appropriate logical blocks according to the token and the data. In some cases the host may tag the data as compute intensive.

In one approach, a storage device may manage cold data (data not accessed often) cautiously. Where it is fine for the data to be cold, it may not be cost effective if the compute resources get cold. During dynamic reallocation or static wear leveling, the memory controller routes the cold data to standard logical blocks or logical blocks associated with any die that is not connected to a control die and thereby releases the premium logical blocks to the free pool to accommodate compute intensive data and support into such blocks.

In another approach, the memory control takes a soft stand with routing. Whereas the memory controller may follow a strict routing policy by mapping appropriate logical blocks in the context of data computation intensity, it takes a soft stand when wear leveling. For example, if one logical block is the least used group, it may accommodate non-compute data into the premium logical block for the sake of leveling across the storage device.

FIG. 32 is a flowchart describing one embodiment of a process for performing garbage collection. The garbage collection process seeks to compact data. Data is stored in blocks. Some of the data in the blocks may later be found invalid causing the valid data to be fragmented. The garbage collection will take valid data and compact it so it is not as fragmented. Garbage collection is a known process. In step 2502 of FIG. 32, memory controller 102 accesses a block of data that will be subject to a garbage collection process. In step 2504, memory controller 102 accesses all valid data in the block (e.g., access valid data in a physical block of a logical block). In one embodiment, memory controller 102 (e.g., compute task monitor module 158) maintains a counter for each page of data to indicate how many times that data has been accessed for compute tasks. In step 2506, memory controller 102 accesses the counters for the valid data. Data that is accessed often is routed (moved) to a new premium logical block in step 2510. Data that is not accesses often is routed (moved) to a new standard logical block in step 2512. After the data is routed to new blocks, the old block is released for new use.

FIG. 33 is a flowchart of a process performed in the background by compute task monitor 158 in order to make sure data is stored in appropriate places within the storage system. Data that is stored in premium logical blocks and is accessed often should remain in premium logical blocks. Data that is stored in premium logical blocks and is not accessed often should be moved to standard logical blocks. Data that is stored in standard logical blocks and is accessed often should be moved to premium logical blocks. Data that is stored in standard logical blocks and is not accessed often should remain in standard logical blocks. In step 2602 of FIG. 33, compute task monitor module 158 accesses the block of data. In step 2604, compute task monitor module 158 accesses all the valid data in the block. In step 2606, compute task monitor 158 accesses the counter for the valid data accessed. In one embodiment, there is a counter for each page of data to indicate how many times that data has been accessed for compute tasks. Computer task monitor module 158 determines whether the data is accessed often or not accessed often based on the counter accesses in step 2606. If the data is correctly classified, then the data is left in the current location in step 2610. If the data is not correctly classified, then the data is moved to a new block with the correct classification (e.g., premium logical block or standard logical block) in step 2612. In one embodiment, data that is stored in premium logical blocks and is accessed often is correctly classified. Data that is stored in premium logical blocks and is not accessed often is not correctly classified. Data that is stored in standard logical blocks and is accessed often is not correctly classified. Data that is stored in standard logical blocks and is not accessed often is correctly classified.

A storage system has been described that indigently routes compute tasks within the storage system.

One embodiment includes an apparatus comprising an interface circuit and a memory controller processor connected to the interface circuit. The memory controller processor and the interface circuit together comprise a memory controller. The memory controller processor is configured to communicate via the interface circuit with a first integrated memory assembly that comprises a memory die connected (e.g., bonded) to a control die. The memory die includes a monolithic three dimensional non-volatile memory array. The control die includes a control die processor. The memory controller processor is configured to assign a compute task between the memory controller and the control die based on anticipated amount of data to be transferred to or from the memory die for the compute task.

In one example implementation, the memory controller processor is configured to assign the compute task between the memory controller and the control die based on anticipated amount of data to be transferred to or from the memory die for the compute task, computational resource need of the compute task, and/or available bandwidth of the memory controller and the control die. In one example implementation, the memory controller processor is configured to monitor performance of the compute task and re-assign the compute task based on monitored computational intensity of the compute task and monitored volume of data transferred to or from the memory die for the compute task. In one example implementation, the memory controller processor is configured to store all data for the compute task in a memory die directly connected to the control die having the control die processor performing the compute task. In another example, the memory controller processor is configured to store all data for the compute task across multiple memory die of multiple integrated assemblies. In one set of examples, the memory controller processor is configured to assign the compute task between the memory controller and the control die by assigning all of the compute task to the memory controller, assigning all of the compute task to one control die of one integrated memory assembly; assigning a first portion of the compute task to the memory controller and a second portion of the compute task to the control die, and/or assigning different portions of the compute task to different control dies of different integrated memory assemblies.

One example implementation further comprises additional integrated assemblies that each comprises a memory die that includes non-volatile memory and a control die connected to the memory die, the memory controller processor is configured to store at least a portion of data for the compute task across multiple memory die of the additional integrated assemblies and move the data for the compute task that is stored across multiple memory die of the additional integrated assemblies to the memory die of the first integrated memory assembly in conjunction with assigning the compute task to the control die.

One embodiment includes a method comprising: receiving a request to perform a compute task at a storage system, the compute task includes operating on data, the storage system includes a memory controller and a plurality of integrated memory assemblies separate from and in communication with the memory controller, the integrated memory assemblies each comprises a memory die and a control die connected to the memory die, the memory die of the plurality of integrated memory assemblies comprise non-volatile memory, the memory controller and the control die include separate compute resources; assigning the compute task to a subset of the memory controller and the integrated memory assemblies based on anticipated amount of data to be transferred to or from non-volatile memory for the compute task; and performing the compute task at the assigned subset, including reading data from or writing data to non-volatile memory.

One embodiment includes an apparatus comprising a memory controller and a plurality of integrated memory assemblies separate from and in communication with the memory controller. The integrated memory assemblies each comprises a memory die that includes non-volatile memory and a control die connected to the memory die. The control die has a first interface for communicating with the memory controller and a second interface for communicating with its connected memory die. The second interface is wider than the first interface. A first set of control dies of a first set of the integrated memory assemblies includes a first amount of compute resources. A second set of control dies of a second set of the integrated memory assemblies includes a second amount of compute resources. The first amount of compute resources is greater than the second amount of compute resources. The plurality of integrated memory assemblies includes multiple types of logical blocks of non-volatile memory cells. The first set of the integrated memory assemblies include a first logical block that comprises physical blocks only from memory dies of the first set of the integrated memory assemblies. The second set of the integrated memory assemblies include a second logical block that comprises physical blocks only from memory dies of the second set of integrated memory assemblies.

One embodiment includes an apparatus comprising a memory controller and a plurality of integrated memory assemblies separate from and in communication with the memory controller. The integrated memory assemblies each comprises a memory die that includes non-volatile memory and a control die connected to the memory die. The control die has a first interface for communicating with the memory controller and a second interface for communicating with the connected memory die. The second interface is wider than the first interface. Each control die includes compute resources. A first integrated memory assembly of the plurality of integrated memory assemblies includes a control die having a first amount of compute resources. A second integrated memory assembly of the plurality of integrated memory assemblies includes a control die having a second amount of compute resources. The first amount of compute resources is different than the second amount of compute resources. The memory controller is configured to send a compute task to the second integrated memory assembly if the computational resource needs of the compute task can be satisfied by the second amount of compute resources. The memory controller is configured to send the compute task to the first integrated memory assembly if computational resource needs of the compute task can be satisfied by the first amount of compute resources and cannot be satisfied by the second amount of compute resources.

In one example implementation, the memory controller is configured to: access valid data in a first physical block, access a counter for the valid data that indicates how many times the valid data has been accessed for compute tasks, move the data to a new physical block in the first logical block if the counter indicates that the valid data has been accessed for compute tasks often, and move the data to a new physical block in the second logical block if the counter indicates that the valid data has not been accessed for compute tasks often.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., by way of one or more other parts). In some cases, when an element is referred to as being connected or coupled to another element, the element may be directly connected to the other element or indirectly connected to the other element by way of intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

For purposed of this document, the terms "top" and "bottom," "upper" and "lower" and "vertical" and "horizontal," and forms thereof, as may be used herein are by way of example and illustrative purposes only, and are not meant to limit the description of the technology inasmuch as the referenced item can be exchanged in position and orientation.

In regard to the various flow charts depicted in the drawings, the steps of the flow chart can be performed in the order depicted, or the order of steps can be adjusted top suit the particular implementation.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the disclosed technology and its practical application, to thereby enable others skilled in the art to best utilize it in various embodiments and with various modifications as are suited to the particular use contemplated. It is intended that the scope be defined by the claims appended hereto.

We claim:

1. An apparatus, comprising:
   an interface circuit; and
   a memory controller processor connected to the interface circuit, the memory controller processor and the interface circuit together comprise a memory controller, the memory controller processor is configured to communicate via the interface circuit with a first integrated memory assembly that comprises a memory die connected to a control die having a control die processor, and the memory controller processor is configured to assign a compute task between the memory controller and the control die based on anticipated amount of data to be transferred to or from the memory die for the compute task.

2. The apparatus of claim 1, wherein:
   the memory controller processor is configured to assign the compute task between the memory controller and the control die based on an anticipated amount of data to be transferred to or from the memory die for the compute task and based on computational resource need of the compute task.

3. The apparatus of claim 2, wherein:
   the memory controller processor is configured to assign the compute task between the memory controller and the control die based on the anticipated amount of data to be transferred to or from the memory die for the compute task, the computational resource need of the compute task, and available bandwidth of the memory controller and the control die.

4. The apparatus of claim 2, wherein:
   the memory controller processor is configured to monitor performance of the compute task and re-assign the compute task based on monitored computational intensity of the compute task and monitored volume of data transferred to or from the memory die for the compute task.

5. The apparatus of claim 1, wherein:
   the memory controller processor is configured to assign the compute task between the memory controller and the control die by assigning a first portion of the compute task to the memory controller and assigning a second portion of the compute task to the control die.

6. The apparatus of claim 1, wherein:
   the memory controller processor is configured to assign the compute task between the memory controller and the control die by assigning a first portion of the compute task to the control die processor, transmitting a result of the first portion of the compute task from the control die to the memory controller, and assigning a second portion of the compute task to the memory controller processor; and
   the memory controller processor is configured to perform the second portion of the compute task using the result of the first portion of the compute task transmitted from the control die.

7. The apparatus of claim 1, further comprising:
   additional integrated assemblies that each comprises a memory die that includes non-volatile memory and a control die connected to the memory die, the memory controller processor is configured to store at least a portion of data for the compute task across multiple memory die of the additional integrated assemblies and move the data for the compute task that is stored across multiple memory die of the additional integrated assemblies to the memory die of the first integrated memory assembly in conjunction with assigning the compute task to the control die of the first integrated memory assembly.

8. The apparatus of claim 1, further comprising:
   a host interface configured to be in communication with a host external to the memory controller, the memory controller processor receives an indication from the host via the host interface instructing the memory controller processor how to assign the compute task between the memory controller and the control die.

9. The apparatus of claim 1, further comprising:
   additional integrated memory assemblies separate from and in communication with the memory controller, the additional integrated memory assemblies include the first integrated memory assembly, the additional integrated memory assemblies each comprises a memory die that includes non-volatile memory and a control die connected to the memory die, the control die has a first interface for communicating with the memory controller and a second interface for communicating with its connected memory die, the second interface is wider than the first interface, each control die includes compute resources, the control die of the first integrated memory assembly includes a first amount of compute resources, a second integrated memory assembly of the additional integrated memory assemblies includes a control die having a second amount of compute resources, the first amount of compute resources is greater than the second amount of compute resources;
   the memory controller processor is configured to send a compute task to the second integrated memory assembly if a computational resource need of the compute task can be satisfied by the second amount of compute resources; and
   the memory controller processor is configured to send the compute task to the first integrated memory assembly if the computational resource need of the compute task can be satisfied by the first amount of compute resources and cannot be satisfied by the second amount of compute resources.

10. The apparatus of claim 1, further comprising:
    additional integrated memory assemblies separate from and in communication with the memory controller, the additional integrated memory assemblies includes a first set of integrated memory assemblies that includes the first integrated memory assembly;
    the first set of integrated memory assemblies each include a control die having the first amount of compute resources and a memory die having a plurality of physical blocks;
    the first set of integrated memory assemblies include first logical blocks that comprise physical blocks only from memory dies of the first set of integrated memory assemblies;
    the additional integrated memory assemblies includes a second set of integrated memory assemblies;
    the second set of integrated memory assemblies each include a control die having the second amount of compute resources and a memory die having a plurality of physical blocks; and the second set of integrated memory assemblies include second logical blocks that comprise physical blocks only from memory dies of the second plurality of integrated memory assemblies.

11. The apparatus of claim 1, further comprising:
a plurality of additional integrated memory assemblies separate from and in communication with the memory controller, the plurality of additional integrated memory assemblies includes the first integrated memory assembly; and
the plurality of additional integrated memory assemblies includes multiple types of logical blocks of non-volatile memory cells, each type of logical block comprises physical blocks from multiple memory die connected to control die having a same amount of compute resources.

12. A method comprising:
receiving a request to perform a compute task at a storage system, the compute task includes operating on data, the storage system includes a memory controller and a plurality of integrated memory assemblies separate from and in communication with the memory controller, the integrated memory assemblies each comprises a memory die and a control die connected to the memory die, the memory die of the plurality of integrated memory assemblies comprise non-volatile memory, the memory controller and the control die include separate compute resources;
assigning the compute task to a subset of the memory controller and the integrated memory assemblies based on an anticipated amount of data to be transferred to or from non-volatile memory for the compute task; and
performing the compute task at the assigned subset, including reading data from or writing data to non-volatile memory.

13. The method of claim 12, wherein:
the assigning the compute task to the subset of the memory controller and the integrated memory assemblies is based on a computational resource need of the compute task and the anticipated amount of data to be transferred to or from non-volatile memory for the compute task.

14. The method of claim 12, wherein:
the assigning the compute task to the subset of the memory controller and the integrated memory assemblies is based on a computational resource need of the compute task, the anticipated amount of data to be transferred to or from non-volatile memory for the compute task, and available bandwidth of the memory controller and the integrated memory assemblies.

15. The method of claim 12, wherein:
different integrated memory assemblies of the plurality of integrated memory assemblies have different amounts of computational resources; and
the assigning the compute task to the subset of the memory controller and the integrated memory assemblies comprises assigning the compute task to an integrated memory assembly of the plurality of integrated memory assemblies having computational resources that satisfy a computational resource need of the compute task.

16. The method of claim 12, wherein:
the plurality of integrated memory assemblies includes a first integrated memory assembly comprising a control die bonded to a memory die; and
the assigning the compute task to a subset of the memory controller and the integrated memory assemblies comprises assigning the compute task to be performed by the first integrated memory assembly because the compute task is computationally intensive and will require a large amount of data to be transferred to or from non-volatile memory for the compute task.

* * * * *